（12） United States Patent
Fukui et al.

(10) Patent No.: US 12,452,517 B2
(45) Date of Patent: Oct. 21, 2025

(54) IMAGE PICKUP APPARATUS USED AS ACTION CAMERA, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Takaaki Fukui, Chiba (JP); Takashi Kawakami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/966,933

(22) Filed: Oct. 17, 2022

(65) Prior Publication Data

US 2023/0126836 A1    Apr. 27, 2023

(30) Foreign Application Priority Data

Oct. 22, 2021  (JP) ................................. 2021-173015
Mar. 11, 2022  (JP) ................................. 2022-038690

(51) Int. Cl.
*H04N 23/611*   (2023.01)
*H04N 23/68*    (2023.01)
*H04N 23/698*   (2023.01)

(52) U.S. Cl.
CPC ....... *H04N 23/611* (2023.01); *H04N 23/6842* (2023.01); *H04N 23/687* (2023.01); *H04N 23/698* (2023.01)

(58) Field of Classification Search
CPC ............. H04N 23/611; H04N 23/6842; H04N 23/687; H04N 23/698; H04N 5/2628; H04N 23/6811; H04N 23/683
See application file for complete search history.

(56) References Cited

U.S. PATENT DOCUMENTS

2009/0046815 A1   2/2009   Oh et al.
2013/0002882 A1   1/2013   Onozawa
(Continued)

FOREIGN PATENT DOCUMENTS

CH          706784 A2    1/2014
CN        103685913 A    3/2014
(Continued)

OTHER PUBLICATIONS

Yamazoe et al. (A body-mounted camera system for head-pose estimation and user-view synthesis images, 2007). (Year: 2007).*

(Continued)

*Primary Examiner* — Yogesh K Aggarwal
(74) *Attorney, Agent, or Firm* — Cowan, Liebowitz & Latman, P.C.

(57) ABSTRACT

An image pickup apparatus that eliminate manual change of an image pickup direction during picking up an image and can easily obtain an image that records experience while focusing attention on the experience. An image pickup unit picks up a wide-angle image. A face direction detection unit detects a direction of a face of a user. A user movement detection unit detects a movement of the user. A processor executes a set of instructions stored in a memory device to detect a vertical movement and/or a horizontal movement of the face based on an output of the face direction detection unit, determine a position and/or a size of an extraction image extracted from the wide-angle image based on the direction and movements of the face and the movement of the user, and extract the extraction image from the wide angle image with the position and/or the size determined.

21 Claims, 73 Drawing Sheets

(56) References Cited

U.S. PATENT DOCUMENTS

| | | | |
|---|---|---|---|
| 2014/0355767 | A1 | 12/2014 | Virette et al. |
| 2015/0310263 | A1 | 10/2015 | Zhang et al. |
| 2015/0316981 | A1 | 11/2015 | Sellen et al. |
| 2017/0085841 | A1 | 3/2017 | Hagiwara |
| 2017/0199579 | A1 | 7/2017 | Chen et al. |
| 2020/0304718 | A1 | 9/2020 | Toriumi et al. |
| 2021/0034904 | A1 | 2/2021 | Lee et al. |
| 2022/0083794 | A1* | 3/2022 | Bronte .................... B60R 11/04 |
| 2023/0034538 | A1 | 2/2023 | Ishibashi |

FOREIGN PATENT DOCUMENTS

| | | | |
|---|---|---|---|
| CN | 105025208 | A | 11/2015 |
| CN | 105164612 | A | 12/2015 |
| CN | 105259654 | A | 1/2016 |
| CN | 107071237 | A | 8/2017 |
| CN | 109064397 | A | 12/2018 |
| EP | 2984541 | A | 2/2016 |
| EP | 3136724 | A | 3/2017 |
| EP | 3163422 | A | 5/2017 |
| GB | 2607151 | A | 11/2022 |
| GB | 2611154 | A | 3/2023 |
| JP | 2002132448 | A | 5/2002 |
| JP | 2005-322077 | A | 11/2005 |
| JP | 2007-074033 | A | 3/2007 |
| JP | 2012-039359 | A | 2/2012 |
| JP | 2015149552 | A | 8/2015 |
| JP | 2017-060078 | A | 3/2017 |
| JP | 2020086014 | A | 6/2020 |
| KR | 940013278 | A | 6/1994 |
| KR | 20150100081 | A | 9/2015 |
| KR | 101571262 | B1 | 11/2015 |
| WO | 2013/065868 | A | 5/2013 |

OTHER PUBLICATIONS

Hirotake Yamazoe, et al., "A body-mounted camera system for head-pose estimation and user-view image synthesis", ScienceDirect, Image and Vision Computing 25 (2007) 1848-1855, Dec. 3, 2007, (8 pages).
The above patent documents and Non-Patent Literature Document #1 were cited in a British Search/ Examination Report issued on Jan. 20, 2023, a copy of which is enclosed, that issued in the corresponding British Patent Application No. 2210554.8.
The above U.S. Publications were cited in a Nov. 11, 2022 Indian Office Action, a copy of which is enclosed with an English Translation, that issued in Indian Patent Application No. 202244012506.
The above patent document is cited in a United Kingdom Search Report issued on Sep. 14, 2023, a copy of which is enclosed, that issued in the corresponding UK Patent Application No. 2202906.0.
The above document was cited in a British Search Report issued on Jan. 26, 2024 a copy of which is enclosed, that issued in the corresponding British Patent Application No. GB2210451.7.
Feb. 16, 2024 British Search Report, a copy of which is enclosed, that issued in British Patent Application No. GB2210460.8.
Sep. 8, 2023 GB Search Report, a copy of which enclosed, that issued in UK Patent Application No. GB2202906.0.
The Aug. 6, 2024 Indian Office Action, a copy of which is enclosed, that issued in Indian Patent Application No. 202244038781.
The above U.S. Patent Document was cited in a Jun. 28, 2023 Indian Examination Report, a copy of which is enclosed, that issued in Indian Patent Application No. 202244038781.
Nataniel Ruiz, et al., Fine-Grained Head Pose Estimation Without Keypoints, Georgia Institute of Technology, CVF, 2017 https://github.com/natanielruiz/deep-head-pose https://app.journal.ieice.org/trial/102_10/k102_10_987_2/index.html (Searched Mar. 7, 2022).
The above U.S. Patent Application Publications #1 and 2 and Foreign Patent Document #1 was cited in a Jan. 19, 2023 United Kingdom Search Report, a copy of which is enclosed, that issued in United Kingdom Patent Application No. 2210561.3.
The above Foreign Patent Document #2 was cited in a Jan. 23, 2023 United Kingdom Search Report, a copy of which is enclosed, that issued in United Kingdom Patent Application No. 2210451.7.
Sep. 20, 2023 United Kingdom Search Report, a copy of which is enclosed, that issued in the corresponding UK Patent Application No. 2202906.0.
The above patent document is cited in a United Kingdom Examination Report issued on Oct. 16, 2023, a copy of which is enclosed, that issued in the corresponding UK Patent Application No. GB2210554.8.
Jiang Han-qiong, et al., Real-time 3D display of binocular camera based on OpenGL; School of Information, University of Science and Technology of China; Instrumentation Technology, Issue Jun. 2012 (8 pages).
The above foreign patent documents and #1 Non-Patent Literature Documents were cited in the Oct. 15, 2024 Chinese Office Action, a copy of which is enclosed without an English Translation, that issued in Chinese Patent Application No. 202210248146.2.
The above Foreign Patent Documents were cited in a Korean Office Action that issued on May 29, 2025, which is enclosed, with an English translation, that issued in the corresponding Japanese Patent Application No. 10-2022-0081643.
The above foreign patent documents #1 and #2 were cited in the Jul. 9, 2025 Chinese Office Action, which is enclosed with an English Translation, that issued in Chinese Patent Application No. 202210909406.6.
The above foreign patent documents #2 and #3 were cited in the Jul. 10, 2025 Chinese Office Action, which is enclosed with an English Translation, that issued in Chinese Patent Application No. 202210906083.5.
The above foreign patent document #2 was cited in the Jul. 10, 2025 Chinese Office Action, which is enclosed with an English Translation, that issued in Chinese Patent Application No. 202210902586.5.
The above U.S. patent publication #1 and foreign patent documents #4, #5 and #6 were cited in the Jul. 26, 2025 Chinese Office Action, which is enclosed with an English Translation that issued in Chinese Patent Application No. 202210916812.5.
The above foreign patent documents were cited in the Aug. 11, 2025 Chinese Office Action, which is enclosed with an English Translation, that issued in Chinese Patent Application No. 202210248146.2.

\* cited by examiner

OBJECT

IMAGE ON
IMAGE SENSOR

DEVELOPMENT
AREA

EXTRACTION AND
DEVELOPMENT

AFTER DISTORTION
CORRECTION PROCESS

AFTER IMAGE
STABILIZATION

FIG. 24A

| TIME | t-5 | t-4 | t-3 | t-2 | t-1 | t |
|---|---|---|---|---|---|---|
| FACE DIRECTION | 0° | 15° | 30° | 45° | 60° | 60° |

FIG. 24B

| TIME | t-5 | t-4 | t-3 | t-2 | t-1 | t |
|---|---|---|---|---|---|---|
| FACE DIRECTION | 0° | -25° | -50° | -40° | -20° | 0° |

*FIG. 33A*          *FIG. 33B*
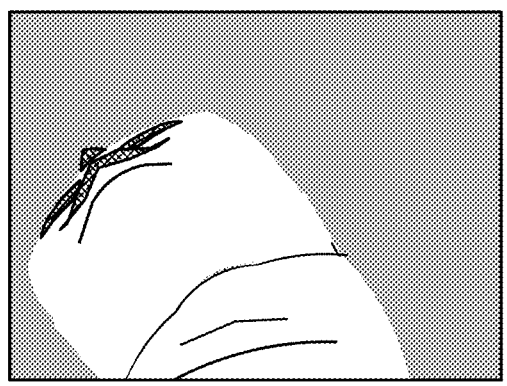
*FIG. 33C*

ANGLE BETWEEN W AND R
Δ = 23.38°

IMAGE PICKUP APPARATUS USED AS ACTION CAMERA, CONTROL METHOD THEREFOR, AND STORAGE MEDIUM STORING CONTROL PROGRAM THEREFOR

BACKGROUND OF THE INVENTION

Field of the Invention

The present invention relates to an image pickup apparatus used as an action camera, a control method therefor, and a storage medium storing a control program therefor.

Description of the Related Art

When a user picks up an image of an object with a camera, the user needs to continuously direct the camera toward the object. Accordingly, the user may find it difficult to manage actions other than an image pickup action because the user is busy in an image pickup operation. Further, the user may find it difficult to focus their attention on their immediate surroundings because the user must focus their attention on the image pickup operation.

For example, if the user is a parent, the user cannot play with a child while performing an image pickup operation with the child as the object, and the image pickup operation becomes impossible while playing with the child.

As a further example, if the user performs an image pickup operation while watching a sport game, the user cannot focus their attention on the game (e.g. cheer or remember game contents), and the image pickup operation becomes impossible while focusing attention to watch the sports game. Similarly, when a user performs an image pickup operation during group travel, the user cannot focus their attention on the travel experience to the same extent as other group members, and when the user gives priority to their travel experience, the image pickup operation suffers as a result.

As a method for solving these matters, methods have been contemplated wherein a camera is fixed to the head of the user using a fixing-to-head accessory to pick up an image in an observing direction. This enables the user to perform an image pickup operation without being occupied with the image pickup operation. Further, there is also contemplated a method that picks up an image in a wide area with an entire-celestial-sphere camera during experience. This enables a user to focus attention on their experience during an image pickup operation. After the experience, the user may extract a desired image part from picked-up entire-celestial-sphere image and edit it to obtain an image of the experience.

However, these methods need a troublesome action that equips the head with the fixing-to-head accessory 902 to which a main body of an action camera 901 is fixed as shown in FIG. 40A. Moreover, as shown in FIG. 40B, when the user equips the head with the action camera 901 with the fixing-to-head accessory 902, appearance is bad and also a hairstyle of the user is also disheveled. Furthermore, the user may feel uneasy about the existence of the fixing-to-head accessory 902 and the action camera 901 because of their weights and may worry about having a bad appearance to third persons. Accordingly, the user may find it difficult to perform an image pickup operation because the user cannot focus attention on their experience in the state shown in FIG. 40B or because the user feels resistance to the style shown in FIG. 40B.

In the meantime, the latter method needs series of operations, such as image conversion and extraction position designation. For example, an entire-celestial-sphere camera 903 equipped with a lens 904 and an image pickup button 905 as shown in FIG. 41 is known. The lens 904 is one of a pair of fish-eye lenses for picking up half-celestial-sphere images provided in both sides of a housing of the entire celestial sphere camera 903. The entire-celestial-sphere camera 903 picks up an entire-celestial-sphere image using these fish-eye lenses. Then, the entire celestial sphere image is obtained by combining projection images of the pair of fish-eye lenses.

FIG. 42A, FIG. 42B, and FIG. 42C are views showing examples of conversion processes of the image picked up by the entire-celestial-sphere camera 903.

FIG. 42A shows an example of the entire-celestial-sphere image obtained by the entire celestial sphere camera 903, and a user 906, a child 907, and a tree 908 are included as objects. Since this image is an entire-celestial-sphere image obtained by combining projection images of the pair of fish-eye lenses, the user 906 is distorted greatly. Moreover, since a body part of the child 907 who is the object that the user 906 wants to pick up is located in a peripheral part of a pickup area of the lens 904, the body part distorts greatly in the right and left directions, and is extended. In the meantime, since the tree 908 is the object located in front of the lens 904, the tree 908 is picked up without great distortion.

In order to generate an image of a visual field at which people are usually looking from the image shown in FIG. 42A, it is necessary to extract a part of the image, to perform plane conversion, and to display the converted image.

FIG. 42B is an image located in front of the lens 904 that is extracted from the image shown in FIG. 42A. In the image in FIG. 42B, the tree 908 is shown in the center in the visual field at which people are usually looking. However, since the image in FIG. 42B does not include the child 907 who the user 906 wants to pick up, the user has to change an extraction position. Specifically, in this case, it is necessary to move the extraction position leftward and downward by 30° from the tree 908 in FIG. 42A. FIG. 42C shows a displayed image that is obtained by extracting the moved position and by performing the plane conversion. In this way, in order to obtain the image in FIG. 42C that the user wants to pick up from the image in FIG. 42A, the user has to extract a necessary area and has to perform the plane conversion. Accordingly, although the user can focus attention on experience during the experience (during image pickup), there is a large subsequent workload for the user.

Japanese Laid-Open Patent Publication (Kokai) No. 2007-74033 (JP 2007-74033A) discloses a technique that uses a second camera that picks up a user in addition to a first camera that picks up an object. This technique calculates a moving direction and visual-line direction of a user from an image picked up by the second camera, determines an image pickup direction of the first camera, and picks up an image of an object estimated on the basis of user's viewpoint and state.

Japanese Laid-Open Patent Publication (Kokai) No. 2017-60078 (JP 2017-60078A) (Counterpart of US Patent Application 20170085841) discloses an image recording system including a sensor device that is attached to a user's head and an image pickup apparatus that is separately attached to a user's body or a bag. The sensor device consists of a gyro sensor or an acceleration sensor and detects a user's observation direction. The image pickup apparatus picks up an image in the observation direction detected by the sensor device.

However, since the second camera of JP 2007-74033A picks up an image of the user from a position distant from the user, the second camera needs high optical performance in order to calculate the moving direction and visual-line direction of the user from the image picked up by the second camera. Moreover, since high arithmetic processing capability is needed for processing the image picked up by the second camera, a scale of an apparatus becomes large. Furthermore, even if the high optical performance and the high arithmetic processing capability are satisfied, the user's observation direction cannot be precisely calculated. Accordingly, since an object that the user wants to pick up cannot be estimated with sufficient accuracy on the basis of the user's viewpoint and state, an image other than what is wanted by the user may be picked up.

Moreover, since the sensor device of JP 2017-60078A directly detects a user's observation direction, the user needs to equip the head with the sensor device, which cannot solve troublesomeness in attaching any device to the head as mentioned above. Moreover, when the sensor device consists of a gyro sensor or an acceleration sensor, certain accuracy can be obtained in detection of a relative observation direction. However, since accuracy of detection of an absolute observation direction, especially in the horizontal rotation direction, cannot be obtained, there is an issue in a practical application.

SUMMARY OF THE INVENTION

The present invention provides an image pickup apparatus, a control method therefor, and a storage medium storing a control program therefor, which eliminate manual change of an image pickup direction during an image pickup operation, and which can easily obtain an image that records an experience while allowing a user to focus attention on the experience.

Accordingly, an aspect of the present invention provides an image pickup apparatus including an image pickup unit configured to pick up a wide-angle image, a face direction detection unit configured to detect a direction of a face of a user, a user movement detection unit configured to detect a movement of the user, a memory device that stores a set of instructions, and at least one processor that executes the set of instructions to detect at least one of movements including a vertical movement of the face and a horizontal movement of the face based on an output of the face direction detection unit, determine at least one of extraction conditions including a position and a size of an extraction image extracted from the wide-angle image based on the direction of the face detected, the at least one of movements detected, and a detection result of the user movement detection unit, and extract the extraction image from the wide angle image with the at least one of extraction conditions determined.

According to the present invention, manual change of an image pickup direction during an image pickup operation becomes unnecessary, and an image that records experience can be easily obtained while allowing a user to focus attention on the experience.

Further features of the present invention will become apparent from the following description of exemplary embodiments with reference to the attached drawings.

BRIEF DESCRIPTION OF THE DRAWINGS

FIG. 24A and FIG. 24B are schematic views showing changes of the face direction.

FIG. 33A through FIG. 33C are schematic views showing examples of learning images.

DESCRIPTION OF THE EMBODIMENTS

Figure 1A:
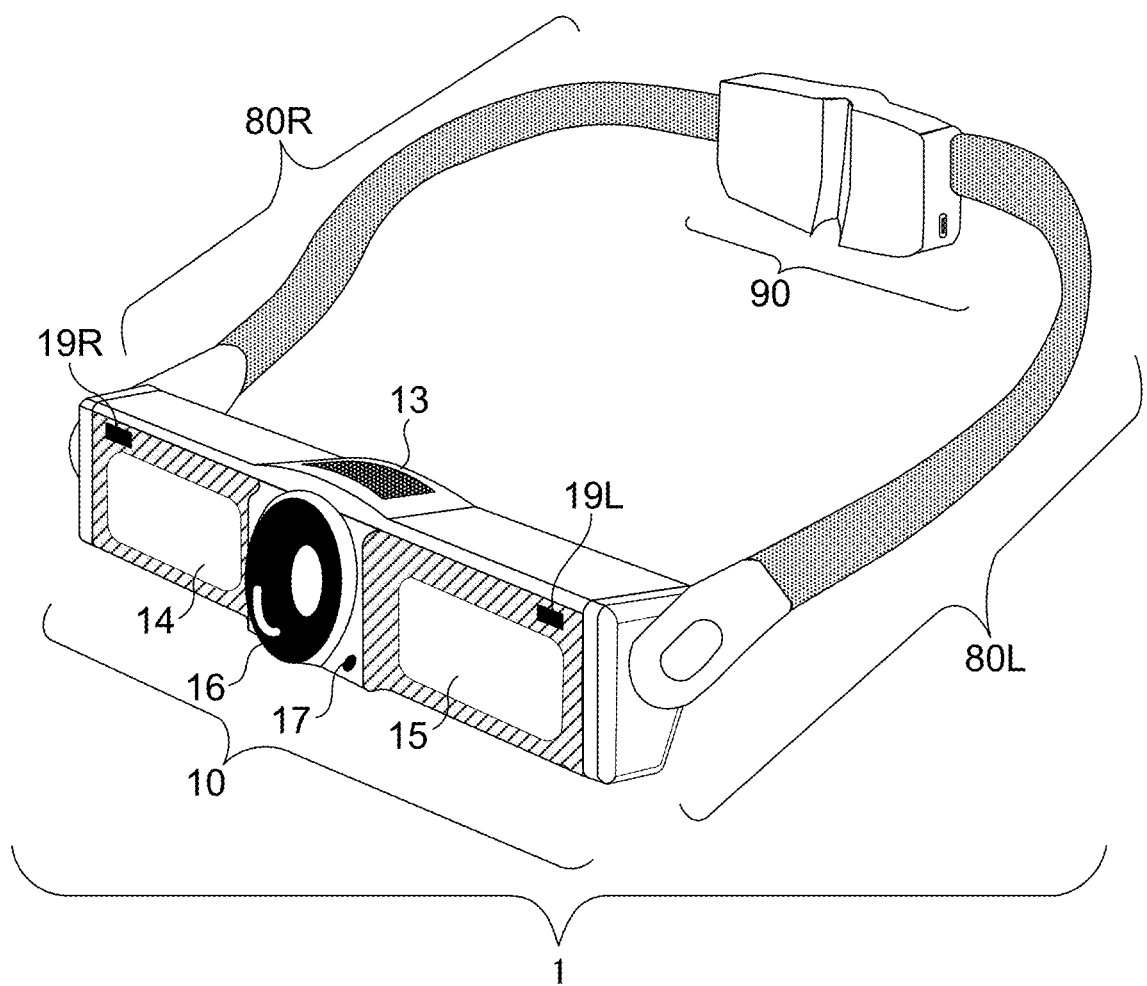
FIG. 1A is an external view showing a camera body including an image-pickup/detection unit as an image pickup apparatus according to a first embodiment.

Hereafter, embodiments according to the present invention will be described in detail by referring to the drawings.

FIG. 1A through FIG. 1D are views for describing a camera system consisting of a camera body 1 and a display apparatus 800 that is separated from the camera body 1. The camera body 1 includes an image-pickup/detection unit 10 as a wearable image pickup apparatus according to a first embodiment. Although the camera body 1 and the display apparatus 800 are separated devices in this embodiment, they may be integrated.

FIG. 1A is an external view showing the camera body 1. The camera body 1 is provided with the image-pickup/detection unit 10, a battery unit (power source unit) 90, a right connection member 80R, and a left connection member 80L as shown in FIG. 1A. The right connection member 80R connects the image-pickup/detection unit 10 and the battery unit 90 on the right side of a user's body (left side in FIG. 1A). The left connection member 80L connects the image-pickup/detection unit 10 and the battery unit 90 on the left side of the user's body (right side in FIG. 1A).

The image-pickup/detection unit 10 is provided with a face direction detection window 13, a start switch 14, a stop switch 15, an image pickup lens 16, an LED 17, and microphones 19L and 19R.

The face direction detection window 13 permits transmission of infrared light projected from infrared LEDs 22 (FIG. 5, an infrared radiation unit) built in the image-pickup/detection unit 10 to detect positions of face parts of the user. The face direction detection window 13 also permits transmission of reflected infrared light from the face.

The start switch 14 is used to start an image pickup operation. The stop switch 15 is used to stop the image pickup operation. The image pickup lens 16 guides light to be picked up to a solid state image sensor 42 (FIG. 5) inside the image-pickup/detection unit 10. The LED 17 indicates a state that the image pickup operation is on-going. Additionally or alternatively, the LED 17 can function as a warning light.

The microphones 19R and 19L take in peripheral sound. The microphone 19L takes in sound of the left side of user's periphery (right side in FIG. 1A). The microphone 19R takes in sound of the right side of the user's periphery (left side in FIG. 1A).

Figure 1B:
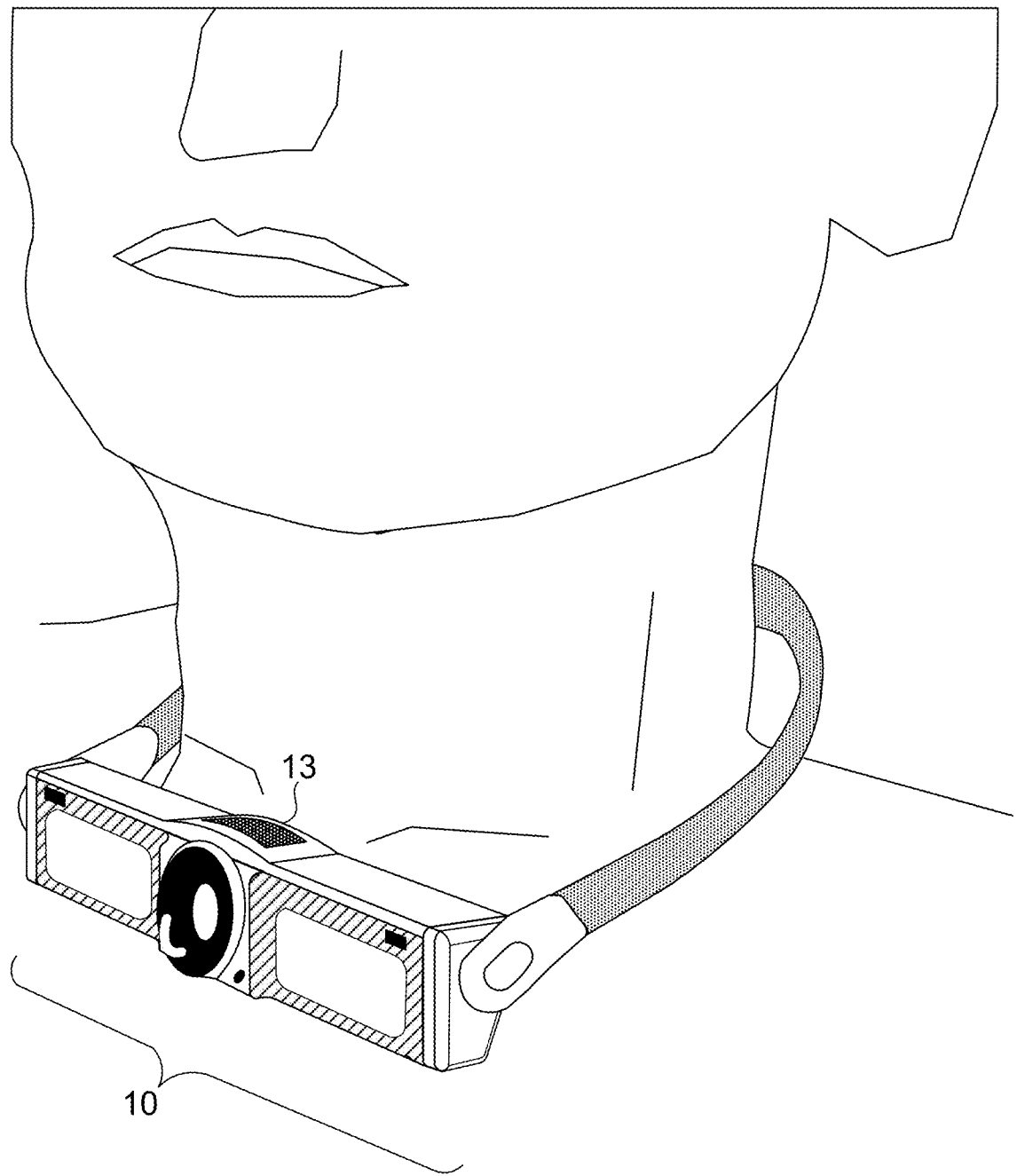
FIG. 1B is a view showing a state where a user wears the camera body.

FIG. 1B is a view showing a state where the user wears the camera body 1.

When the user wears the camera body 1 so that the battery unit 90 is located proximate to a user's back side and the image-pickup/detection unit 10 is located proximate to the front side of the user's body, the image-pickup/detection unit 10 is supported while being energized in a direction toward a chest by the left and right connection members 80L and 80R that are respectively connected to the left and right ends of the image-pickup/detection unit 10. Thereby, the image-pickup/detection unit 10 is positioned in front of clavicles of the user. At this time, the face direction detection window 13 is located under a jaw of the user. An infrared condenser lens 26 shown in FIG. 2E mentioned later is arranged inside the face direction detection window 13. An optical axis (detection optical axis) of the infrared condenser lens 26 is directed to the user's face and is directed to a different direction from an optical axis (image pickup optical axis) of the image pickup lens 16. A face direction detection unit 20 (see FIG. 5) including the infrared condenser lens 26 detects a user's observation direction (a face direction) on the basis of the positions of face parts (a face direction detection step). This enables an image pickup unit 40 mentioned later to pick up an image of an object in the observation direction. Adjustment of the setting position due to individual difference of a body shape and difference in clothes will be mentioned later.

Moreover, since the image-pickup/detection unit 10 is arranged in the front side of the body and the battery unit 90 is arranged in the back face in this way, weight of the camera body 1 is distributed, which reduces user's fatigue and reduces displacement of the camera body 1 due to forces on the camera body 1 caused by movement of the user.

Although the example in which the user wears the camera body 1 so that the image-pickup/detection unit 10 will be located in front of the clavicles of the user is described in this embodiment, this example is not imperative. That is, the user may wear the camera body 1 in any position of the user's body other than the head as long as the camera body 1 can detect the user's observation direction and the image pickup unit 40 can pick up an image of an object in the observation direction.

Figure 1C:
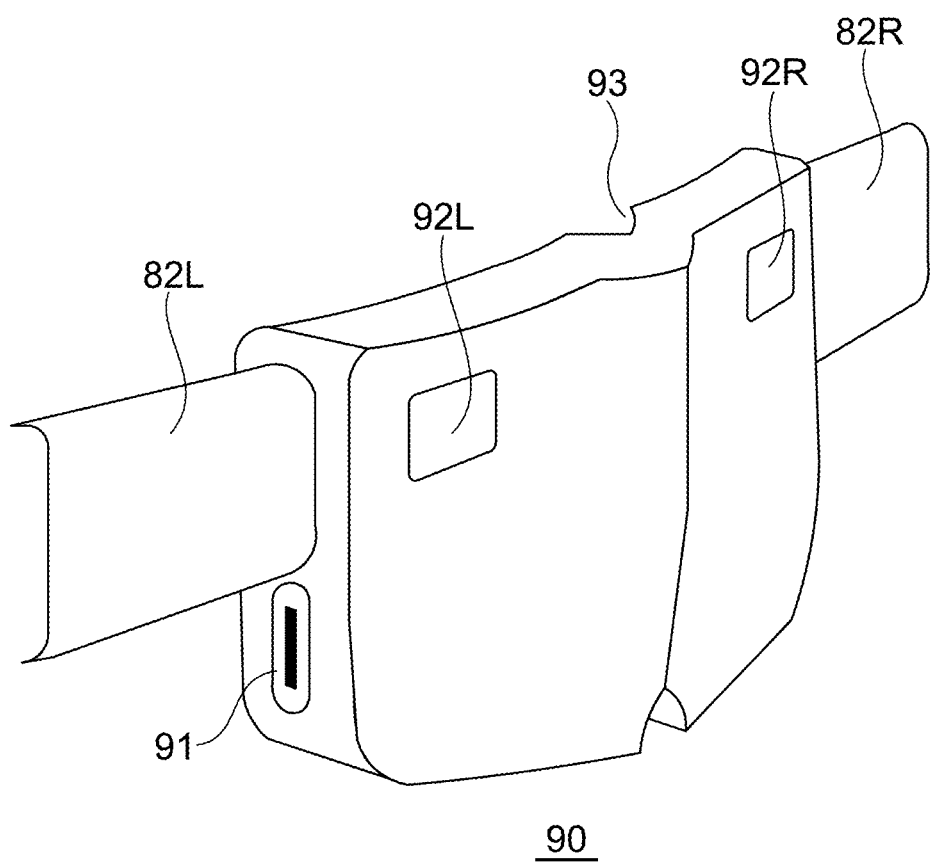
FIG. 1C is a view showing a battery unit in the camera body viewed from a rear side in FIG. 1A.

FIG. 1C is a view showing the battery unit 90 viewed from a rear side in FIG. 1A. The battery unit 90 is provided with a charge cable inserting slot 91, adjustment buttons 92L and 92R, and a backbone escape cutout 93 as shown in FIG. 1C.

A charge cable (not shown) can be connected to the charge cable inserting slot 91. An external power source charges internal batteries 94L and 94R (see FIG. 3A) and supplies electric power to the image-pickup/detection unit 10 through the charge cable.

Adjustment buttons 92L and 92R are used to adjust the respective lengths of the band parts 82L and 82R of the left and right connection members 80L and 80R. The adjustment button 92L is used to adjust the left band part 82L, and the adjustment button 92R is used to adjust the right band part 82R. Although the lengths of the band parts 82L and 82R are independently adjusted with the adjustment buttons 92L and 92R in the embodiment, the lengths of the band parts 82L and 82R may be simultaneously adjusted with one button.

The backbone escape cutout 93 is formed by shaping the battery unit 90 so that the battery unit 90 will not touch the backbone. Since the backbone escape cutout 93 avoids a convex part of the backbone of the body, displeasure of wearing is reduced and lateral displacement of the battery unit 90 is prevented.

Figure 1D:
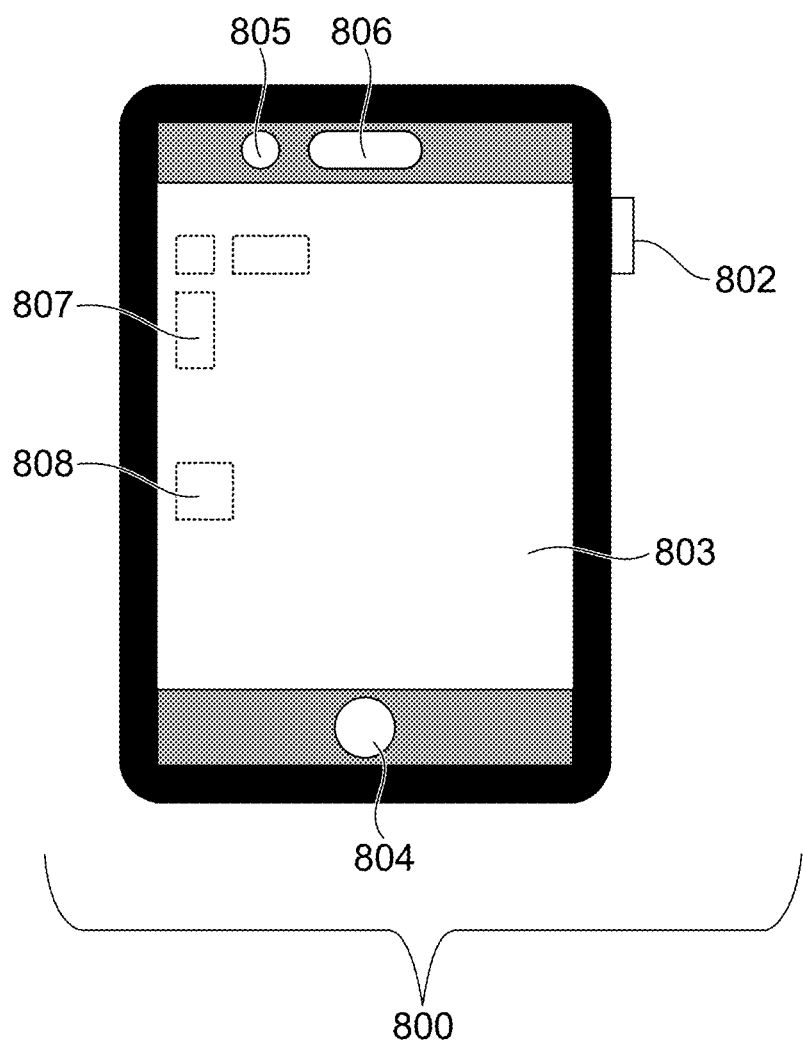
FIG. 1D is an external view showing a display apparatus as a portable device according to the first embodiment that is separated from the camera body.

FIG. 1D is an external view showing the display apparatus 800 as a portable device according to the first embodiment that is separated from the camera body 1. As shown in FIG. 1D, the display apparatus 800 is provided with an A-button 802, a display unit 803, a B-button 804, an in-camera 805, a face sensor 806, an angular speed sensor 807, and an acceleration sensor 808. Moreover, the display apparatus 800 is provided with a wireless LAN unit (not shown in FIG. 1D) that enables high-speed connection with the camera body 1.

The A-button 802 has a function of a power button of the display apparatus 800. The display apparatus 800 receives an ON/OFF operation by a long press of the A-button 802 and receives a designation of another process timing by a short press of the A-button 802.

The display unit 803 is a display control unit that can display images (a fish-eye image, and a wide-angle image) picked up by the camera body 1 to be checked by a user and can display a menu screen required for setting to be checked by the user. In this embodiment, a transparent touch sensor that is provided on the surface of the display unit 803 receives a touch operation to a screen (for example, a menu screen) that is displaying.

The B-button 804 functions as a calibration button 854 used for a calibration process mentioned later. The in-camera 805 can pick up an image of a person who is observing the display apparatus 800.

The face sensor 806 detects a face shape and an observation direction of the person who is observing the display apparatus 800. A concrete configuration of the face sensor 806 is not limited. For example, a structural optical sensor, a ToF (Time of Flight) sensor, and a millimeter wave radar may be employed.

Since the angular speed sensor 807 is built in the display apparatus 800, it is shown by a dotted line as a meaning of a perspective view. Since the display apparatus 800 of this embodiment is also provided with a function of the calibrator mentioned later, a triaxial gyro sensor that enables detection in X, Y, and Z directions is mounted. The acceleration sensor 808 detects a posture of the display apparatus 800.

It should be noted that a general smart phone is employed as the display apparatus 800 according to this embodiment. The camera system of the embodiment is achieved by matching firmware in the smart phone to firmware of the camera body 1. In the meantime, the camera system of the embodiment can be achieved by matching the firmware of the camera body 1 to an application and OS of the smart phone as the display apparatus 800.

FIG. 2A through FIG. 2F are views describing the image-pickup/detection unit 10 in detail. In views from FIG. 2A, a component that has the same function of a part that has been already described is indicated by the same reference numeral and its description in this specification is omitted.

Figure 2A:
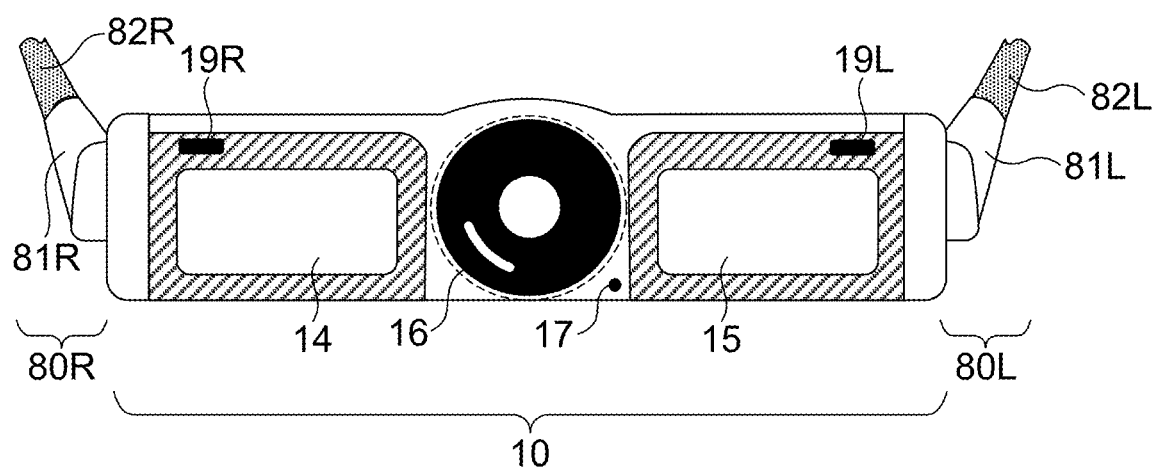
FIG. 2A is a front view showing the image-pickup/detection unit in the camera body.

FIG. 2A is a front view showing the image-pickup/detection unit 10.

The right connection member 80R has the band part 82R and an angle-holding member 81R of hard material that holds an angle with respect to the image-pickup/detection unit 10. The left connection member 80L has the band part 82L and an angle-holding member 81L similarly.

Figure 2B:
FIG. 2B is a view showing a shape of a band part of a connection member in the camera body.

FIG. 2B is a view showing the shapes of the band parts 82L and 82R of the left and right connection members 80L and 80R. In FIG. 2B, the angle holding members 81L and 81R are shown as transparent members in order to show the shapes of the band parts 82L and 82R.

The band part 82L is provided with a left connecting surface 83L and an electric cable 84 that are arranged at the left side of the user's body (right side in FIG. 2B) when the user wears the camera body 1. The band part 82R is provided with a right connecting surface 83R arranged at the right side of the user's body (left side in FIG. 2B) when the user wears the camera body 1.

The left connecting surface 83L is connected with the angle holding member 81L, and its sectional shape is an ellipse but is not a perfect circle. The right connecting surface 83R also has a similar elliptical shape. The right connecting surface 83R and left connecting surface 83L are arranged bisymmetrically in a reverse V-shape. That is, the distance between the right connecting surface 83R and the left connecting surface 83L becomes shorter toward the upper side from the lower side in FIG. 2B. Thereby, since the long axis directions of the left and right connecting surfaces 83L and 83R match the user's body when the user hangs the camera body 1, the band parts 82L and 82R touch the user's body comfortably and movement of the image-pickup/detection unit 10 in the left-and-right direction and front-and-back direction can be prevented.

The electric cable (a power supply member) 84 is wired inside the band part 82L and electrically connects the battery unit 90 and the image-pickup/detection unit 10. The electric cable 84 connects the power source of the battery unit 90 to the image-pickup/detection unit 10 or transfers an electrical signal with an external apparatus.

Figure 2C:
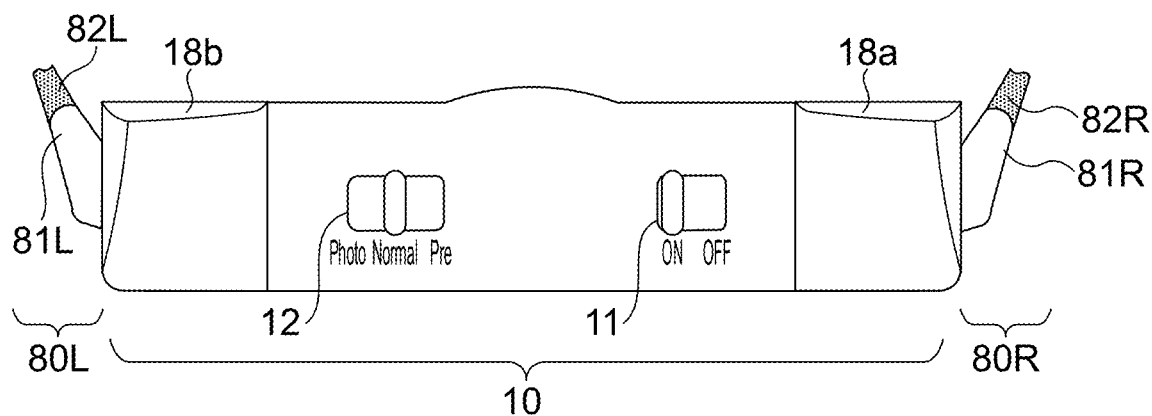
FIG. 2C is a rear view showing the image-pickup/detection unit.

FIG. 2C is a rear view showing the image-pickup/detection unit 10. FIG. 2C shows the side that contacts to the user's body. That is, FIG. 2C is a view viewed from the opposite side of FIG. 2A. Accordingly, the positional relationship between the right connection member 80R and the left connection member 80L is reverse to FIG. 2A.

The image-pickup/detection unit 10 is provided with a power switch 11, an image pickup mode switch 12, and chest contact pads 18*a* and 18*b* at the back side. The power switch 11 is used to switch ON/OFF of the power of the camera body 1. Although the power switch 11 of this embodiment is a slide lever type, it is not limited to this. For example, the power switch 11 may be a push type switch or may be a switch that is integrally constituted with a slide cover (not shown) of the image pickup lens 16.

The image pickup mode switch (a change member) 12 is used to change an image pickup mode, i.e., is used to change a mode in connection with an image pickup operation. In this embodiment, the image pickup mode switch 12 can select the image pickup mode from among a still image mode, a video image mode, and a below-mentioned preset mode that is set using the display apparatus 800. In this embodiment, the image pickup mode switch 12 is a slide lever switch that can select one of "Photo", "Normal", and "Pre" shown in FIG. 2C. The image pickup mode shifts to the still image mode by sliding to "Photo", shifts to the video image mode by sliding to "Normal", and shifts to the preset mode by sliding to "Pre". It should be noted that the configuration of the image pickup mode switch 12 is not limited to the embodiment as long as the switch can change the image pickup mode. For example, the image pickup mode switch 12 may consist of three buttons of "Photo", "Normal", and "Pre".

The chest contact pads (fixing members) 18*a* and 18*b* touch the user's body when the image-pickup/detection unit 10 is energized. As shown in FIG. 2A, the image-pickup/detection unit 10 is formed so that a lateral (left-and-right) overall length will become longer than a vertical (up-and-down) overall length in wearing the camera body 1. The chest contact pads 18*a* and 18*b* are respectively arranged in vicinities of right and left ends of the image-pickup/detection unit 10. This arrangement reduces rotational blur in the left-and-right direction during the image pickup operation of the camera body 1.

Moreover, the chest contact pads 18*a* and 18*b* prevent the power switch 11 and the image pickup mode switch 12 from touching the user's body. Furthermore, the chest contact pads 18*a* and 18*b* prevent heat transmission to the user's body even if the image-pickup/detection unit 10 heats up due to a long-time image pickup operation and are used for the adjustment of the angle of the image-pickup/detection unit 10.

Figure 2D:
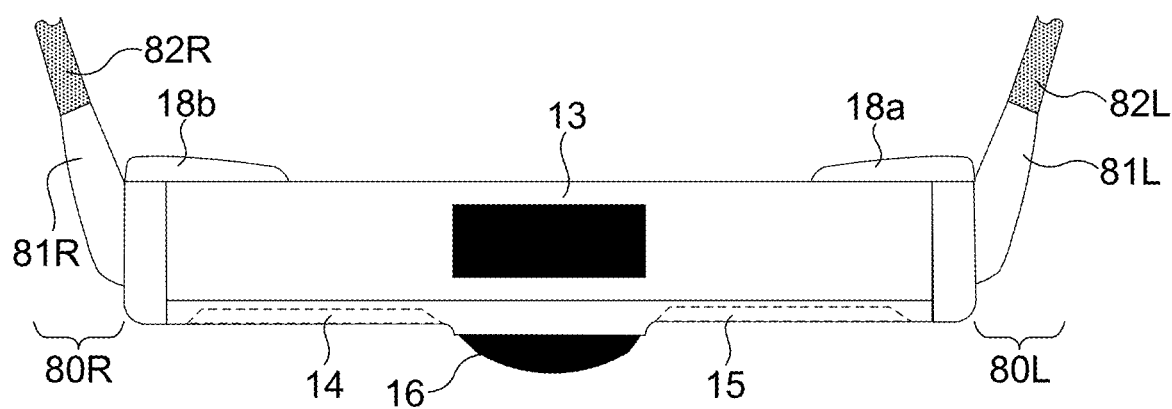
FIG. 2D is a top view showing the image-pickup/detection unit.

FIG. 2D is a top view showing the image-pickup/detection unit 10. As shown in FIG. 2D, the face direction detection window 13 is provided in the central part of the top surface of the image-pickup/detection unit 10, and the chest contact pads 18*a* and 18*b* are projected from the image-pickup/detection unit 10.

Figure 2E:
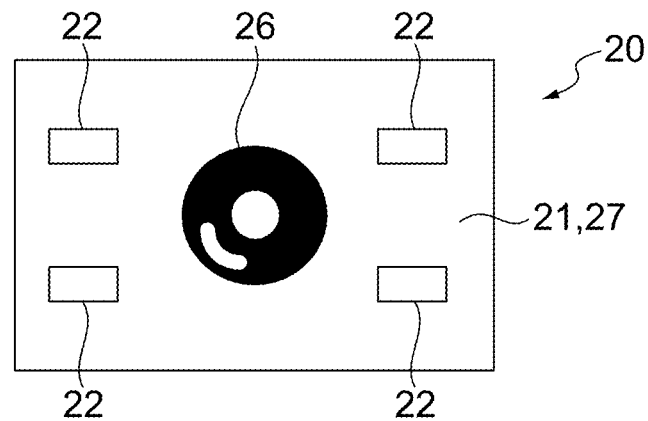
FIG. 2E is a view showing a configuration of a face direction detection unit arranged inside the image-pickup/detection unit and under a face direction detection window in the camera body.

FIG. 2E is a view showing a configuration of the face direction detection unit 20 arranged inside the image-pickup/detection unit 10 and under the face direction detection window 13. The face direction detection unit 20 is provided with the infrared LEDs 22 and the infrared condenser lens 26. The face direction detection unit 20 is also provided with an infrared LED lighting circuit 21 and an infrared detection device 27 shown in FIG. 5 mentioned later.

The infrared LEDs 22 project infrared light 23 (FIG. 5) toward the user. The infrared condenser lens 26 images reflected light 25 (FIG. 5) from the user in projecting the infrared light 23 from the infrared LEDs 22 onto a sensor (not shown) of the infrared detection device 27.

Figure 2F:
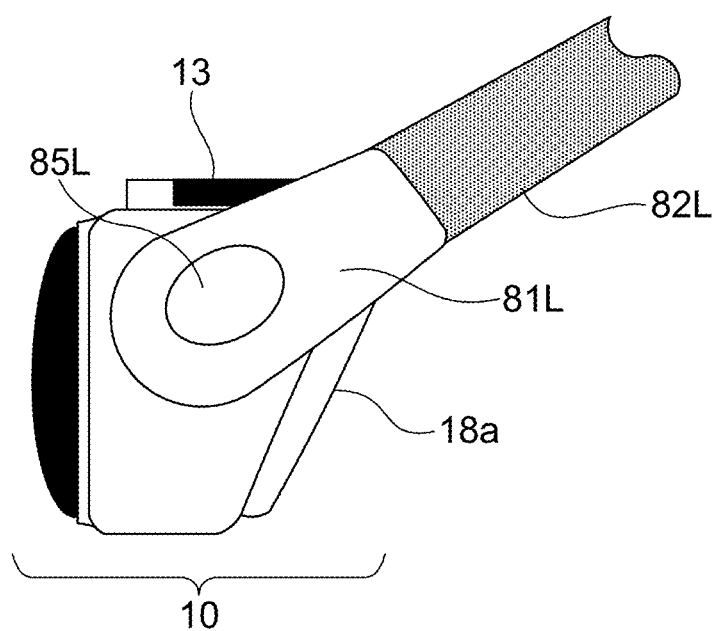
FIG. 2F is a view showing a state where a user wears the camera body viewed from a left side of the user.

FIG. 2F is a view showing a state where a user wears the camera body 1 viewed from the left side of the user.

An angle adjustment button 85L is provided in the angle holding member 81L and is used in adjusting the angle of the image-pickup/detection unit 10. An angle adjustment button (not shown in FIG. 2F) is provided in the opposite angle holding member 81R in the symmetrical position of the angle adjustment button 85L. Although the angle adjustment buttons are actually visible in FIG. 2A, FIG. 2C, and FIG. 2D, they are omitted to simplify the description.

When moving the angle holding member 81L upwardly or downwardly in FIG. 2F while pressing the angle adjustment button 85L, the user can change the angle between the image-pickup/detection unit 10 and the angle holding member 81L. The right side is the same as the left side. Moreover, projection angles of the chest contact pads 18*a* and 18*b* can be changed. The functions of these two kinds of angle change members (the angle adjustment buttons and chest contact pads) can adjust the image-pickup/detection unit 10 so as to keep the optical axis of the image pickup lens 16 horizontally irrespective of individual difference of a chest position shape.

Figure 3A:
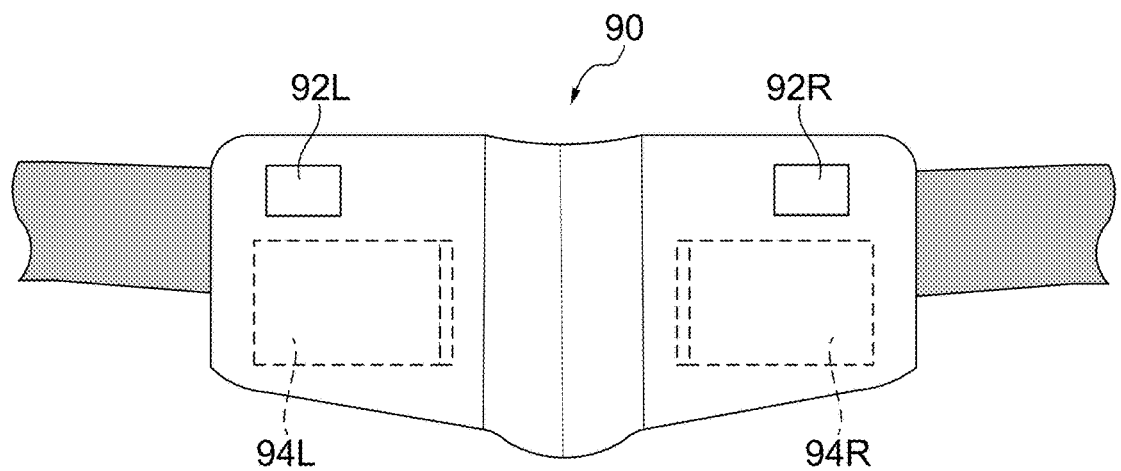
FIG. 3A, FIG. 3B, and FIG. 3C are views showing details of the battery unit.
Figure 3B:
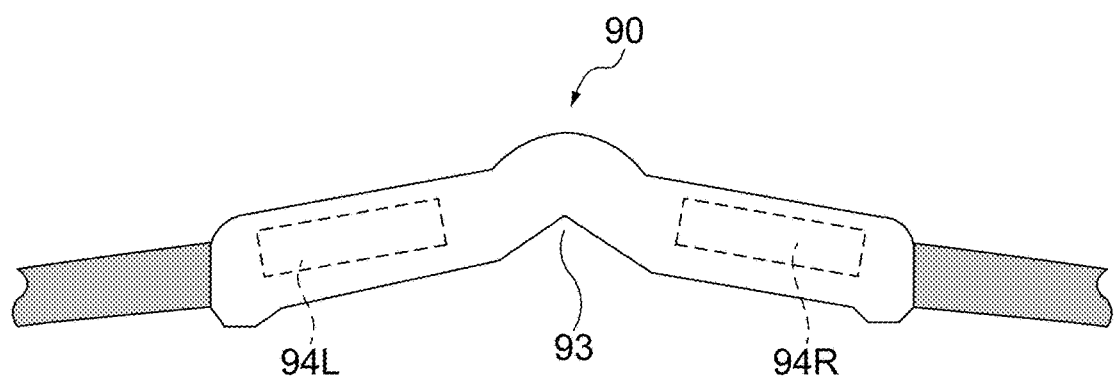
Figure 3C:
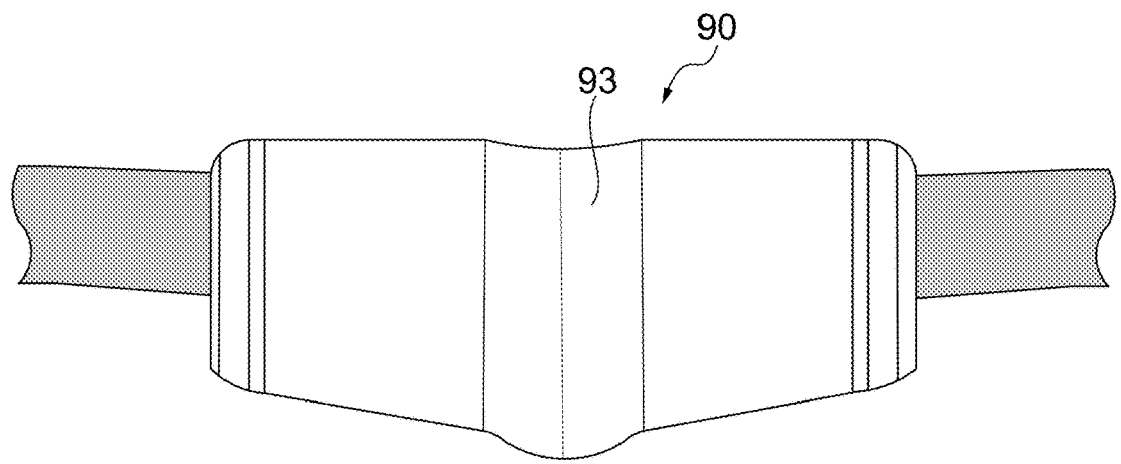

FIG. 3A, FIG. 3B, and FIG. 3C are views showing details of the battery unit 90. FIG. 3A is a partially transparent back view showing the battery unit 90.

As shown in FIG. 3A, the left battery 94L and right battery 94R are symmetrically mounted inside the battery unit 90 in order to keep weight balance. In this way, since the left and right batteries 94L and 94R are arranged symmetrically with the central part of the battery unit 90, the weight balance in the left-and-right direction is achieved and the position displacement of the camera body 1 is prevented. It should be noted that the battery unit 90 may mount a single battery.

FIG. 3B is a top view showing the battery unit 90. The batteries 94L and 94R are shown as the transparent members also in FIG. 3B. As shown in FIG. 3B, since the batteries 94L and 94R are symmetrically arranged at both the sides of the backbone escape cutout 93, the user can wear the battery unit 90 that is relatively heavy without any burden.

FIG. 3C is a rear view showing the battery unit 90. FIG. 3C is the view viewed from the side touched to the user's body, i.e., is the view viewed from the opposite side of FIG. 3A. As shown in FIG. 3C, the backbone escape cutout 93 is provided in the center along the backbone of the user.

Figure 4:
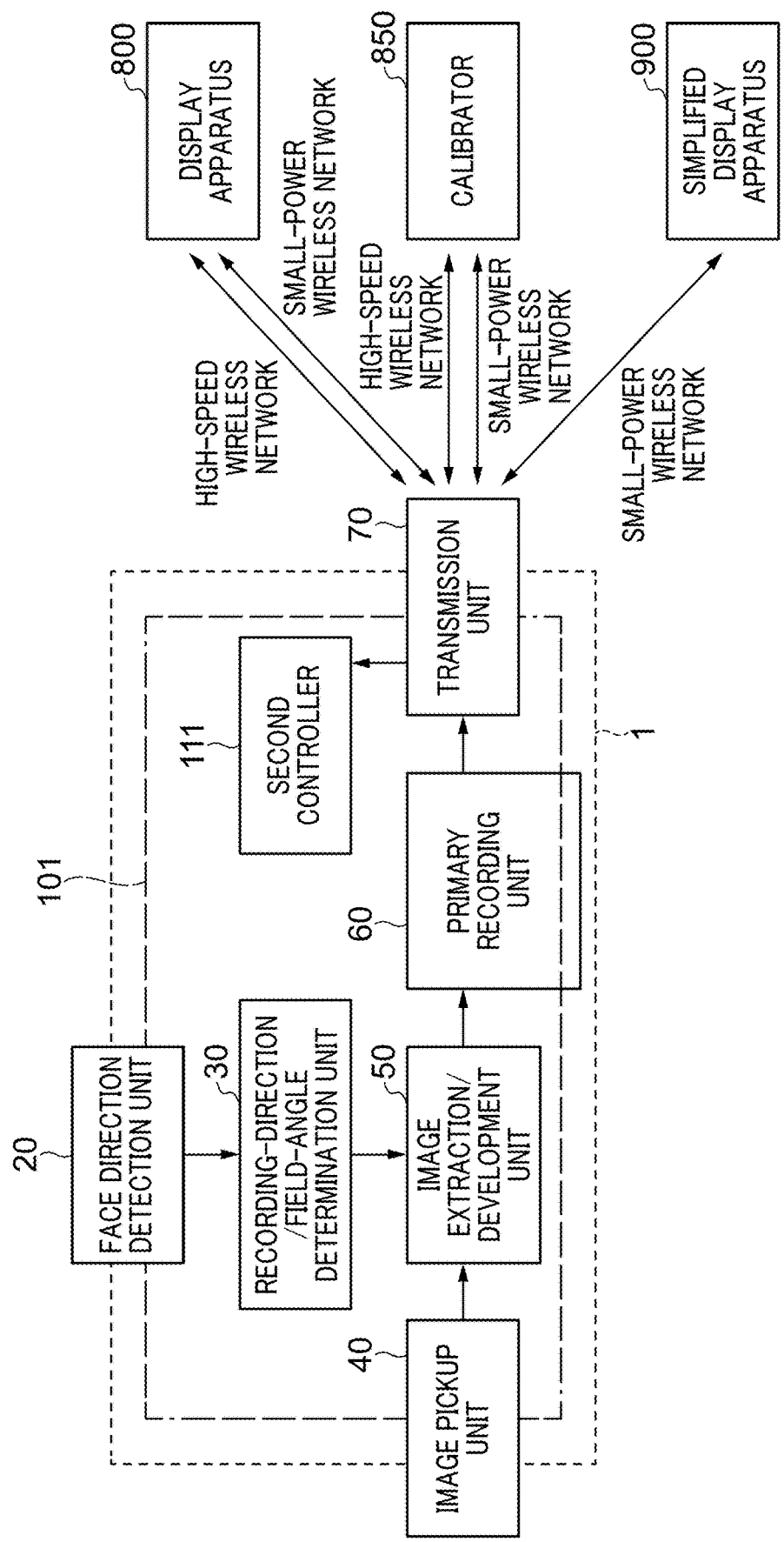
FIG. 4 is a functional block diagram showing the camera body according the first embodiment.

FIG. 4 is a functional block diagram showing the camera body 1. Hereinafter, the process executed by the camera body 1 will be described roughly using FIG. 4. Details will be mentioned later.

As shown in FIG. 4, the camera body 1 is provided with the face direction detection unit 20, a recording-direction/field-angle determination unit 30, the image pickup unit 40, an image extraction/development unit 50, a primary recording unit 60, a transmission unit 70, and a second controller 111. These functional blocks are achieved by control of an overall control CPU 101 (FIG. 5) that controls the entire camera body 1.

The face direction detection unit 20 (an observation direction detection unit) is a functional block executed by the above-mentioned infrared LEDs 22, the infrared detection device 27, etc. The face direction detection unit 20 estimates an observation direction by detecting the face direction and passes the observation direction to the recording-direction/field-angle determination unit 30.

The recording-direction/field-angle determination unit (a recording direction determination unit) 30 determines information about a position and an area that will be extracted from an image picked up by the image pickup unit 40 by performing various calculations on the basis of the observation direction estimated by the face direction detection unit 20. And then, this information is passed to the image extraction/development unit (an extraction unit) 50. In this way, the recording-direction/field-angle determination unit 30 is an extraction area determination unit that determines an extraction condition of an extraction image extracted from a fish-eye image picked up by the image pickup unit 40 (an image pickup step) on the basis of the face direction detected by the face direction detection unit 20. Then, the extraction condition determined by the extraction area determination unit (an extraction area determination step) includes at least one of a position and size of the extraction image.

The image pickup unit 40 forms a wide-angle image of the object and passes the image to the image extraction/development unit 50.

The image extraction/development unit (a development unit) 50 extracts an image (extraction image) that the user looks at from the image passed from the image pickup unit 40 by using the information passed from the recording-direction/field-angle determination unit 30. Then, the image extraction/development unit 50 develops the extraction image and passes the developed image to the primary recording unit 60.

The primary recording unit 60 is a functional block constituted by a primary memory 103 (FIG. 5) etc., records image information, and passes the image information to the transmission unit 70 at a required timing. In this way, the primary recording unit 60 functions as an extraction image storage unit holding an extraction image.

The transmission unit 70 is wirelessly connected with predetermined communication parties, such as the display apparatus 800 (FIG. 1D), a calibrator 850, and a simplified display apparatus 900, and communicates with these parties.

The display apparatus 800 is connectable to the transmission unit 70 through a high-speed wireless LAN (hereinafter referred to as a "high-speed wireless network"). In this embodiment, the high-speed wireless network employs wireless communication corresponding to the IEEE802.11ax (WiFi 6) standard. In the meantime, wireless communication corresponding to other standards, such as the WiFi 4 standard and the WiFi 5 standard, may be employed. Moreover, the display apparatus 800 may be a dedicated apparatus developed for the camera body 1 or may be a general smart phone, a tablet terminal, etc.

In addition, the display apparatus 800 may be connected to the transmission unit 70 through a small-power wireless network, may be connected through both the high-speed wireless network and small-power wireless network, or may be connected while switching the networks. In this embodiment, large amount data like an image file of a video image mentioned later is transmitted through the high-speed wireless network, and small amount data and data that does not need quick transmission are transmitted through the small-power wireless network. Although the Bluetooth is used for the small-power wireless network in this embodiment, other short-distance wireless communications, such as the NFC (Near Field Communication), may be employed.

The calibrator 850 performs initial setting and individual setting of the camera body 1, and is connectable to the transmission unit 70 through the high-speed wireless network in the same manner as the display apparatus 800. Details of the calibrator 850 are mentioned later. Moreover, the display apparatus 800 may have the function of the calibrator 850.

The simplified display apparatus 900 is connectable to the transmission unit 70 only through the small-power wireless network, for example. Although the simplified display apparatus 900 cannot perform communication of a video image with the transmission unit 70 due to time restriction, it can transmit an image pickup start/stop timing and can be used for an image check of a composition check level. Moreover, the simplified display apparatus 900 may be a dedicated apparatus developed for the camera body 1 as well as the display apparatus 800 or may be a smart watch etc.

Figure 5:
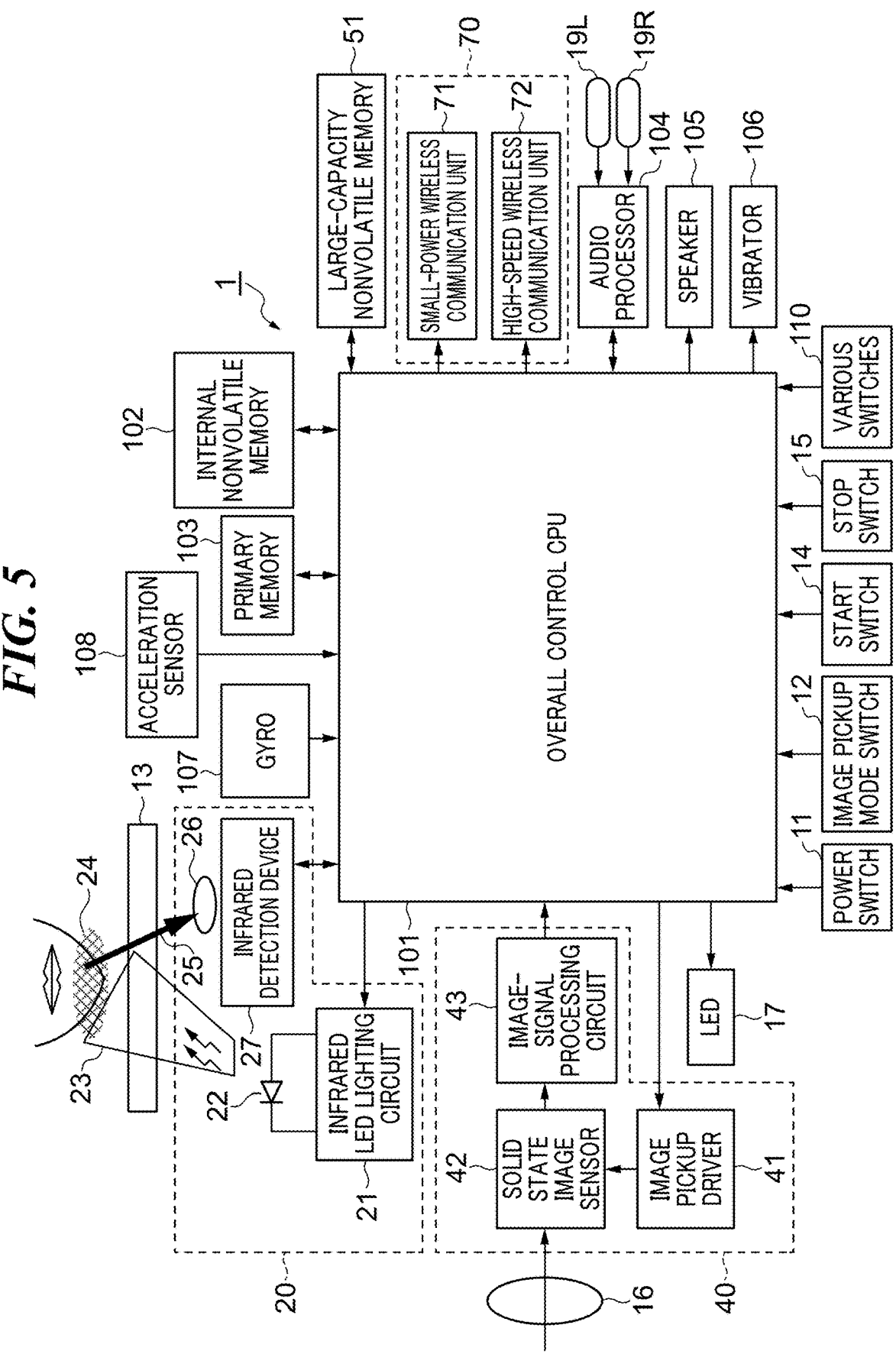
FIG. 5 is a block diagram showing a hardware configuration of the camera body according to the first embodiment.

FIG. 5 is a block diagram showing a hardware configuration of the camera body 1. Moreover, the configurations and functions described using FIG. 1A through FIG. 1C are indicated by the same reference numerals and their detailed descriptions will be omitted.

As shown in FIG. 5, the camera body 1 is provided with the overall control CPU 101, power switch 11, image pickup mode switch 12, face direction detection window 13, start switch 14, stop switch 15, image pickup lens 16, and LED 17.

The camera body 1 is further provided with the infrared LED lighting circuit 21, infrared LEDs 22, infrared condenser lens 26, and infrared detection device 27 that constitute the face direction detection unit 20 (FIG. 4).

Moreover, the camera body 1 is provided with the image pickup unit 40 (FIG. 4), which consists of an image pickup driver 41, a solid state image sensor 42, and an image signal processing circuit 43, and the transmission unit 70 (FIG. 4), which consists of a small-power wireless communication unit 71 and high-speed wireless communication unit 72.

Although the camera body 1 has the single image pickup unit 40 in this embodiment, it may have two or more image pickup units in order to pick up a 3D image or to pick up images of different directions.

The camera body 1 is provided with various memories, such as a large-capacity nonvolatile memory 51, an internal nonvolatile memory 102, the primary memory 103, etc.

Furthermore, the camera body 1 is provided with an audio processor 104, a speaker 105, a vibrator 106, a gyro 107, an acceleration sensor 108, and various switches 110.

The switches like the power switch 11, which are described above using FIG. 2C, are connected to the overall control CPU 101. The overall control CPU 101 controls the entire camera body 1. The recording-direction/field-angle determination unit 30, image extraction/development unit 50, and second controller 111 in FIG. 4 are achieved by the overall control CPU 101.

The infrared LED lighting circuit 21 controls lighting of the infrared LEDs 22 described above using FIG. 2E to control projection of the infrared light 23 directed to the user from the infrared LEDs 22.

The face direction detection window 13 is constituted by a visible light cut filter that hardly permits transmission of visible light and sufficiently permits transmission of the infrared light 23 and its reflected light 25 that belong to infrared region. The infrared condenser lens 26 condenses the reflected light 25.

The infrared detection device (an infrared detection unit) 27 has a sensor that detects the reflected light 25 condensed by the infrared condenser lens 26. The sensor converts an image formed by the condensed reflected light 25 into sensor data and passes the sensor data to the overall control CPU 101.

As shown in FIG. 1B, when the user wears the camera body 1, the face direction detection window 13 is located under a user's jaw. Accordingly, as shown in FIG. 5, the infrared light 23 projected from the infrared LEDs 22 transmits the face direction detection window 13 and irradiates an infrared irradiation surface 24 near the user's jaw. Moreover, the reflected light 25 reflected from the infrared irradiation surface 24 transmits the face direction detection window 13 and is condensed by the infrared condenser lens 26 onto the sensor in the infrared detection device 27.

The various switches 110 are not shown in FIG. 1A through FIG. 1C. The various switches 110 are used to execute functions that are unrelated to this embodiment.

The image pickup driver 41 includes a timing generator etc., generates various timing signals, outputs the timing signals to sections related to the image pickup operation, and drives the solid state image sensor 42.

The solid state image sensor 42 outputs the signal obtained by photoelectric conversion of the object image formed through the image pickup lens 16 described using FIG. 1A to the image signal processing circuit 43.

The image signal processing circuit 43 outputs picked-up image data, which is generated by applying a clamp process and an A/D conversion process, etc. to the signal from the solid state image sensor 42, to the overall control CPU 101.

The internal nonvolatile memory 102 is constituted by a flash memory etc. and stores a boot program of the overall control CPU 101 and set values of various program modes. In this embodiment, a set value of an observation visual field (field angle) and a set value of an effect level of an image stabilization process are recorded.

The primary memory 103 is constituted by a RAM etc. and temporarily stores processing image data and a calculation result of the overall control CPU 101.

The large-capacity nonvolatile memory 51 stores image data. In this embodiment, the large-capacity nonvolatile memory 51 is a semiconductor memory that is not detachable. However, the large-capacity nonvolatile memory 51 may be constituted by a detachable storage medium like an SD card, and may be used together with the internal nonvolatile memory 102.

The small-power wireless communication unit 71 exchanges data with the display apparatus 800, the calibrator 850, and the simplified display apparatus 900 through the small-power wireless network. The high-speed wireless communication unit 72 exchanges data with the display apparatus 800 and the calibrator 850 through the high-speed wireless network.

The audio processor 104 processes outside sound (analog signals) collected by the microphones 19L and 19R and generates an audio signal.

In order to notify the user of a state of the camera body 1 and to warn the user, the LED 17 emits light, the speaker 105 outputs sound, and the vibrator 106 vibrates.

The gyro 107 is a gyro sensor (an angular speed sensor) and detects movement of the camera body 1 itself as gyro data. The acceleration sensor 108 detects the posture of the image-pickup/detection unit 10.

Figure 6:
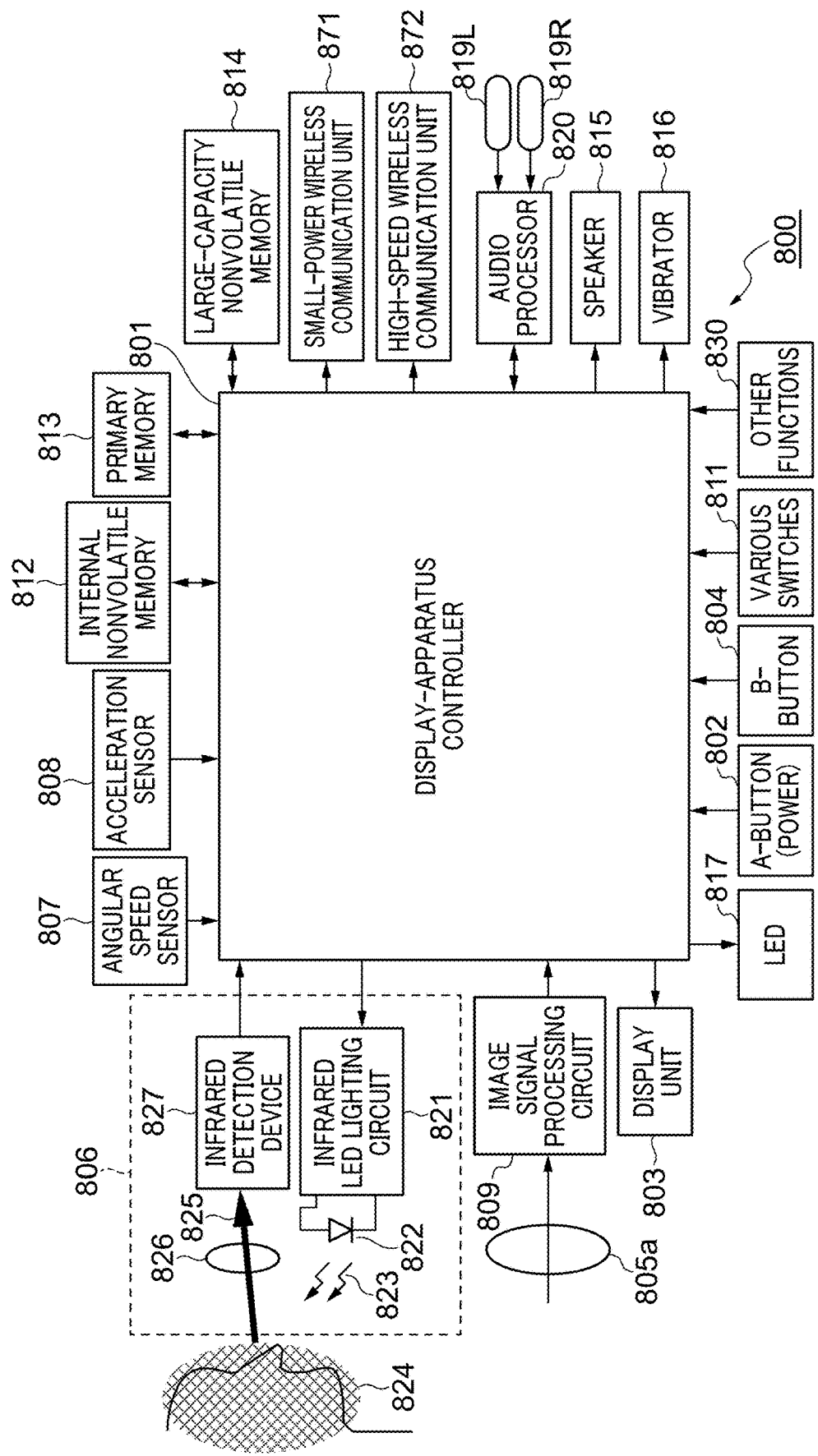
FIG. 6 is a block diagram showing a hardware configuration of the display apparatus.

FIG. 6 is a block diagram showing a hardware configuration of the display apparatus 800. The components that have been described using FIG. 1D are indicated by the same reference numerals and their descriptions will be omitted to simplify the description.

As shown in FIG. 6, the display apparatus 800 is provided with a display-apparatus controller 801, the A-button 802, the display unit 803, the B-button 804, the face sensor 806, the angular speed sensor 807, the acceleration sensor 808, an image signal processing circuit 809, and various switches 811.

Moreover, the display apparatus 800 is provided with an internal nonvolatile memory 812, a primary memory 813, a large-capacity nonvolatile memory 814, a speaker 815, a vibrator 816, an LED 817, an audio processor 820, a small-power wireless communication unit 871, and a high-speed wireless communication unit 872. The above-mentioned components are connected to the display-apparatus controller 801. The display-apparatus controller 801 is constituted by a CPU and controls the display apparatus 800.

The image signal processing circuit 809 bears equivalent functions with the image pickup driver 41, solid state image sensor 42, and image signal processing circuit 43 inside the camera body 1. The image signal processing circuit 809 constitutes the in-camera 805 in FIG. 1D together with an in-camera lens 805a. The display-apparatus controller 801 processes the data output from the image signal processing circuit 809. The contents of the process of the data will be mentioned later.

The various switches 811 are used to execute functions that are unrelated to this embodiment. The angular speed sensor 807 uses a gyro etc. and detects movement of the display apparatus 800.

The acceleration sensor 808 detects a posture of the display apparatus 800 itself. The angular speed sensor 807 and the acceleration sensor 808 are built in the display apparatus 800, and respectively have the functions equivalent to that of the above-mentioned gyro 107 and acceleration sensor 108 of the camera body 1.

The internal nonvolatile memory 812 is constituted by a flash memory etc. and stores a boot program of the display-apparatus controller 801 and set values of various program modes.

The primary memory 813 is constituted by a RAM etc. and temporarily stores processing image data and a calculation result of the image signal processing circuit 809. In this embodiment, when a video image is recording, gyro data detected with the gyro 107 at pickup time of each frame is stored into the primary memory 813 in association with the frame.

The large-capacity nonvolatile memory 814 stores image data of the display apparatus 800. In this embodiment, the large-capacity nonvolatile memory 814 is constituted by a detachable memory like an SD card. It should be noted that the large-capacity nonvolatile memory 814 may be constituted by a fixed memory as with the large-capacity nonvolatile memory 51 in the camera body 1.

In order to notify the user of a state of the display apparatus 800 and to warn the user, the speaker 815 outputs sound, the vibrator 816 vibrates, and the LED 817 emits light.

The audio processor 820 processes outside sound (analog signals) collected by the left microphone 819L and right microphone 819R and generates an audio signal.

The small-power wireless communication unit 871 exchanges data with the camera body 1 through the small-power wireless network. The high-speed wireless communication unit 872 exchanges data with the camera body 1 through the high-speed wireless network.

The face sensor (a face detection unit) 806 is provided with an infrared LED lighting circuit 821 and infrared LEDs 822, an infrared condenser lens 826, and an infrared detection device 827.

The infrared LED lighting circuit 821 has the function equivalent to that of the infrared LED lighting circuit 21 in FIG. 5 and controls lighting of the infrared LEDs 822 to control projection of the infrared light 823 directed to the user from the infrared LEDs 822. The infrared condenser lens 826 condenses the reflected light 825 of the infrared light 823.

The infrared detection device 827 has a sensor that detects the reflected light 825 condensed by the infrared condenser lens 826. The sensor converts the condensed reflected light 825 into sensor data and passes the sensor data to the display-apparatus controller 801.

When the face sensor 806 shown in FIG. 1D is directed to the user, an infrared irradiation surface 824 that is the entire face of the user is irradiated with the infrared light 823 projected from the infrared LEDs 822 as shown in FIG. 6. Moreover, the reflected light 825 reflected from the infrared irradiation surface 824 is condensed by the infrared condenser lens 826 onto the sensor in the detection device 827.

Other functions 830 are functions of a smart phone, such as a telephone function, that are not related to the embodiment.

Figure 7A:
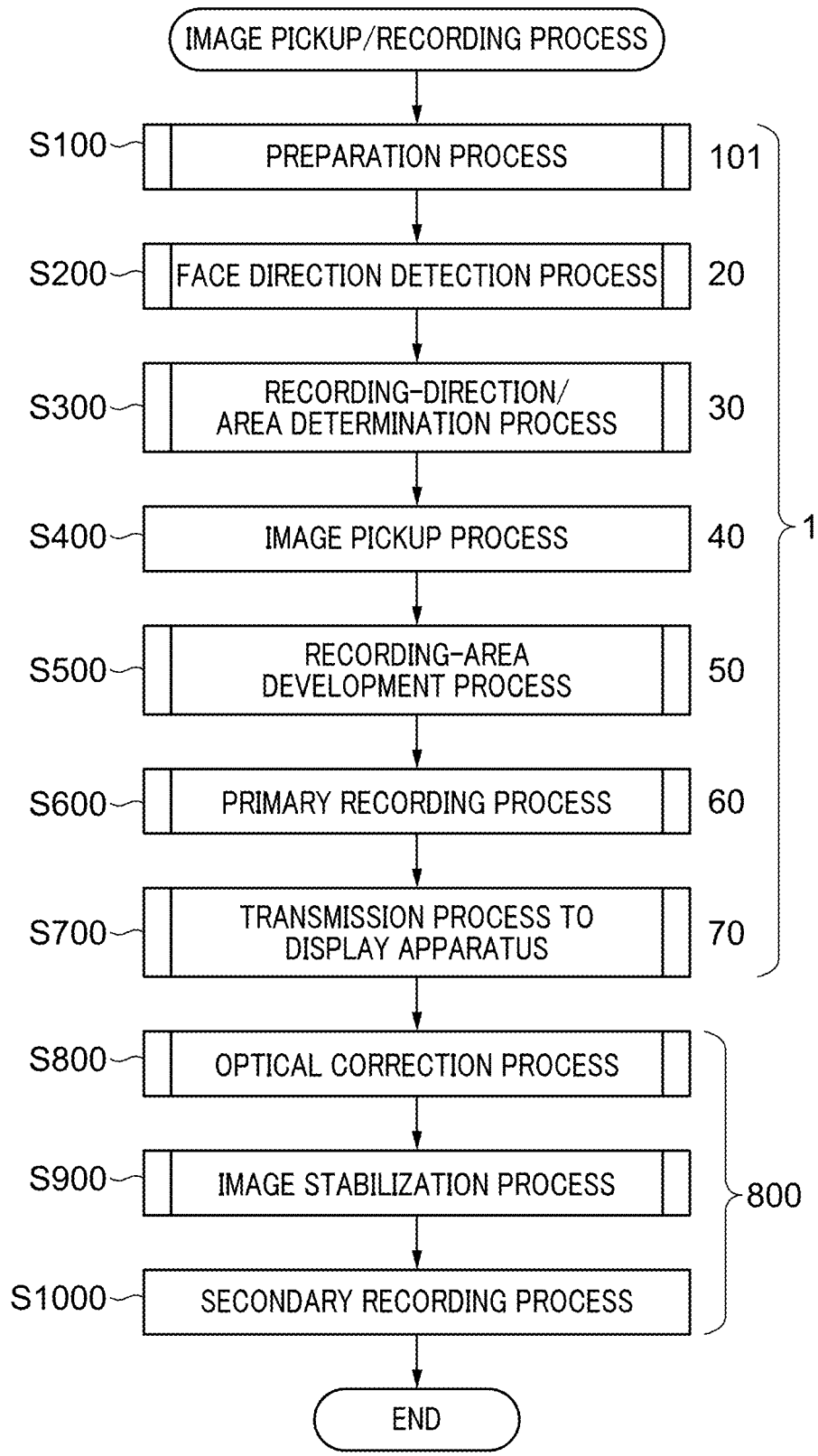
FIG. 7A is a flowchart schematically showing an image pickup/recording process according to the first embodiment executed by the camera body and display apparatus.

Hereinafter, how to use the camera body 1 and display apparatus 800 will be described. FIG. 7A is a flowchart schematically showing an image pickup/recording process according to the first embodiment executed by the camera body 1 and display apparatus 800.

In order to assist the description, a reference numeral shown in FIG. 4 and FIG. 5 of a unit that executes a process in each step is shown on a right side of each step in FIG. 7A. That is, steps S100 through S700 in FIG. 7A are executed by the camera body 1, and steps S800 through S1000 in FIG. 7A are executed by the display apparatus 800.

When the power switch 11 is set to ON and power of the camera body 1 turns ON, the overall control CPU 101 is activated and reads the boot program from the internal nonvolatile memory 102. After that, in the step S100, the overall control CPU 101 executes a preparation process that performs setting of the camera body 1 before an image pickup operation. Details of the preparation process will be mentioned later using FIG. 7B.

In a step S200, the face direction detection process that estimates an observation direction based on a face direction detected by the face direction detection unit 20 is executed. Details of the face direction detection process will be mentioned later using FIG. 7C. This process is executed at a predetermined frame rate. In a step S300, the recording-direction/field-angle determination unit 30 executes a recording-direction/area determination process. Details of the recording-direction/area determination process will be mentioned later using FIG. 7D.

In a step S400, the image pickup unit 40 picks up an image and generates pickup image data. In a step S500, the image extraction/development unit 50 extracts an image from the pickup image data generated in the step S400 according to recording-direction/field-angle information determined in the step S300 and performs a recording area development process that develops the extracted area. Details of the recording area development process will be mentioned later using FIG. 7E.

In a step S600, the primary recording unit (an image recording unit) 60 executes a primary recording process that stores the image developed in the step S500 into the primary memory 103 as image data. Details of the primary recording process will be mentioned later using FIG. 14.

In the step S700, the transmission unit 70 executes a transmission process to the display apparatus 800 that wirelessly transmits the image primarily recorded in the step S600 to the display apparatus 800 at a designated timing. Details of the transmission process to the display apparatus 800 will be mentioned later using FIG. 16.

The steps from the step S800 are executed by the display apparatus 800. In the step S800, the display-apparatus controller 801 executes an optical correction process that corrects optical aberration of the image transferred from the camera body 1 in the step S700. Details of the optical correction process will be mentioned later using FIG. 17.

In a step S900, the display-apparatus controller 801 applies the image stabilization process to the image of which the optical aberration has been corrected in the step S800. Details of the image stabilization process will be mentioned later using FIG. 19. It should be noted that the order of the step S800 and the step S900 may be inverted. That is, the image stabilization process may be executed in advance and the optical correction process may be executed after that.

In a step S1000, the display-apparatus controller (video recording unit) 801 executes a secondary recording process that records the image to which the optical correction process in the step S800 and the image stabilization process in the step S900 have been applied into the large-capacity nonvolatile memory 814. And then, the display-apparatus controller 801 finishes this process.

Figure 7B:
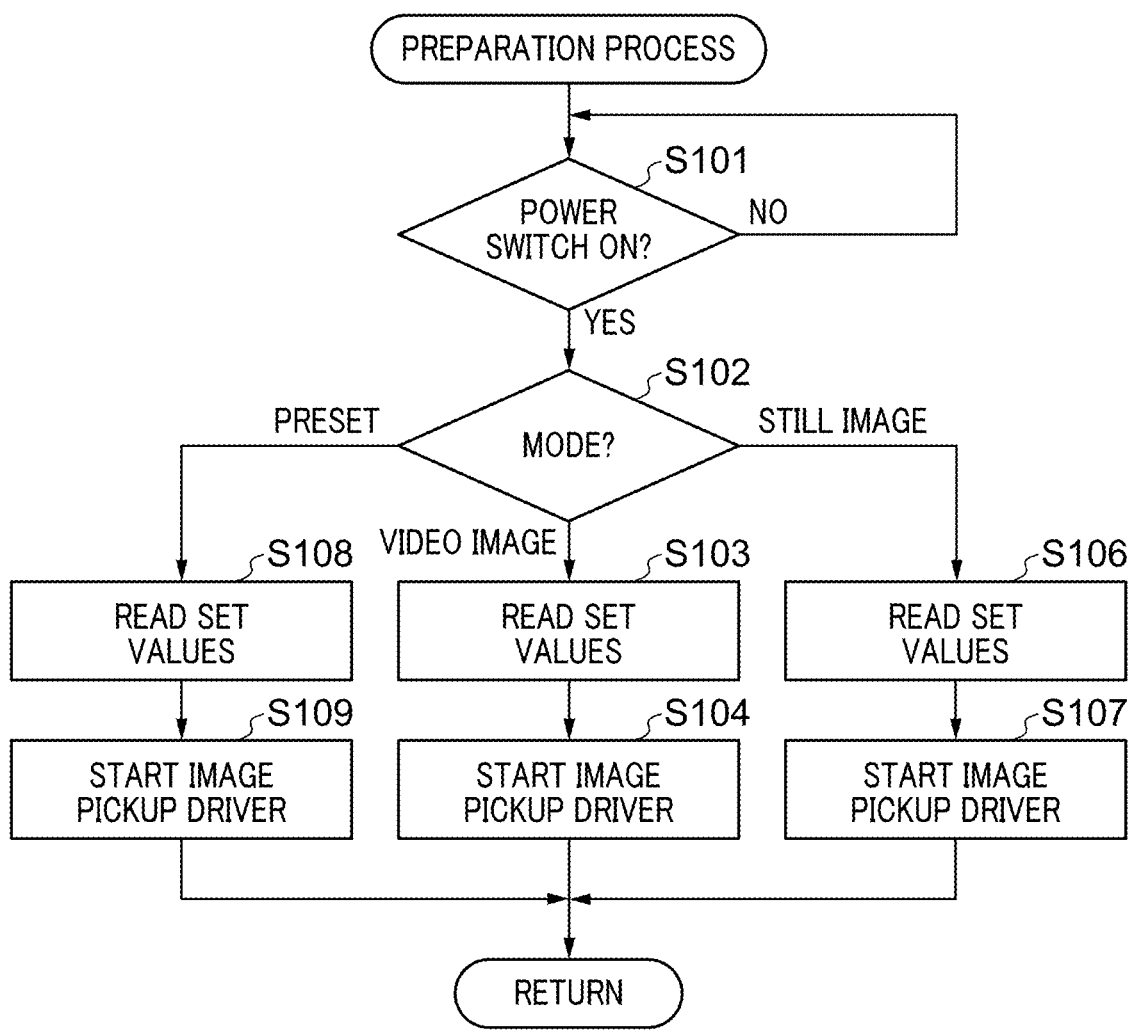
FIG. 7B is a flowchart showing a subroutine of a preparation process in a step S100 in FIG. 7A according to the first embodiment.

Next, the subroutines in the respective steps in FIG. 7A will be described in detail using FIG. 7B through FIG. 7F and other drawings in the order of the processes. FIG. 7B is a flowchart showing the subroutine of the preparation process in the step S100 in FIG. 7A. Hereinafter, this process is described using the components shown in FIG. 2A through FIG. 2F and FIG. 5.

It is determined whether the power switch 11 is ON in a step S101. The process waits when the power is OFF. When the power becomes ON, the process proceeds to a step S102.

In the step S102, the mode selected by the image pickup mode switch 12 is determined. As a result of the determination, when the mode selected by the image pickup mode switch 12 is the video image mode, the process proceeds to a step S103.

In the step S103, various set values of the video image mode are read from the internal nonvolatile memory 102 and are stored into the primary memory 103. Then, the process proceeds to a step S104. The various set values of the video image mode include a field-angle set value $V_{ang}$ and an image stabilization level. The field-angle set value $V_{ang}$ is preset to 90° in this embodiment. The image stabilization level is selected from among "Strong", "Middle", and "OFF". In the step S104, an operation of the image pickup driver 41 for the video image mode is started. And then, the process exits from this subroutine.

As a result of the determination in the step S102, when the mode selected by the image pickup mode switch 12 is the still image mode, the process proceeds to a step S106. In the step S106, various set values of the still image mode are read from the internal nonvolatile memory 102 and are stored into the primary memory 103. Then, the process proceeds to a step S107. The various set values of the still image mode include the field-angle set value $V_{ang}$ and the image stabilization level. The field-angle set value $V_{ang}$ is preset to 45° in this embodiment. The image stabilization level is selected from among "Strong", "Middle", and "OFF". In the step S107, an operation of the image pickup driver 41 for the still image mode is started. And then, the process exits from this subroutine.

As the result of the determination in the step S102, when the mode selected by the image pickup mode switch 12 is the preset mode, the process proceeds to a step S108. The preset mode is one of the three image pickup modes that can be changed by the image pickup mode switch 12. In the preset mode, the image pickup mode of the camera body 1 can be changed by an external device like the display apparatus 800. That is, the preset mode is a mode for a custom image pickup operation. Since the camera body 1 is a compact wearable device, operation switches, a setting screen, etc. for changing advanced set values are not mounted on the camera body 1. The advanced set values are changed by an external device like the display apparatus 800.

For example, a case where the user would like to pick up a video image at the field angle 90° and the field angle 110° continuously is considered. In such a case, the following operations are needed. Since the field angle is set to 90° in a regular video image mode, the user first performs the video image pickup operation in the regular video image mode, once finishes the video image pickup operation, displays the setting screen on the display apparatus 800, and changes the field angle to 110° on the setting screen. However, the operations to the display apparatus 800 during a certain event are troublesome.

In the meantime, when the preset mode is preset to a video image pickup operation at the field angle 110°, the user can change the field angle in the video image pickup operation to 110° immediately by only sliding the image pickup mode switch 12 to "Pre" after finishing the video image pickup operation at the field angle 90°. That is, the user is not required to suspend the current operation and to perform the above-mentioned troublesome operations.

It should be noted that contents of the preset mode may include the image stabilization level, which is selected from among "Strong", "Middle", and "OFF", and a set value of voice recognition that is not described in this embodiment in addition to the field angle.

In the step S108, various set values of the preset mode are read from the internal nonvolatile memory 102 and are stored into the primary memory 103. Then, the process proceeds to a step S109. The various set values of the preset mode include the field-angle set value $V_{ang}$ and the image stabilization level that is selected from among "Strong", "Middle", and "OFF".

In the step S109, an operation of the image pickup driver 41 for the preset mode is started. And then, the process exits from this subroutine.

Figure 13:
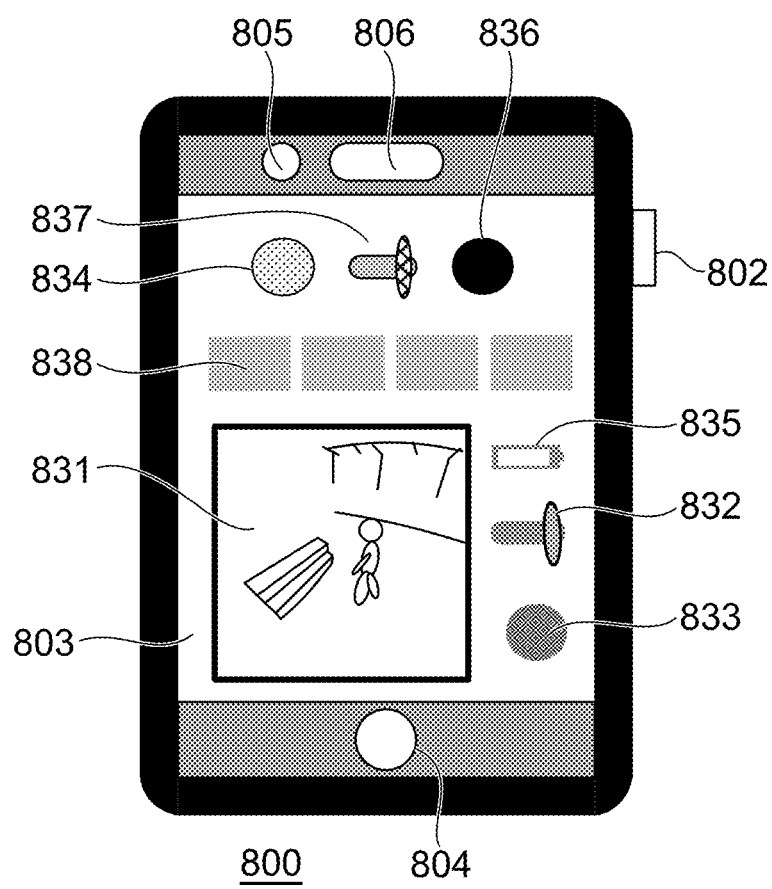
FIG. 13 is a view showing a menu screen for setting various set values of the video image mode that is displayed on a display unit of the display apparatus before an image pickup operation of the camera body.

Hereinafter, the various set values of the video image mode read in the step S103 will be described using FIG. 13. FIG. 13 is a view showing a menu screen for setting the various set values of the video image mode that is displayed on the display unit 803 of the display apparatus 800 before an image pickup operation of the camera body 1. The components that have been described using FIG. 1D are indicated by the same reference numerals and their descriptions will be omitted. The display unit 803 has a touch panel function and will be described under the presumption that it functions by touch operations, such as a swipe operation.

As shown in FIG. 13, the menu screen includes a preview screen 831, a zoom lever 832, a recording start/stop button 833, a switch 834, a battery level indicator 835, a button 836, a lever 837, and an icon display area 838. The user can check the image picked up by the camera body 1, a zoom amount, and a field angle on the preview screen 831.

The user can change a zoom setting (a field angle) by shifting the zoom lever 832 rightward or leftward. This embodiment describes a case where the field-angle set value $V_{ang}$ can be selected from among 45°, 90°, 110°, and 130°. In the meantime, the field-angle set value $V_{ang}$ may be set to a value other than the four values by operating the zoom lever 832.

The recording start/stop button 833 is a toggle switch that has both of the functions of the start switch 14 and the stop switch 15. The switch 834 is used to switch "OFF" and "ON" of the image stabilization process. The battery level indicator 835 displays battery level of the camera body 1. The button 836 is used to change a mode.

The lever 837 is used to set the image stabilization level. Although the image stabilization level can be set to "Strong" or "Middle" in this embodiment, another image stabilization level, for example "Weak", may be set. Moreover, the image stabilization level may be set steplessly. A plurality of thumbnail icons for preview are displayed in the icon display area 838.

Figure 7C:
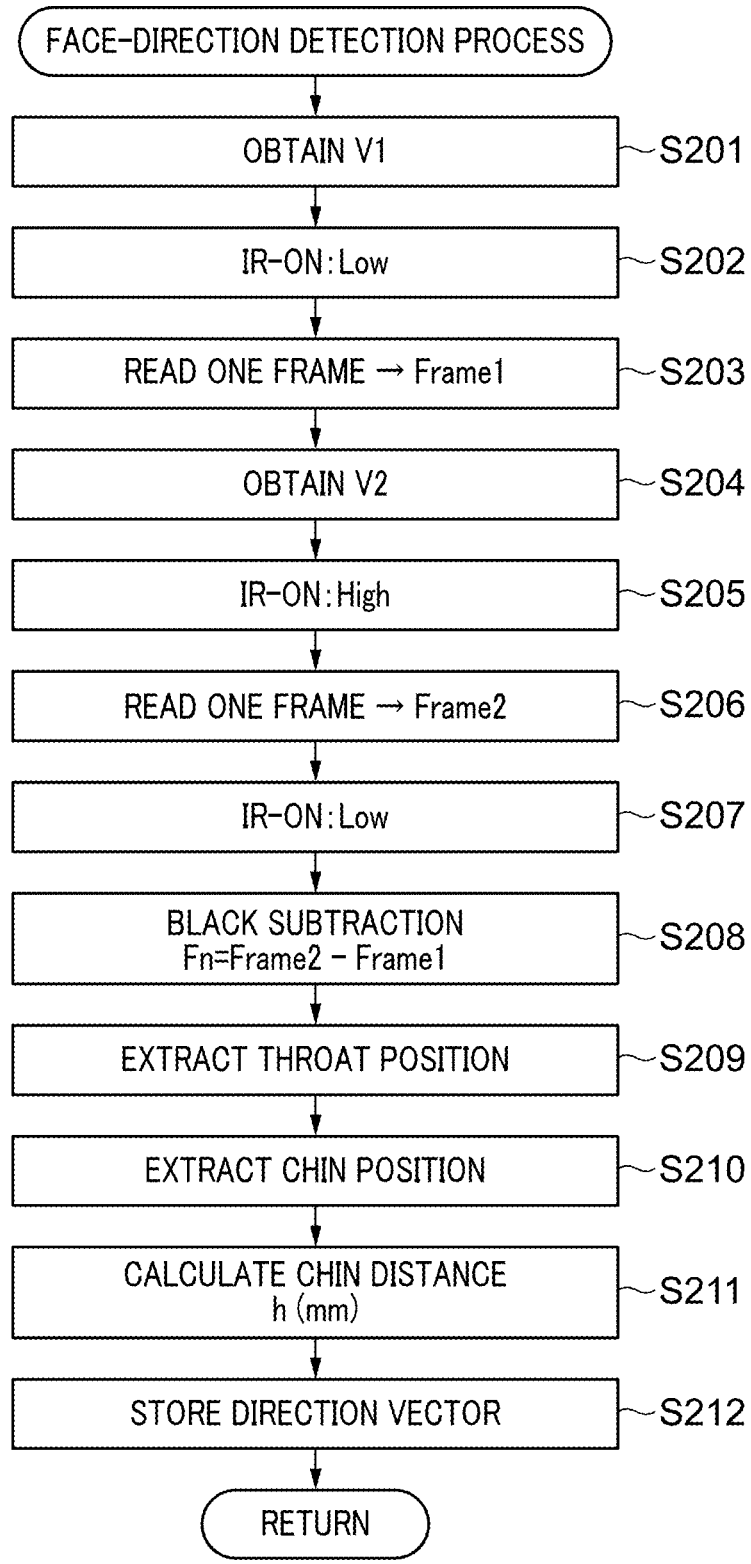
FIG. 7C is a flowchart showing a subroutine of a face direction detection process in a step S200 in FIG. 7A according to the first embodiment.

FIG. 7C is a flowchart showing a subroutine of the face direction detection process in the step S200 in FIG. 7A. Before describing the details of this process, a face direction detection method using infrared light will be described using FIG. 8A through FIG. 8K.

Figure 8A:
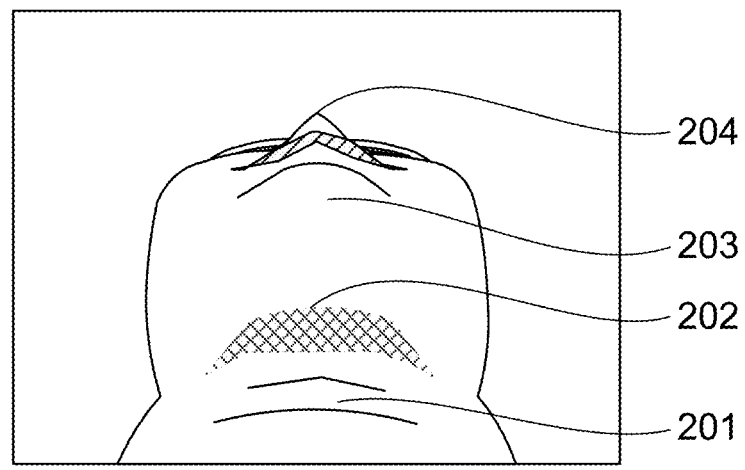
FIG. 8A is a view showing an image of a user viewed from the face direction detection window.

FIG. 8A is a view showing a visible light image of a user's face looked at from the position of the face direction detection window 13. The image in FIG. 8A is identical to an image picked up by a visible-light image sensor on the assumption that the face direction detection window 13 permits transmission of visible light and that the visible-light image sensor is mounted as a sensor of the infrared detection device 27.

Figure 8B:
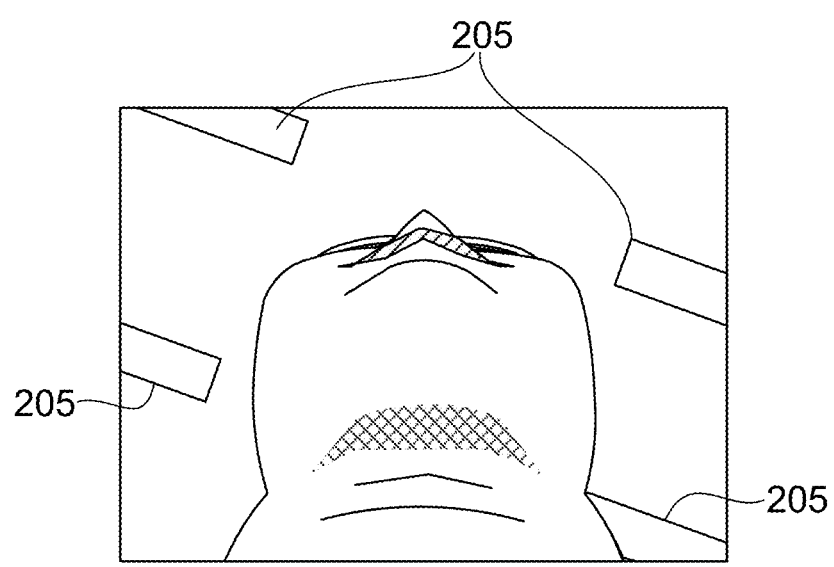
FIG. 8B is a view showing a case where fluorescent lamps in a room appear as background in the image of the user viewed from the face direction detection window.

The image in FIG. 8A includes a neck front part 201 above clavicles of the user, a root 202 of a jaw, a chin 203, and a face 204 including a nose. FIG. 8B is a view showing a case where fluorescent lamps 205 in a room appear as background in the visible-light image of the user shown in FIG. 8A.

The fluorescent lamps 205 around the user appear in the visible-light image in FIG. 8B. In this way, since various backgrounds appear in a user's image according to a use condition, it becomes difficult that the face direction detection unit 20 or the overall control CPU 101 cuts out a face image from a visible-light image. In the meantime, although there is a technique that cuts such an image by using an AI etc., the technique is not suitable for the camera body 1 as a portable device because the overall control CPU 101 is required to have high performance.

Accordingly, the camera body 1 of the first embodiment detects a user's face using an infrared image. Since the face direction detection window 13 is constituted by a visible light cut filter, visible light is not transmitted mostly. Accordingly, an image obtained by the infrared detection device 27 is different from the images in FIG. 8A and FIG. 8B.

Figure 8C:
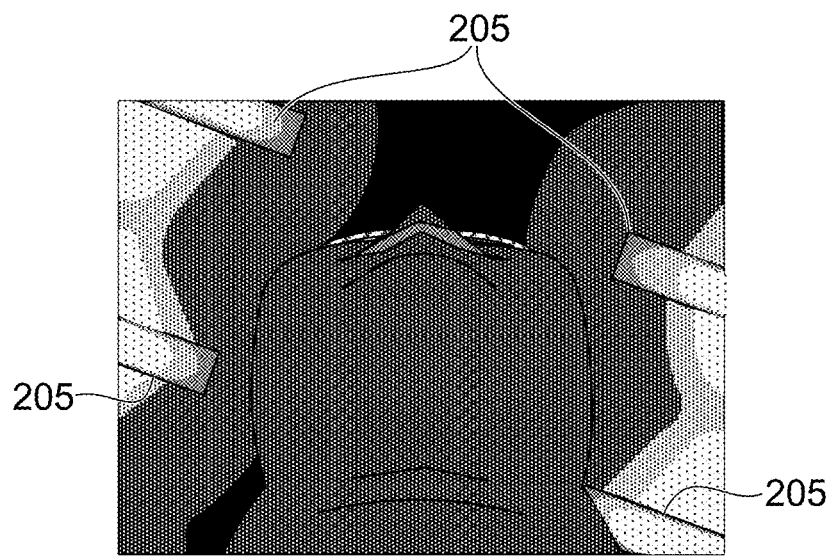
FIG. 8C is a view showing an image obtained by imaging the user and fluorescent lamps as background shown in FIG. 8B onto a sensor of the infrared detection device through the face direction detection window in a state where infrared LEDs of the infrared detection device are not lightened.

FIG. 8C is a view showing an infrared image obtained by imaging the user and the fluorescent lamps as the background shown in FIG. 8B onto the sensor of the infrared detection device 27 through the face direction detection window 13 in a state where the infrared LEDs 22 are not lightened.

In the infrared image in FIG. 8C, the user's neck and jaw are dark. In the meantime, since the fluorescent lamps 205 emit an infrared component in addition to the visible light, they are slightly bright.

Figure 8D:
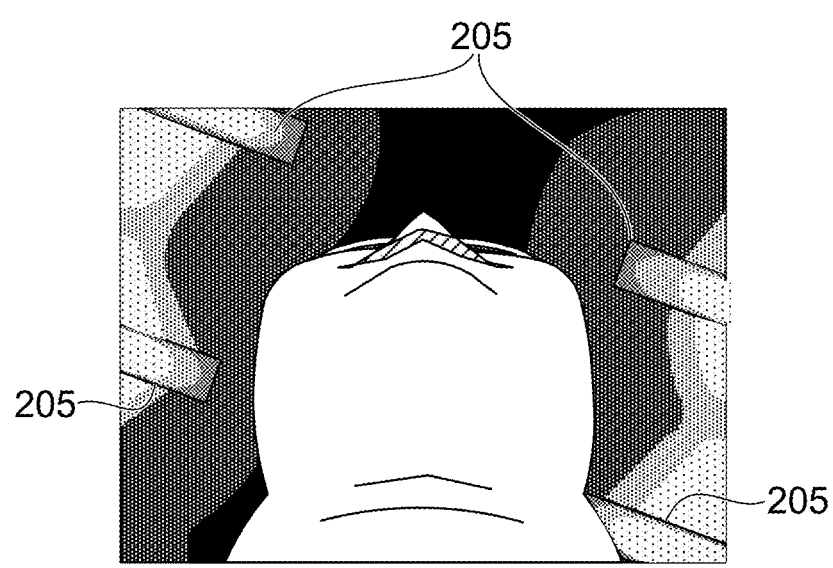
FIG. 8D is a view showing an image obtained by imaging the user and fluorescent lamps as background shown in FIG. 8B onto the sensor of the infrared detection device through the face direction detection window in a state where the infrared LEDs are lightened.

FIG. 8D is a view showing an image obtained by imaging the user and the fluorescent lamps as the background shown in FIG. 8B onto the sensor of the infrared detection device 27 through the face direction detection window 13 in a state where the infrared LEDs 22 are lightened.

In the image in FIG. 8D, the user's neck and jaw are bright. In the meantime, unlike FIG. 8C, the brightness around the fluorescent lamps 205 has not changed.

Figure 8E:
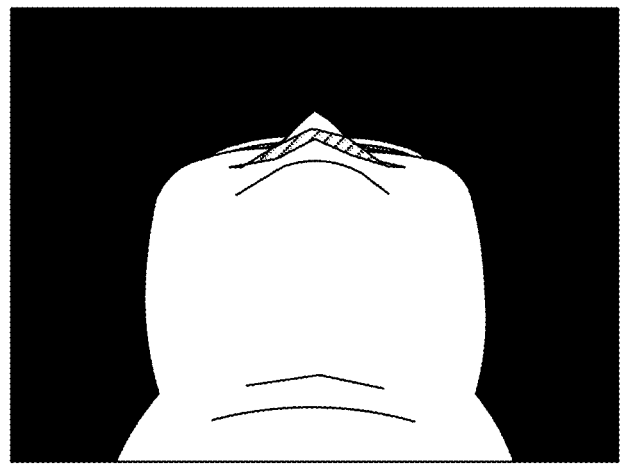
FIG. 8E is a view showing a difference image that is calculated by subtracting the image in FIG. 8C from the image in FIG. 8D.

FIG. 8E is a view showing a difference image that is calculated by subtracting the image in FIG. 8C from the image in FIG. 8D. The user's face emerges.

In this way, the overall control CPU (an image obtainment unit) 101 obtains the difference image (hereinafter referred to as a face image) by calculating the difference between the image formed on the sensor of the infrared detection device 27 in the state where the infrared LEDs 22 are lightened and the image formed on the sensor in the state where the infrared LEDs 22 are not lightened.

The face direction detection unit 20 of this embodiment employs a method that obtains a face image by extracting infrared reflection intensity as a two-dimensional image by the infrared detection device 27. The sensor of the infrared detection device 27 employs a configuration similar to a general image sensor and obtains a face image frame-by-frame. A vertical synchronization signal (hereinafter referred to as a V-signal) that obtains frame synchronization is generated by the infrared detection device 27 and is output to the overall control CPU 101.

Figure 9:
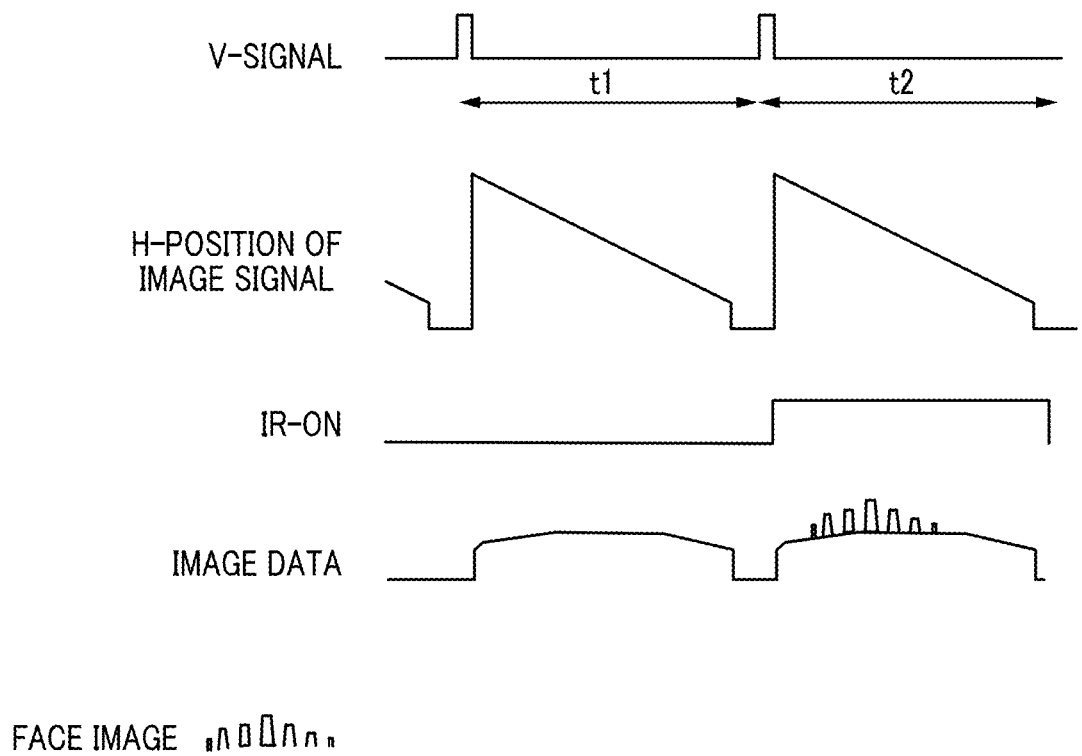
FIG. 9 is a timing chart showing a lighting timing of the infrared LEDs and related signals.

FIG. 9 is a timing chart showing timings of lighting and extinction of the infrared LEDs 22 and related signals.

A V-signal output from the infrared detection device 27, an H-position of the image signal output from the sensor of the infrared detection device 27, an IR-ON signal output to the infrared LED lighting circuit 21 from the overall control CPU 101, and pickup image data output to the overall control CPU 101 from the sensor of the infrared detection device 27 are shown in FIG. 9 in the order from the top. The horizontal time axes of these four signals are identical. When the V-signal becomes High, timings of the frame synchronization and timings of lighting and extinction of the infrared LEDs 22 are obtained.

FIG. 9 shows a first face image obtainment period t1 and a second face image obtainment period t2.

The infrared detection device 27 controls the operation of the sensor so that the H-position of the image signal will synchronize with the V-signal as shown in FIG. 9. Since the sensor of the infrared detection device 27 employs the configuration similar to a general image sensor as mentioned above and its operation is well-known, a detailed description of the control method is omitted.

The overall control CPU 101 controls switching of the IR-ON signal between High and Low in synchronization with the V-signal. Specifically, the overall control CPU 101 outputs the IR-ON signal of Low to the infrared LED lighting circuit 21 during the period t1 and outputs the IR-ON signal of High to the infrared LED lighting circuit 21 during the second period t2.

The infrared LED lighting circuit 21 lightens the infrared LEDs 22 to project the infrared light 23 to the user during the High period of the IR-ON signal. In the meantime, the infrared LED lighting circuit 21 extinguishes the infrared LEDs 22 during the Low period of the IR-ON signal.

A vertical axis of the pickup image data indicates a signal intensity that is a light receiving amount of the reflected light 25. Since the infrared LEDs 22 are extinguished during the first period t1, no reflected light comes from the user's face and pickup image data as shown in FIG. 8C is obtained. In the meantime, since the infrared LEDs 22 are lightened during the second period t2, the reflected light 25 comes from the user's face and pickup image data as shown in FIG. 8D is obtained. Accordingly, the signal intensity in the period t2 increases from the signal intensity in the period t1 by the reflected light 25 from the user's face.

A face image indicated in the bottom in FIG. 9 is obtained by subtracting the image pickup data during the first period t1 from the image pickup data during the second period t2. As a result of the subtraction, face image data in which only the component of the reflected light 25 from the user's face is extracted is obtained.

FIG. 7C shows the face direction detection process in the step S200 that includes the operations described using FIG. 8C through FIG. 8E and FIG. 9.

In a step S201, a timing V1 at which the first period t1 starts is obtained when the V-signal output from the infrared detection device 27 becomes High. When the timing V1 is obtained, the process proceeds to a step S202.

In the step S202, the IR-ON signal is set to Low and is output to the infrared LED lighting circuit 21. Thereby, the infrared LEDs 22 are extinguished.

In a step S203, one frame of pickup image data output from the infrared detection device 27 during the first period t1 is read. The image data is temporarily stored into the primary memory 103 as Frame1.

In a step S204, a timing V2 at which the second period t2 starts is obtained when the V-signal output from the infrared detection device 27 becomes High. When the timing V2 is obtained, the process proceeds to a step S205.

In the step S205, the IR-ON signal is set to High and is output to the infrared LED lighting circuit 21. Thereby, the infrared LEDs 22 are lightened.

In a step S206, one frame of pickup image data output from the infrared detection device 27 during the second period t2 is read. The image data is temporarily stored into the primary memory 103 as Frame2.

In a step S207, the IR-ON signal is set to Low and is output to the infrared LED lighting circuit 21. Thereby, the infrared LEDs 22 are extinguished.

In a step S208, Frame1 and Frame2 are read from the primary memory 103, and light intensity Fn of the reflected light 25 from the user corresponding to the face image shown in FIG. 9 is calculated by subtracting Frame1 from Frame2. This process is generally called black subtraction.

In a step S209, a throat position (a neck rotation center) is extracted from the light intensity Fn. First, the overall control CPU (a division unit) 101 divides the face image into a plurality of distance areas that will be described using FIG. 8F on the basis of the light intensity Fn.

Figure 8F:
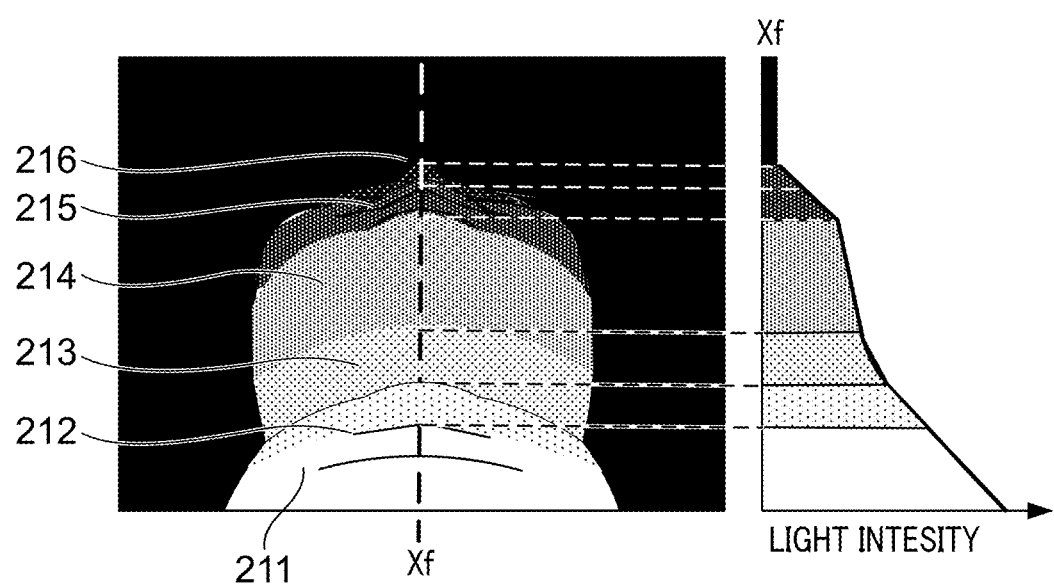
FIG. 8F is a view showing a result obtained by adjusting shades of the difference image in FIG. 8E so as to fit with a scale of light intensities of reflected components of infrared light projected to a face and neck of the user.

FIG. 8F is a view showing a result obtained by adjusting shades of the difference image shown in FIG. 8E so as to fit with a scale of light intensity of the reflected light 25 of the infrared light 23 projected to the face and neck of the user. FIG. 8F shows light intensity distribution about sections of the face and neck of the user.

The face image on the left side in FIG. 8F shows the light intensity distribution of the reflected light 25 in the face image shown in FIG. 8E by gray steps applied to the respective divided areas. An Xf axis is oriented in a direction from the central part of the user's neck toward the chin.

In a graph on the right side in FIG. 8F, a horizontal axis shows the light intensity on the Xf axis of the face image and a vertical axis shows the Xf axis. The light intensity shown by the horizontal axis increases as going rightward.

The face image in FIG. 8F is divided into six areas (distance areas) 211 through 216 according to the light intensity. The area 211 is an area where the light intensity is the strongest and is shown by white among the gray steps. The area 212 is an area where the light intensity falls slightly than the area 211 and is shown by quite bright gray among the gray steps. The area 213 is an area where the light intensity falls still more than the area 212 and is shown by bright gray among the gray steps. The area 214 is an area where the light intensity falls still more than the area 213 and is shown by middle gray among the gray steps. The area 215 is an area where the light intensity falls still more than the area 214 and is shown by slightly dark gray among the gray steps. The area 216 is an area where the light intensity is the weakest and is shown by the darkest gray among the gray steps. The area above the area 216 is shown by black showing no light intensity.

The light intensity will be described in detail using FIG. 10A through FIG. 10D. FIG. 10A through FIG. 10D are views describing movement of the user's face in the vertical direction and show states observed from the left side of the user.

Figure 10A:
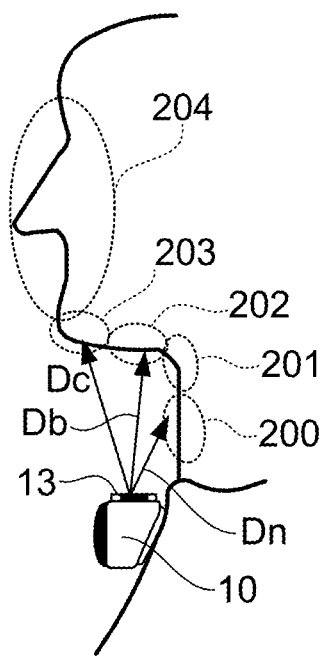
FIG. 10A through FIG. 10D are views describing movements of the user's face in a vertical direction.

FIG. 10A is a view showing a state where the user faces the front. There is the image-pickup/detection unit 10 in front of the clavicles of the user. Moreover, the infrared light 23 of the infrared LEDs 22 irradiates the lower part of the user's head from the face direction detection window 13 mounted in the upper portion of the image-pickup/detection unit 10. A distance Dn from the face direction detection window 13 to the throat 200 above the clavicles of the user, a distance db from the face direction detection window 13 to the root 202 of the jaw, and a distance Dc from the face direction detection window 13 to the chin 203 satisfy a relation of Dn<db<Dc. Since light intensity is in inverse proportion to the square of distance, the light intensity in the image formed by the reflected light 25 from the infrared irradiation surface 24 on the sensor becomes gradually weaker in the order of the throat 200, the root 202 of the jaw, and the chin 203. Moreover, since the distance from the face direction detection window 13 to the face 204 including the nose is still longer than the distance Dc, the light intensity in the image corresponding to the face 204 becomes still weaker. That is, in the case as shown in FIG. 10A, the image having the light intensity distribution shown in FIG. 8F is obtained.

It should be noted that the configuration of the face direction detection unit 20 is not limited to the configuration shown in this embodiment as long as the face direction of the user can be detected. For example, the infrared LEDs 22 may be an infrared pattern radiation unit that projects an infrared pattern, and the sensor of the infrared detection device 27 may be an infrared pattern detection unit that detects the infrared pattern reflected from an irradiation target. In this case, it is preferable that the sensor of the infrared detection device 27 be constituted by a structural optical sensor. Moreover, the sensor of the infrared detection device 27 may be an infrared pattern phase comparison unit that compares the phase of the infrared light 23 and the phase of the reflected light 25. For example, a ToF (Time of Flight) sensor may be employed.

Figure 8G:
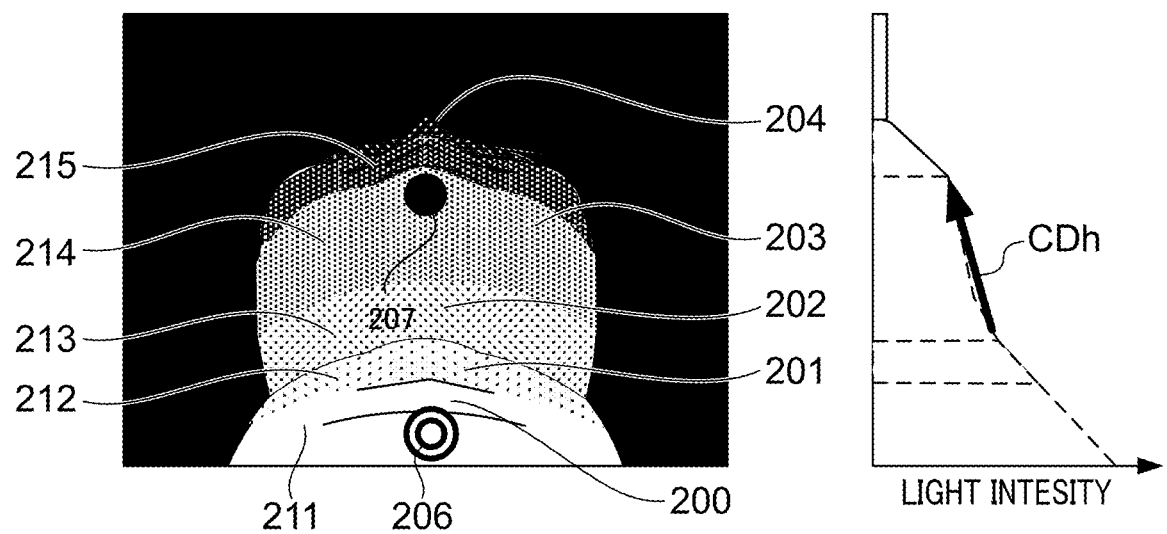
FIG. 8G is a view obtained by superimposing reference numerals denoting parts of a user's body, a double circle showing a throat position, and a black circle showing a chin position on FIG. 8F.

Next, the extraction of the throat position in the step S209 in FIG. 7C will be described using FIG. 8G. A left image in FIG. 8G is obtained by superimposing the reference numerals denoting the parts of the user's body shown in FIG. 10A, a double circle showing the throat position, and a black circle showing the chin position on FIG. 8F.

The white area 211 corresponds to the throat 200 (FIG. 10A), the quite bright gray area 212 corresponds to the neck front part 201 (FIG. 10A), and the bright gray area 213 corresponds to the root 202 of the jaw (FIG. 10A). Moreover, the middle gray area 214 corresponds to the chin 203 (FIG. 10A), and the slightly dark gray area 215 corresponds to a lip located in the lower part of the face 204 (FIG. 10A) and a face lower part around the lip. Furthermore, the darkest gray area 216 corresponds to the nose located in the center of the face 204 (FIG. 10A) and a face upper part around the nose.

Since the difference between the distances db and Dc is relatively small as compared with the differences between the other distances from the face direction detection window 13 to other parts of the user as shown in FIG. 10A, the difference between the reflected light intensities in the bright gray area 213 and the middle gray area 214 is also small.

In the meantime, since the distance Dn is the shortest distance among the distances from the face direction detection window 13 to the parts of the user as shown in FIG. 10A, the reflection light intensity in the white area 211 corresponding to the throat 200 becomes the strongest.

Accordingly, the overall control CPU (a setting unit) 101 determines that the area 211 corresponds to the throat 200 and its periphery. And then, the overall control CPU 101 sets a throat position 206 indicated by the double circle in FIG. 8G, which is located at the center in the lateral direction in the area 211 and is the nearest to the image-pickup/detection unit 10, as the position of the neck rotation center. The processes up to the moment are the contents performed in the step S209 in FIG. 7C.

Next, the extraction of the chin position in the step S210 in FIG. 7C will be described using FIG. 8G. In the image in FIG. 8G, the middle gray area 214 that is brighter than the area 215 corresponding to the face lower part including the lip of the face 204 includes the chin. A graph on the right side in FIG. 8G shows that the light intensity falls sharply in the area 215 adjacent to the area 214 because the change rate of the distance from the face direction detection window 13 becomes large.

The overall control CPU 101 determines that the brighter area 214 adjacent to the area 215 in which the light intensity falls sharply is a chin area. Furthermore, the overall control CPU 101 calculates (extracts) the position (indicated by the black circle shown in FIG. 8G), which is located at the center in the lateral direction in the area 214 and is the farthest from the throat position 206, as a chin position 207.

Figure 8H:
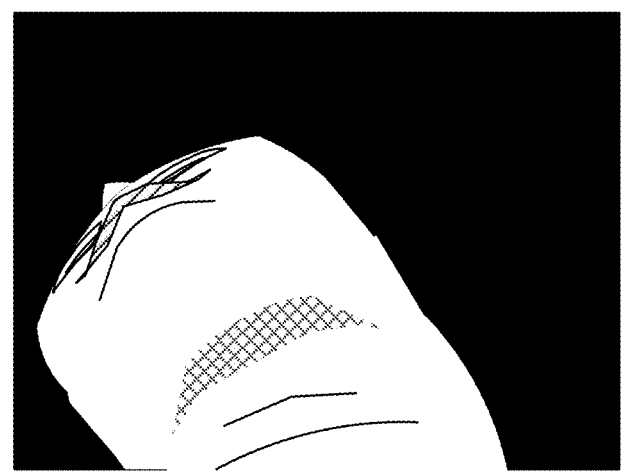
FIG. 8H is a view showing a difference image calculated by the similar method as FIG. 8E in directing the user's face to the right.
Figure 8I:
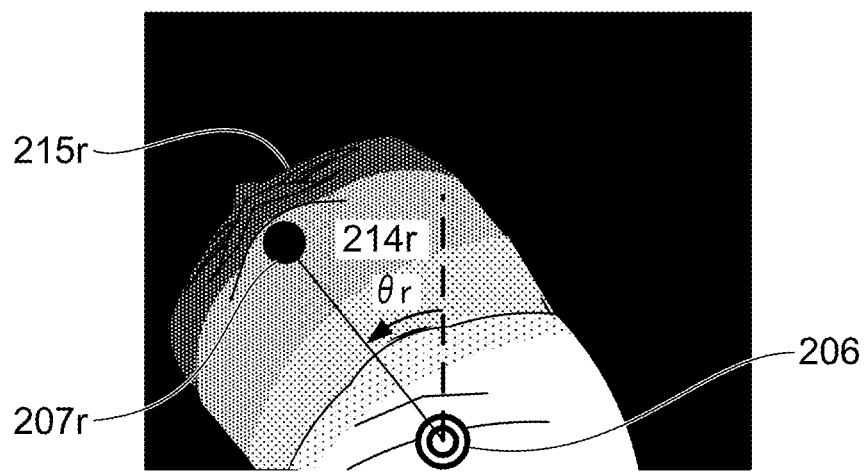
FIG. 8I is a view showing a result obtained by adjusting shades of the difference image in FIG. 8H so as to fit with a scale of light intensities of reflected components of infrared light projected to a face and neck of the user and by superimposing the double circle showing the throat position and the black circle showing the chin position.

For example, FIG. 8H and FIG. 8I show changes in directing the face to the right. FIG. 8H is a view showing a difference image calculated by the similar method as FIG. 8E in directing the user's face to the right. FIG. 8I is a view showing a result obtained by adjusting shades of the difference image in FIG. 8H so as to fit with a scale of light intensities of reflected components of the infrared light projected to the face and neck of the user and by superimposing the double circle showing the throat position 206 as the position of the neck rotation center and the black circle showing a chin position 207r.

Since the user's face is directed to the right, the area 214 moves to an area 214r shown in FIG. 8I that is located in the left side when it is looked up from the image-pickup/detection unit 10. The area 215 corresponding to the face lower part including the lip in the face 204 also moves to an area 215r that is located in the left side when it is looked up from the image-pickup/detection unit 10.

Accordingly, the overall control CPU 101 determines that the brighter area 214r adjacent to the area 215r in which the light intensity falls sharply is the chin area. Furthermore, the overall control CPU 101 calculates (extracts) the position (indicated by the black circle shown in FIG. 8I), which is located at the center in the lateral direction in the area 214r and is the farthest from the throat position 206, as the chin position 207r.

After that, the overall control CPU 101 finds a moving angle θr that shows the rotational movement to the right from the chin position 207 in the image in FIG. 8G to the chin position 207r in FIG. 8I around the throat position 206. As shown in FIG. 8I, the moving angle θr is an angle of movement of the user's face in the lateral direction.

According to the above-mentioned method, the angle of face (hereinafter, referred to as a face angle) of the user in the lateral direction is calculated in the step S210 from the chin position detected by the infrared detection device 27 of the face direction detection unit (a three-dimensional detection sensor) 20.

Figure 10B:
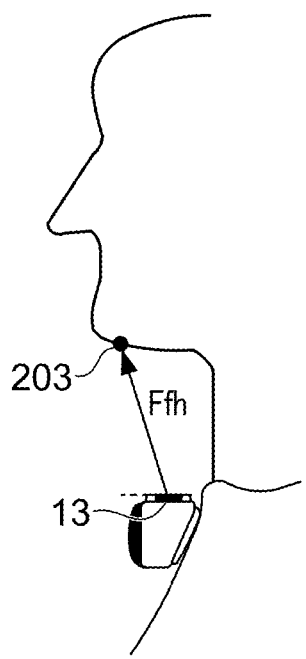
Figure 10C:
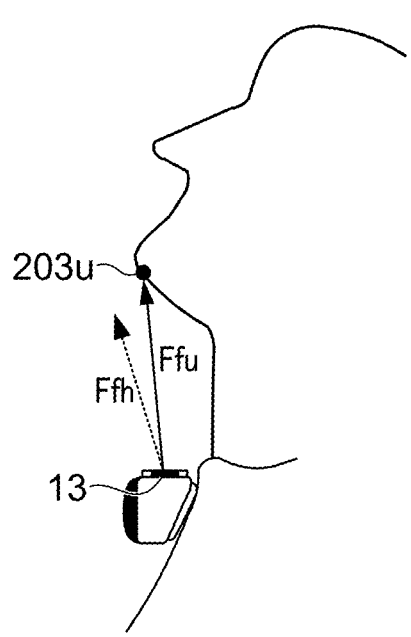

Next, detection of the face directed upward will be described. FIG. 10B is a view showing a state where the user directs the face horizontally. FIG. 10C is a view showing a state where the user directs the face upward by 33° from the horizontal direction.

The distance from the face direction detection window 13 to the chin 203 is Ffh in FIG. 10B, and the distance from the face direction detection window 13 to a chin 203u is Ffu in FIG. 10C. Since the chin 203u moves upwardly together with the face, the distance Ffu becomes longer than the distance Ffh as shown in FIG. 10C.

Figure 8J:
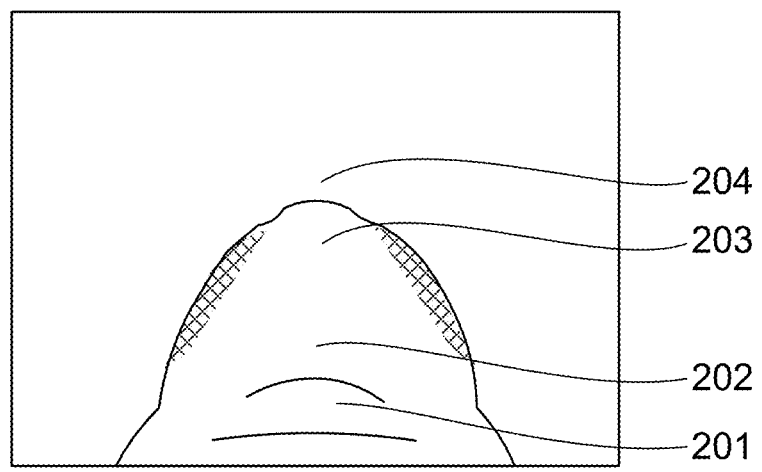
FIG. 8J is a view showing an image of the user who directs the face upward by 33° viewed from the face direction detection window.
Figure 8K:
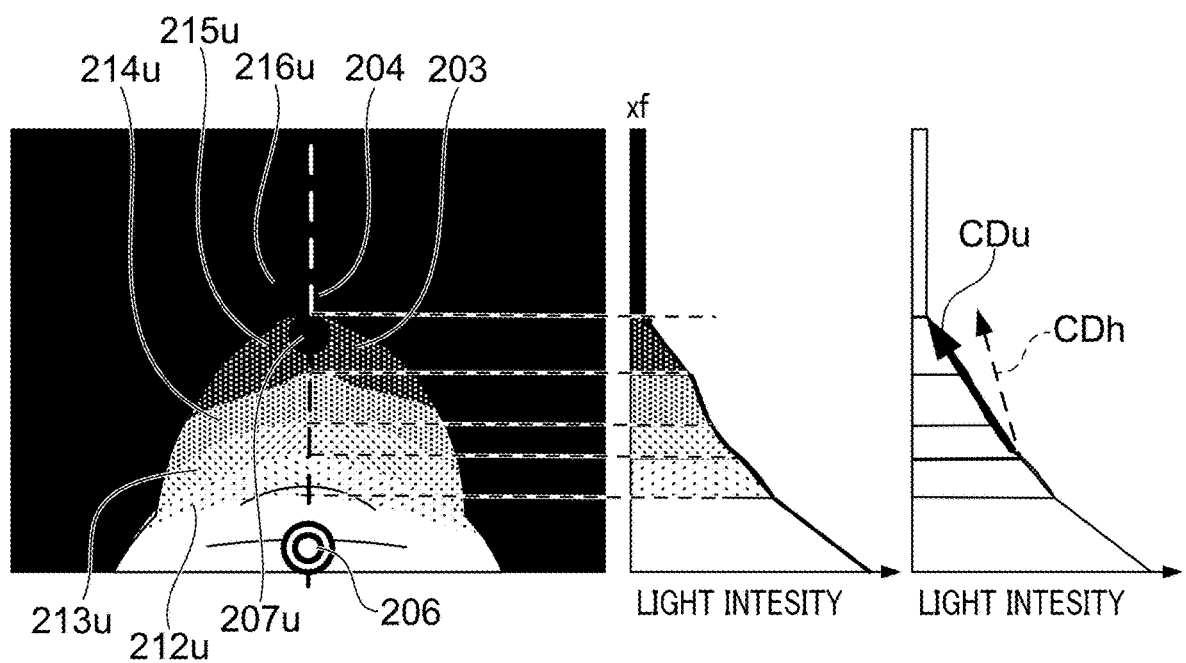
FIG. 8K is a view showing a result obtained by adjusting shades of a difference image, which is calculated by the similar method as FIG. 8E in a case that the user directs the face upward by 33°, so as to fit with a scale of light intensities of reflected components of infrared light projected to a face and neck of the user and by superimposing the double circle showing the throat position and the black circle showing the chin position.

FIG. 8J is a view showing an image of the user who directs the face upward by 33° from the horizontal direction viewed from the face direction detection window 13. Since the user directs the face upward as shown in FIG. 10C, the face 204 including the lip and nose cannot be seen from the face direction detection window 13 located under the user's jaw. The chin 203 and its neck side are seen. FIG. 8K shows distribution of the light intensity of the reflected light 25 in irradiating the user in the state shown in FIG. 10C with the infrared light 23. An image on the left side in FIG. 8K is a view showing a result obtained by adjusting shades of the difference image calculated by the same method as FIG. 8E so as to fit with a scale of light intensities of reflected components of the infrared light projected to the face and neck of the user and by superimposing the double circle showing the throat position 206 and the black circle showing a chin position 207u. Two graphs in FIG. 8K show density changes of the left image. The left graph is equivalent to the graph in FIG. 8F and the right graph is equivalent to the graph in FIG. 8G.

Six areas 211u, 212u, 213u, 214u, 215u, and 216u corresponding to the light intensities in FIG. 8K are indicated by adding "u" to the reference numerals of the same light intensity areas shown in FIG. 8F. Although the light intensity of the user's chin 203 is included in the middle gray area 214 in FIG. 8F, it shifts to the black side and is included in the slightly dark gray area 215u in FIG. 8K. In this way, since the distance Ffu is longer than the distance Ffh as shown in FIG. 10C, the infrared detection device 27 can detect that the light intensity of the reflected light 25 from the chin 203 is weakened in inverse proportion to the square of distance.

Figure 10D:
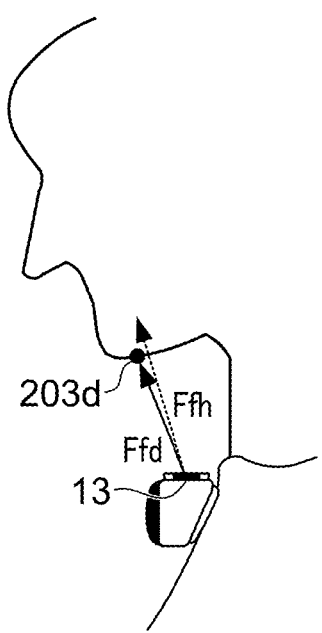

Next, detection of the face directed downward will be described. FIG. 10D is a view showing a state that the user directs the face downward by 22° from the horizontal direction. In FIG. 10D, a distance from the face direction detection window 13 to a chin 203d is Ffd.

Since the chin 203d moves downwardly together with the face, the distance Ffd becomes shorter than the distance Ffh as shown in FIG. 10D and the light intensity of the reflected light 25 from the chin 203d becomes stronger.

Returning back to FIG. 7C, in a step S211, the overall control CPU (a distance calculation unit) 101 calculates the distance from the chin position to the face direction detection window 13 on the basis of the light intensity of the chin position detected by the infrared detection device 27 of the face direction detection unit (a three-dimensional detection sensor) 20. A face angle in the vertical direction is also calculated on the basis of this.

In a step S212, the overall control CPU 101 stores the face angle in the lateral direction (a first detection direction) obtained in the step S210 and the face angle in the vertical direction (a second detection direction) obtained in the step S211 into the primary memory 103 as a three-dimensional observation direction vi ("i" is an arbitrary reference numeral) of the user. For example, when the user is observing the front center, the face angle θh in the lateral direction is 0° and the face angle θv in the vertical direction is 0°. Accordingly, an observation direction vo in this case is represented by vector information [0°, 0°]. Moreover, when the user is observing a right 45° direction, an observation direction vr is represented by vector information [45°, 0°].

Although the face angle in the vertical direction is calculated by detecting the distance from the face direction detection window 13 in the step S211, the face angle may be calculated by another method. For example, change of the face angle may be calculated by comparing change levels of the light intensity of the chin 203. That is, the change of the face angle may be calculated by comparing a gradient CDh of the reflected light intensity from the root 202 of the jaw to the chin 203 in the graph in FIG. 8G with a gradient CDu of the reflected light intensity from the root 202 of the jaw to the chin 203 in the graph in FIG. 8K.

Figure 7D:
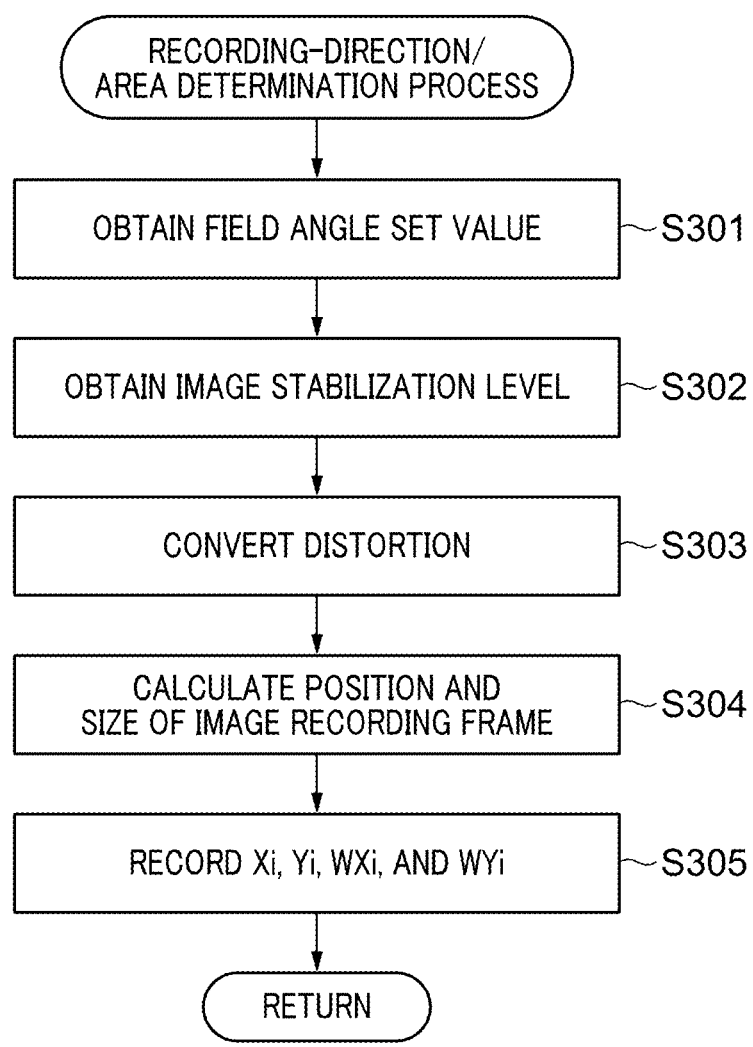
FIG. 7D is a flowchart showing a subroutine of a recording-direction/area determination process in a step S300 in FIG. 7A according to the first embodiment.

FIG. 7D is a flowchart showing a subroutine of the recording-direction/area determination process in the step S300 in FIG. 7A. Before describing details of this process, a superwide-angle image that is subjected to determine a recording direction and a recording area in this embodiment will be described first using FIG. 11A.

In the camera body 1 of this embodiment, the image pickup unit 40 picks up a superwide-angle image of the periphery of the image-pickup/detection unit 10 using the superwide-angle image pickup lens 16. An image of an observation direction can be obtained by extracting a part of the superwide-angle image.

Figure 11A:
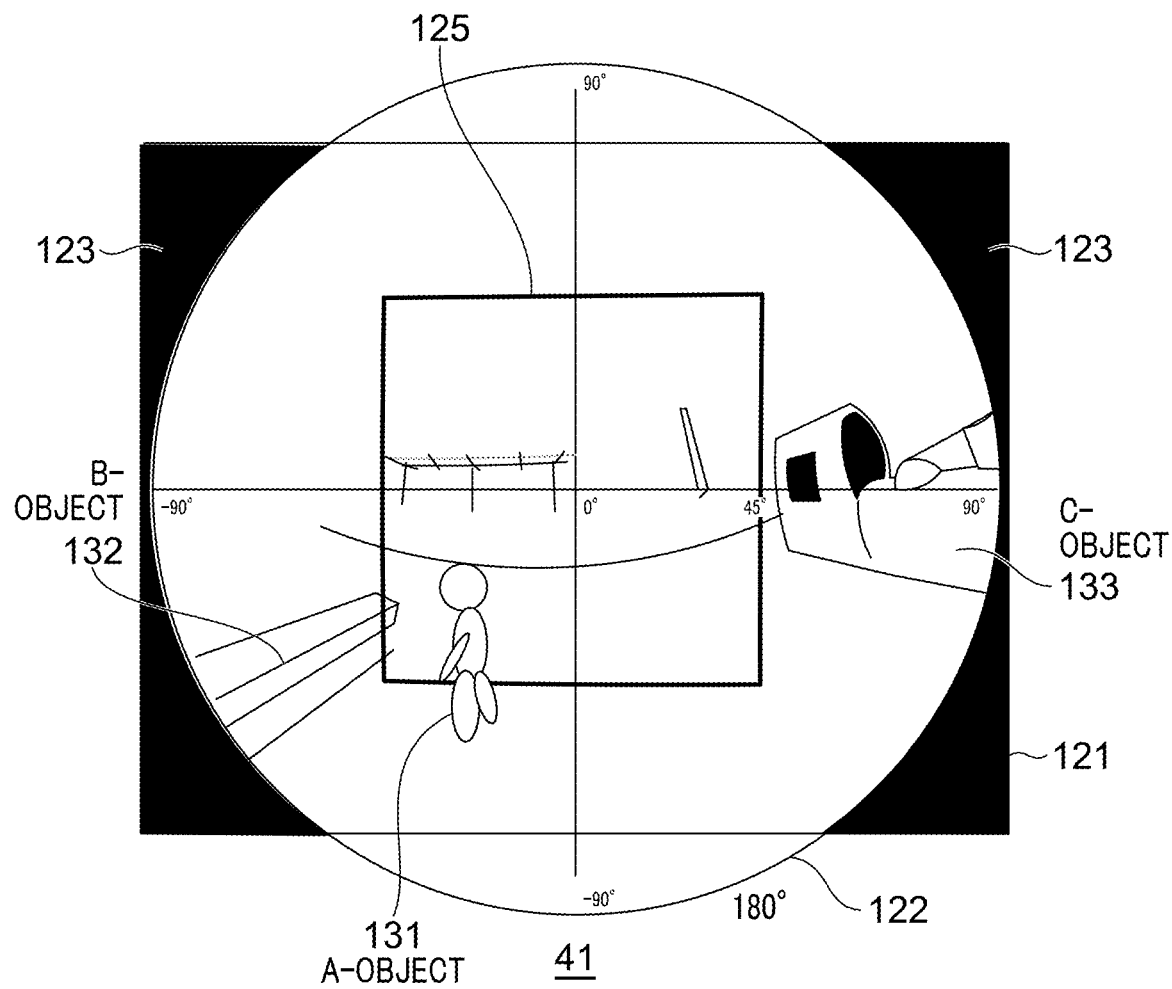
FIG. 11A is a view showing a target visual field set in a superwide-angle image picked up by an image pickup unit of the camera body in a case where the user faces the front.

FIG. 11A is a view showing a target visual field 125 set in a superwide-angle image picked up by the image pickup unit 40 in a case where the user faces the front.

As shown in FIG. 11A, a pixel area 121 that can be picked up by the solid state image sensor 42 is a rectangular area. Moreover, an effective projection area (a predetermined area) 122 is an area of a circular half-celestial sphere image that is a fish-eye image projected onto the solid state image sensor 42 by the image pickup lens 16. The image pickup lens 16 is adjusted so that the center of the pixel area 121 will match the center of the effective projection area 122.

The outermost periphery of the circular effective projection area 122 shows a position where an FOV (field of view) angle is 180°. When the user is looking at the center in both the vertical and horizontal directions, an angular range of the target visual field 125 that is picked up and recorded becomes 90° (a half of the FOV angle) centered on the center of the effective projection area 122. It should be noted that the image pickup lens 16 of this embodiment can also introduce light outside the effective projection area 122 and can project light within the maximum FOV angle 192° onto the solid state image sensor 42 as a fish-eye image. However, the optical performance falls greatly in the area outside the effective projection area 122. For example, resolution falls extremely, light amount falls, and distortion increases. Accordingly, in this embodiment, an image of an observation direction is extracted as a recording area only from the inside of the image (hereinafter referred to as a superwide-angle image, simply) projected in the pixel area 121 within the half-celestial sphere image displayed on the effective projection area 122.

Since the size of the effective projection area 122 in the vertical direction is larger than the size of the short side of the pixel area 121, the upper and lower ends of the image in the effective projection area 122 are out of the pixel area 121 in this embodiment. However, the relationship between the areas is not limited to this. For example, the optical system may be designed so that the entire effective projection area 122 will be included in the pixel area 121 by changing the configuration of the image pickup lens 16. Invalid pixel areas 123 are parts of the pixel area 121 that are not included in the effective projection area 122.

The target visual field 125 shows an area of an image of a user's observation direction that will be extracted from the superwide-angle image. The target visual field 125 is prescribed by left, right, upper, and lower field angles (45° in this case, the FOV angle 90°) centering on the observation direction. In the example of FIG. 11A, since the user faces the front, the center of the target visual field 125 becomes the observation direction vo that matches the center of the effective projection area 122.

The superwide-angle image shown in FIG. 11A includes an A-object 131 that is a child, a B-object 132 that shows steps that the child who is the A-object is trying to climb, and a C-object 133 that is locomotive-type playground equipment.

Next, the recording-direction/area determination process in the step S300 in FIG. 7A that is executed to obtain an image of an observation direction from the superwide-angle image described using FIG. 11A is shown in FIG. 7D. Hereinafter, this process is described using FIG. 12A through FIG. 12G that show concrete examples of the target visual field 125.

In a step S301, a field-angle set value $V_{ang}$ that is set in advance is obtained by reading from the primary memory 103.

In this embodiment, the internal nonvolatile memory 102 stores all the available field angles (45°, 90°, 110°, and 130°) as field-angle set values $V_{ang}$. The image extraction/development unit 50 extracts an image of an observation direction in an area defined by the field-angle set value $V_{ang}$ from the superwide-angle image. Moreover, the field-angle set value $V_{ang}$ included in the various set values read from the internal nonvolatile memory 102 in one of the steps S103, S106, and S108 in FIG. 7B is established and is being stored in the primary memory 103.

Moreover, in the step S301, the observation direction vi determined in the step S212 is determined as the recording direction, an image in the target visual field 125 of which the center is designated by the observation direction vi and of which an area is defined by the obtained field-angle set value $V_{ang}$ is extracted from the superwide-angle image, and the extracted image is stored into the primary memory 103.

Figure 11B:
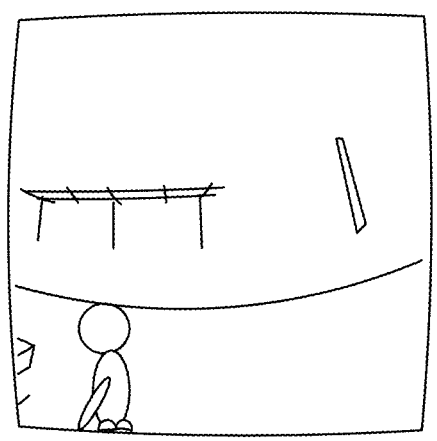
FIG. 11B is a view showing an image in the target visual field extracted from the superwide-angle image in FIG. 11A.

For example, when the field-angle set value $V_{ang}$ is 90° and the observation direction vo (vector information [0°, 0°]) is detected through the face direction detection process (FIG. 7C), the target visual field 125 of which the angular widths are 45° in left and right and are 45° in up and down (FIG. 11A) is established centering on the center O of the effective projection area 122. FIG. 11B is a view showing the image in the target visual field 125 extracted from the superwide-angle image in FIG. 11A. That is, the overall control CPU (a relative position setting unit) 101 sets the angle of the face direction detected by the face direction detection unit 20 to the observation direction vi that is the vector information showing the relative position of the target visual field 125 with respect to the superwide-angle image.

In the case of the observation direction vo, since the influence of the optical distortion caused by the image pickup lens 16 can be disregarded mostly, the shape of the established target visual field 125 is almost identical to the shape of a target visual field 125o (FIG. 12A) after converting the distortion in a step S303 mentions later. Hereinafter, a target visual field after converting the distortion in the case of the observation direction vi is called a target visual field 125i.

Next, an image stabilization level that is set in advance is obtained by reading from the primary memory 103 in a step S302.

In this embodiment, as mentioned above, the image stabilization level included in the various setting values read from the internal nonvolatile memory 102 in one of the steps S103, S106, and S108 is established and is being stored in the primary memory 103.

Moreover, in the step S302, an image-stabilization-margin pixel number Pis is set on the basis of the obtained image stabilization level.

In the image stabilization process, an image moved in a direction opposite to a blur direction is obtained on the basis of a blur amount of the image-pickup/detection unit 10.

Accordingly, in this embodiment, an image stabilization margin required for the image stabilization is established around the target visual field 125i.

Moreover, in this embodiment, a table that keeps values of the image-stabilization-margin pixel number Pis in association with respective image stabilization levels is stored in the internal nonvolatile memory 102. For example, when the image stabilization level is "middle", an image stabilization margin of which width is "100 pixels" that is the image-stabilization-margin pixel number Pis read from the above-mentioned table is established around the target visual field.

Figure 12A:
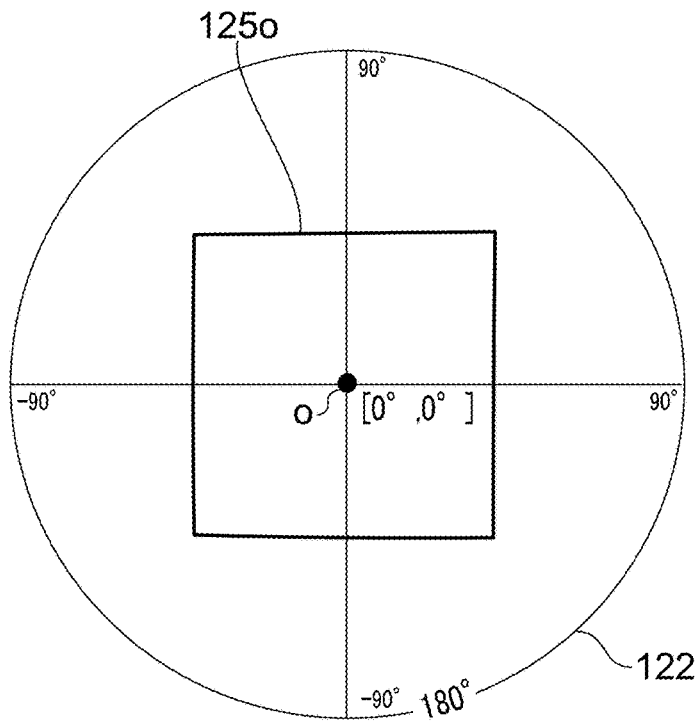
FIG. 12A is a view showing an example of the target visual field set in the superwide-angle image.
Figure 12B:
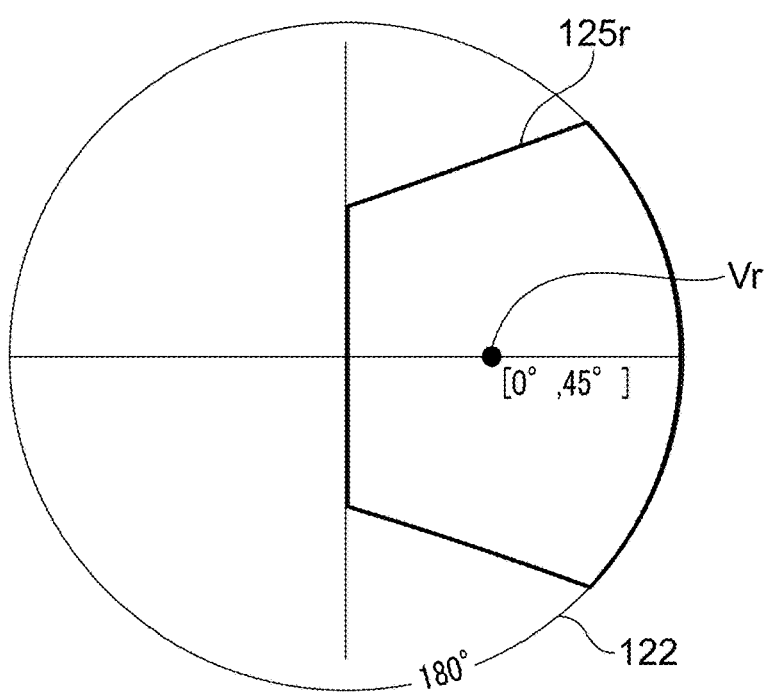
FIG. 12B is a view showing an example of the target visual field set in the superwide-angle image in a case where the field-angle set value is identical to that of the target visual field in FIG. 12A and where the observation direction differs.
Figure 12C:
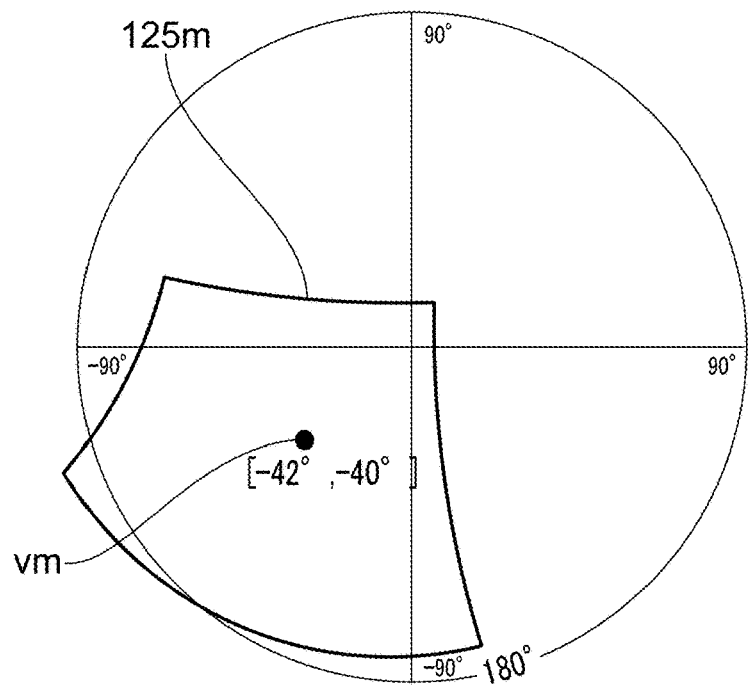
FIG. 12C is a view showing another example of the target visual field set in the superwide-angle image in a case where the field-angle set value is identical to that of the target visual field in FIG. 12A and where the observation direction differs.
Figure 12D:
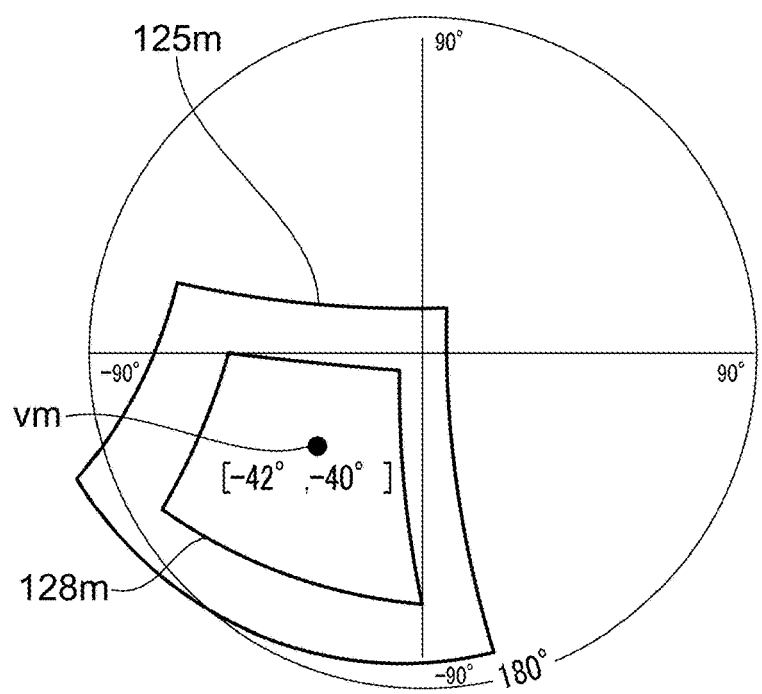
FIG. 12D is a view showing an example of the target visual field set in the superwide-angle image in a case where the observation direction is identical to that of the target visual field in FIG. 12C and where the field-angle set value is smaller.
Figure 12E:
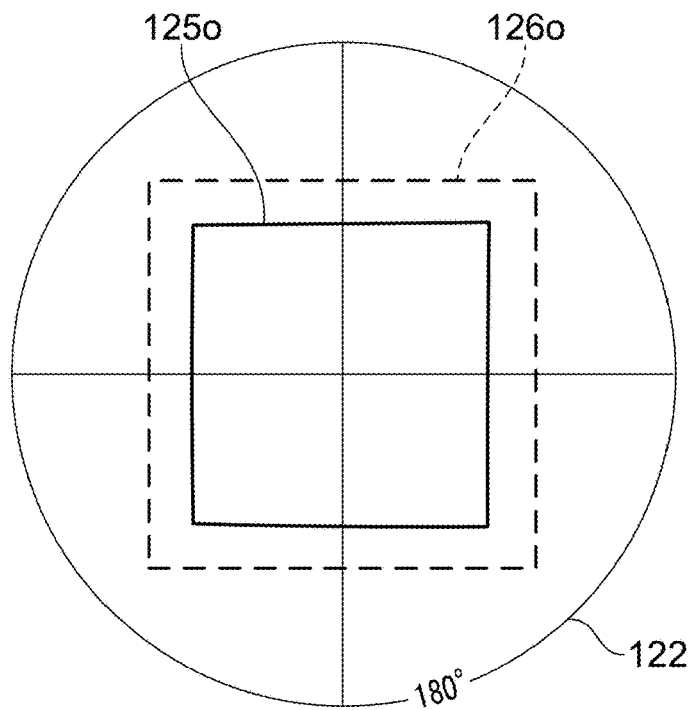
FIG. 12E is a view showing an example that gives an image stabilization margin corresponding to a predetermined image stabilization level around the target visual field shown in FIG. 12A.

FIG. 12E is a view showing an example that gives an image stabilization margin corresponding to a predetermined image stabilization level around the target visual field 125o shown in FIG. 12A. Hereinto, a case where the image stabilization level is "middle", i.e., where the image-stabilization-margin pixel number Pis is "100 pixels" will be described.

As shown by a dotted line in FIG. 12E, an image stabilization margin 126o of which the width is "100 pixels" that is the image-stabilization-margin pixel number Pis is established at the left, right, upper, and lower sides of the target visual field 125o.

FIG. 12A and FIG. 12E show the case where the observation direction vi matches the center O (the optical axis center of the image pickup lens 16) of the effective projection area 122 for simplification of the description. In the meantime, when the observation direction vi is directed to a periphery of the effective projection area 122, the conversion to reduce the influence of optical distortion is required.

In the step S303, the shape of the target visual field 125 established in the step S301 is corrected (converts distortion) in consideration of the observation direction vi and the optical property of the image pickup lens 16 to generate the target visual field 125i. Similarly, the image-stabilization-margin pixel number Pis set in the step S302 is also corrected in consideration of the observation direction vi and the optical property of the image pickup lens 16.

For example, the field-angle set value $V_{ang}$ shall be 90° and the user shall observe a right 45° direction from the center o. In this case, the observation direction vr (vector information [45°, 0°]) is determined in the step S212, and the area of 45° in left and right and 45° in up and down centering on the observation direction vr becomes the target visual field 125. Furthermore, the target visual field 125 is corrected to the target visual field 125r shown in FIG. 12B in consideration of the optical property of the image pickup lens 16.

As shown in FIG. 12B, the target visual field 125r becomes wider toward the periphery of the effective projection area 122. And the position of the observation direction vr approaches inside a little from the center of the target visual field 125r. This is because the optical design of the image pickup lens 16 in this embodiment is close to that of a stereographic projection fish-eye lens. It should be noted that contents of the correction depend on the optical design of the image pickup lens 16. If the image pickup lens 16 is designed as an equidistant projection fish-eye lens, an equal-solid-angle projection fish-eye lens, or an orthogonal projection fish-eye lens, the target visual field 125 is corrected according to its optical property.

Figure 12F:
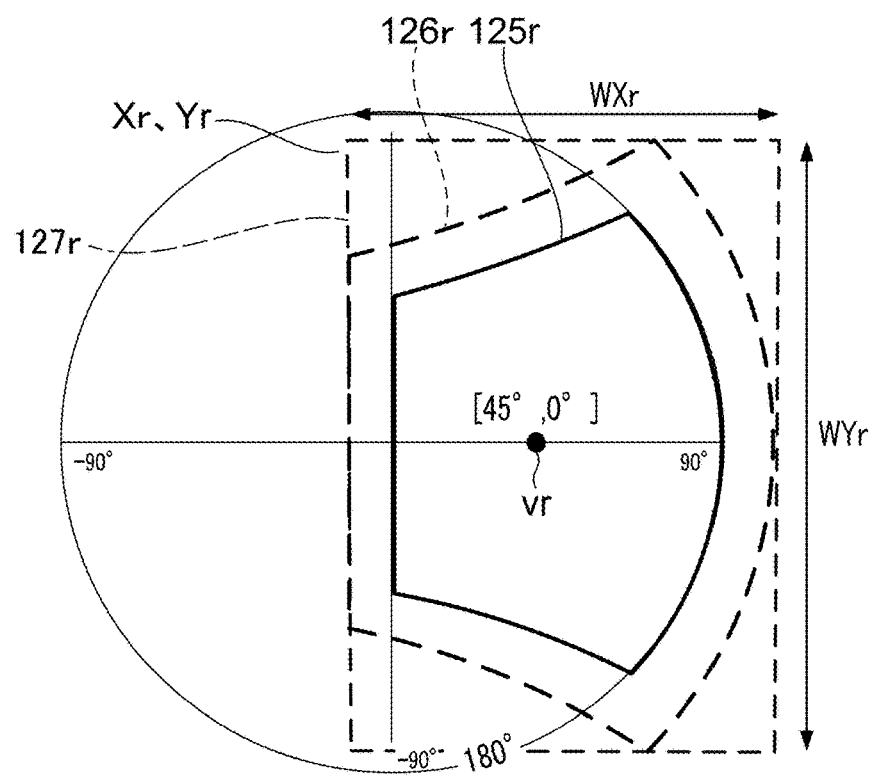
FIG. 12F is a view showing an example that gives an image stabilization margin corresponding to the same image stabilization level of the image stabilization margin in FIG. 12E around the target visual field shown in FIG. 12B.

FIG. 12F is a view showing an example that gives an image stabilization margin 126r corresponding to the same image stabilization level "middle" of the image stabilization margin in FIG. 12E around the target visual field 125r shown in FIG. 12B.

The image stabilization margin 126o (FIG. 12E) is established at the left, right, upper, and lower sides of the target visual field 125o with the width of "100 pixels" that is the image-stabilization-margin pixel number Pis. As compared with this, the image-stabilization-margin pixel number Pis of the image stabilization margin 126r (FIG. 12F) is corrected so as to increase toward the periphery of the effective projection area 122.

In this way, the shape of the image stabilization margin established around the target visual field 125r is also corrected as with the shape of the target visual field 125r so that the correction amount will increase toward the periphery of the effective projection area 122 as shown by the image stabilization margin 126r in FIG. 12F. This is also because the optical design of the image pickup lens 16 in this embodiment is close to that of a stereographic projection fish-eye lens. It should be noted that contents of the correction depend on the optical design of the image pickup lens 16. If the image pickup lens 16 is designed as an equidistant projection fish-eye lens, an equal-solid-angle projection fish-eye lens, or an orthogonal projection fish-eye lens, the image stabilization margin 126r is corrected according to its optical property.

The process executed in the step S303 that switches successively the shapes of the target visual field 125 and its image stabilization margin in consideration of the optical property of the image pickup lens 16 is a complicated process. Accordingly, in this embodiment, the process in the step S303 is executed using a table that keeps shapes of the target visual field 125i and its image stabilization margin for every observation direction vi stored in the internal nonvolatile memory 102. It should be noted that the overall control CPU 101 may have a computing equation corresponding to the optical design of the image pickup lens 16. In such a case, the overall control CPU 101 can calculate an optical distortion value using the computing equation.

In a step S304, a position and size of an image recording frame are calculated. As mentioned above, the image stabilization margin 126i is established around the target visual field 125i. However, when the position of the observation direction vi is close to the periphery of the effective projection area 122, the shape of the image stabilization margin becomes considerably special as shown by the image stabilization margin 126r, for example.

The overall control CPU 101 can extract an image only in such a special-shaped area and apply the development process to the extracted image. However, it is not general to use an image that is not rectangular in recording as image data in the step S600 or in transmitting image data to the display apparatus 800 in the step S700. Accordingly, in the step S304, the position and size of the image recording frame 127i of a rectangular shape that includes the entire image stabilization margin 126i are calculated.

FIG. 12F shows the image recording frame 127r that is calculated in the step S304 to the image stabilization margin 126r by an alternate long and short dash line.

In a step S305, the position and size of the image recording frame 127i that are calculated in the step S304 are recorded into the primary memory 103.

In this embodiment, an upper-left coordinate (Xi, Yi) of the image recording frame 127i in the superwide-angle image is recorded as the position of the image recording frame 127i, and a lateral width WXi and a vertical width WYi that start from the coordinate (Xi, Yi) are recorded as the size of the image recording frame 127i. For example, a coordinate (Xr, Yr), a lateral width WXr, and a vertical width WYr of the image recording frame 127r shown in FIG. 12F are recorded in the step S305. It should be noted that the coordinate (Xi, Yi) is a XY coordinate of which an origin is a predetermined reference point, specifically the optical center of the image pickup lens 16.

When the image stabilization margin 126*i* and the image recording frame 127*i* have been determined in this way, the process exits from this subroutine shown in FIG. 7D.

In the description so far, the observation directions of which the horizontal angle is 0°, such as the observation direction v0 (the vector information [0°, 0°]) and the observation direction vr (the vector information [45°, 0°]), have been described for simplifying the description of the complicated optical distortion conversion. In the meantime, an actual observation direction vi of the user is arbitrary. Accordingly, the recording area development process executed in a case where the horizontal angle is not 0° will be described hereinafter. For example, when the field-angle set value $V_{ang}$ is 90° and the observation direction vm is [−42°, −40°], the target visual field 125*m* appears as shown in FIG. 12C.

Figure 12G:
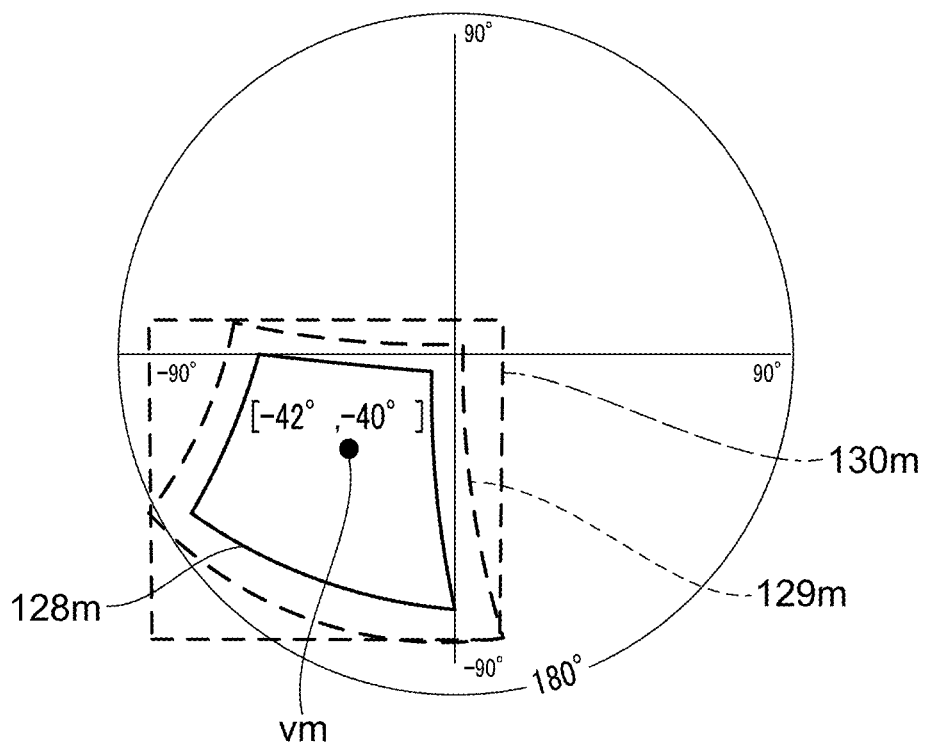
FIG. 12G is a view showing an example that gives an image stabilization margin corresponding to the same image stabilization level of the image stabilization margin in FIG. 12E around the target visual field shown in FIG. 12D.

Moreover, even when the observation direction vm (the vector information [−42°, −40°]) is the same as the target visual field 125*m*, when the field-angle set value $V_{ang}$ is 45°, a target visual field 128*m*, which is slightly smaller than the target visual field 125*m*, appears as shown in FIG. 12D. Furthermore, an image stabilization margin 129*m* and an image recording frame 130*m* are established around the target visual field 128*m* as shown in FIG. 12G.

Since the process in the step S400 is a fundamental image pickup operation and employs a general sequence of the image pickup unit 40, its detailed description is omitted. It should be noted that the image signal processing circuit 43 in the image pickup unit 40 in this embodiment also performs a process that converts signals of an inherent output format (standard examples: MIPI, SLVS) output from the solid state image sensor 42 into pickup image data of a general sensor reading system.

When the video image mode is selected by the image pickup mode switch 12, the image pickup unit 40 starts recording in response to a press of the start switch 14. After that, the recording is finished when the stop switch 15 is pressed. In the meantime, when the still image mode is selected by the image pickup mode switch 12, the image pickup unit 40 picks up a static image every time when the start switch 14 is pressed.

Figure 7E:
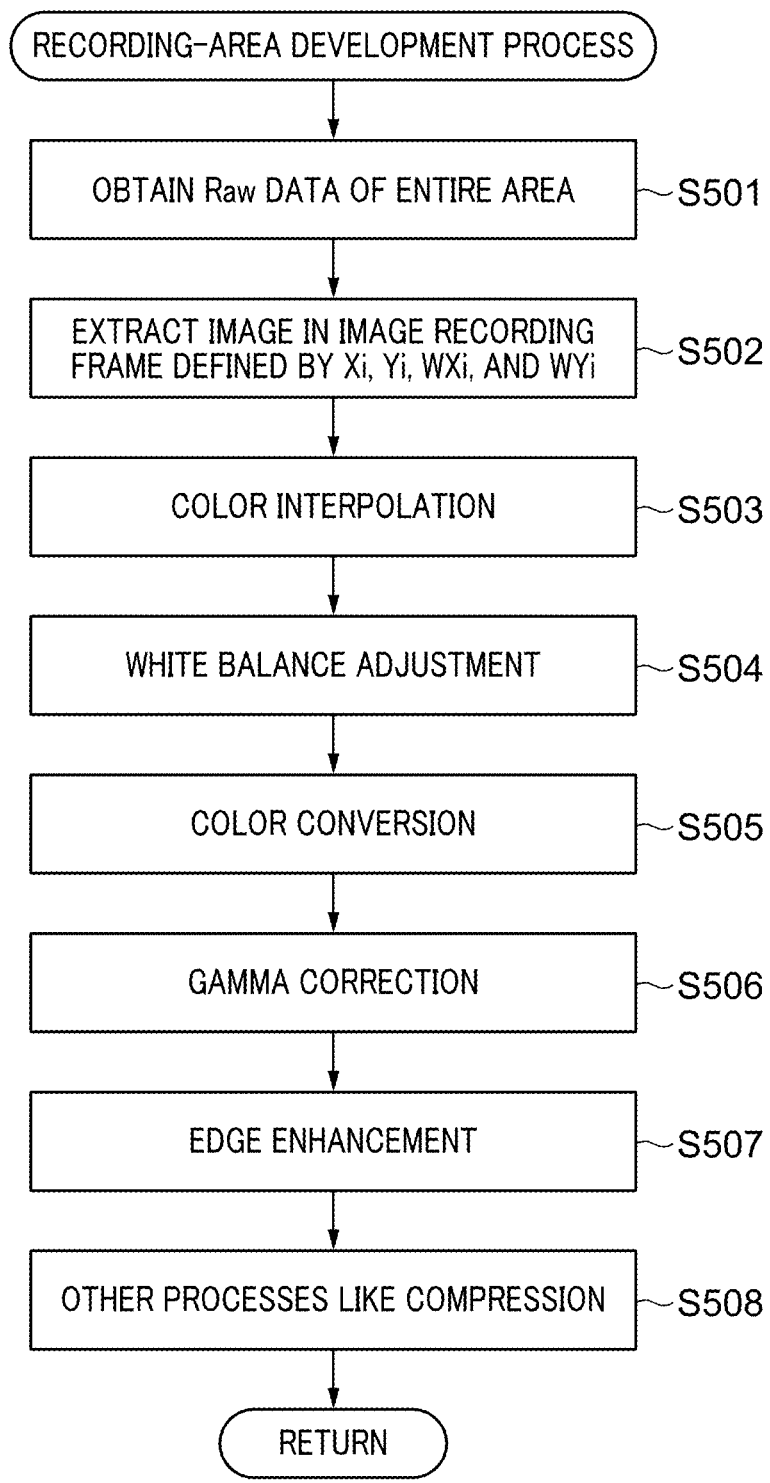
FIG. 7E is a flowchart showing a subroutine of a recording-area development process in a step S500 in FIG. 7A according to the first embodiment.

FIG. 7E is a flowchart showing a subroutine of the recording-area development process in the step S500 in FIG. 7A.

In a step S501, Raw data of the entire area of the pickup image data (superwide-angle image) generated by the image pickup unit 40 in the step S400 is obtained and is input into an image capturing unit called a head unit (not shown) of the overall control CPU 101.

Next, in a step S502, the image within the image recording frame 127*i* is extracted from the superwide-angle image obtained in the step S501 on the basis of the coordinate (Xi, Yi), lateral width WXi, and vertical width WYi that are recorded into the primary memory 103 in the step S305. After the extraction, a crop development process (FIG. 7F) consisting of steps S503 through S508 is executed only to the pixels within the image stabilization margin 126*i*. This can reduce a calculation amount significantly as compared with a case where the development process is executed to the entire area of the superwide-angle image read in the step S501. Accordingly, calculation time and electric power consumption can be reduced.

Figure 7F:
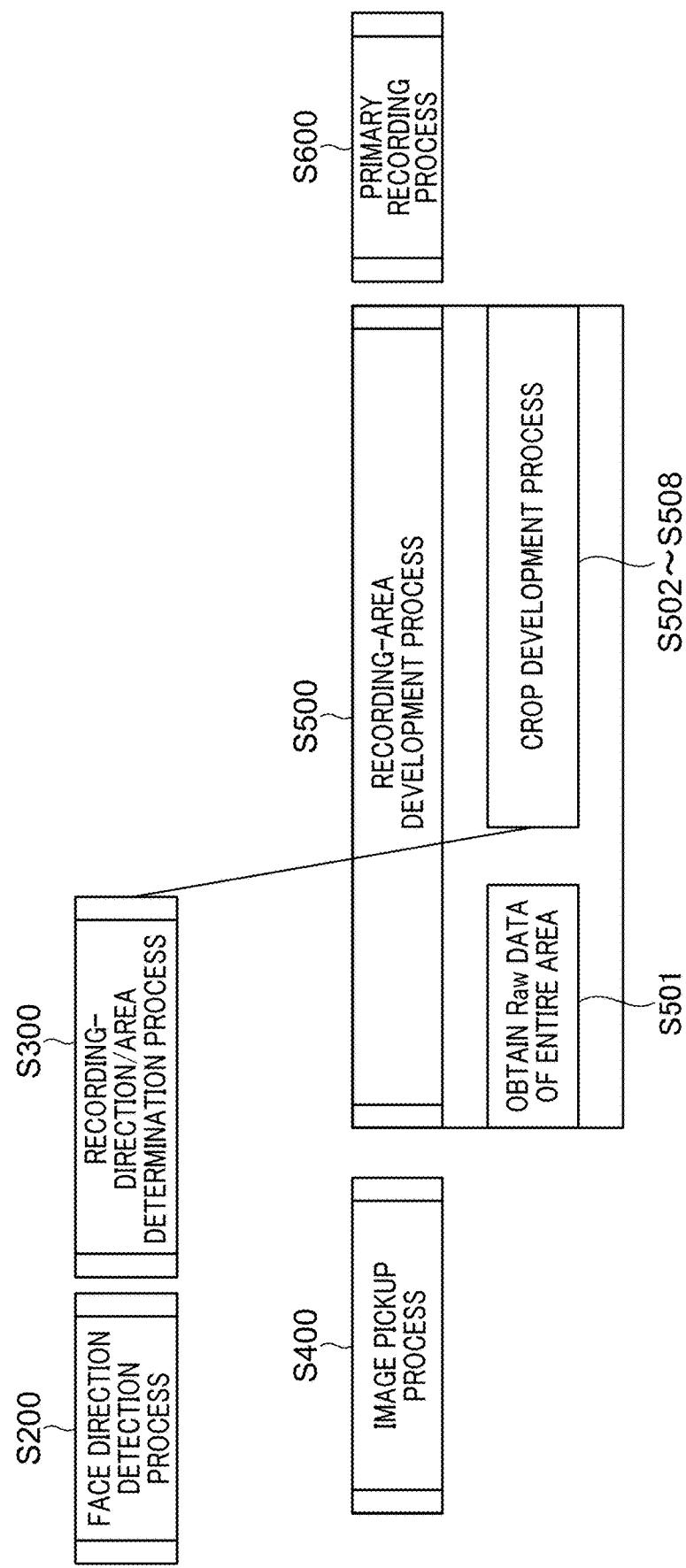
FIG. 7F is a view for describing a process in the steps S200 through S500 in FIG. 7A in a video image mode.

As shown in FIG. 7F, when the video image mode is selected by the image pickup mode switch 12, the processes of the steps S200 and S300 and the process of the step S400 are executed in parallel by the same frame rate or different frame rates. Whenever the Raw data of the entire area of one frame generated by the image pickup unit 40 is obtained, the crop development process is executed on the basis of the coordinate (Xi, Yi), lateral width WXi, and vertical width WYi that are recorded in the primary memory 103 at that time point.

When the crop development process is started to the pixels within the image stabilization margin 126*i*, color interpolation that interpolates data of color pixels arranged in the Bayer arrangement is executed in the step S503. After that, a white balance is adjusted in a step S504, and then, a color conversion is executed in a step S505. In a step S506, γ correction that corrects gradation according to a γ correction value set up beforehand is performed. In a step S507, edge enhancement is performed in accordance with an image size.

In the step S508, the image data is converted into a data format that can be stored primarily by applying processes like compression. The converted image data is stored into the primary memory 103. After that, the process exits from the subroutine. Details of the data format that can be stored primarily will be mentioned later.

The order and presences of the processes in the crop development process executed in the steps S503 through S508 may be set up according to the property of the camera system and they do not restrict the present invention. Moreover, when the video image mode is selected, the processes of the steps S200 through S500 are repeatedly executed until the recording is finished.

According to this process, the calculation amount is significantly reduced as compared with a case where the development process is executed to the entire area read in the step S501. Accordingly, an inexpensive and low-power consumption microcomputer can be employed as the overall control CPU 101. Moreover, heat generation in the overall control CPU 101 is reduced and the life of the battery 94 becomes longer.

Moreover, in order to reduce a control load on the overall control CPU 101, the optical correction process (the step S800 in FIG. 7A) and the image stabilization process (the step S900 in FIG. 7A) to the image are not executed by the camera body 1 in this embodiment. These processes are executed by the display-apparatus controller 801 after transferring the image to the display apparatus 800. Accordingly, if only data of a partial image extracted from a projected superwide-angle image is transferred to the display apparatus 800, neither the optical correction process nor the image stabilization process can be executed. That is, since the data of the extracted image does not include position information that will be substituted to a formula of the optical correction process and will be used to refer the correction table of the image stabilization process, the display apparatus 800 cannot execute these processes correctly. Accordingly, in this embodiment, the camera body 1 transmits correction data including information about an extraction position of an image from a superwide-angle image together with data of the extracted image to the display apparatus 800.

When the extracted image is a still image, since the still image data corresponds to the correction data one-to-one, the display apparatus 800 can execute the optical correction process and image stabilization process correctly, even if these data are separately transmitted to the display apparatus 800. In the meantime, when the extracted image is a video image, if the video image data and the correction data are separately transmitted to the display apparatus 800, it becomes difficult to determine correspondence between each frame of the video image data and the correction data. Particularly, when a clock rate of the overall control CPU 101 in the camera body 1 slightly differs from a clock rate of the display-apparatus controller 801 in the display apparatus 800, the synchronization between the overall control CPU 101 and the display-apparatus controller 801 will be lost during the video image pickup operation for several minutes. This may cause a defect that the display-apparatus controller 801 corrects a frame with correction data different from the corresponding correction data.

Accordingly, in this embodiment, when transmitting data of an extracted video image to the display apparatus 800, the camera body 1 gives its correction data appropriately to the data of the video image. Hereinafter, the method is described.

Figure 14:
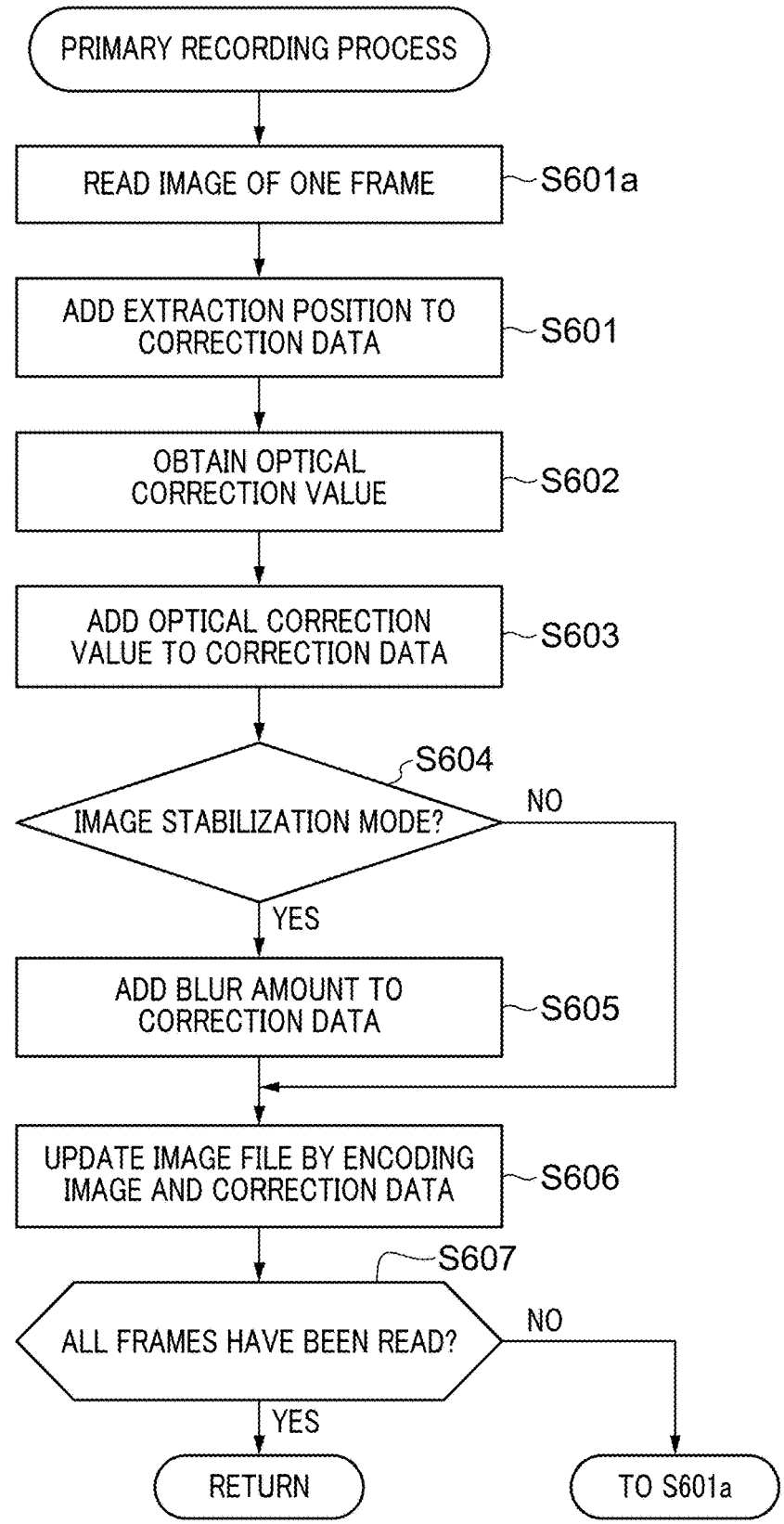
FIG. 14 is a flowchart showing a subroutine of a primary recording process in a step S600 in FIG. 7A.

FIG. 14 is a flowchart showing the subroutine of the primary recording process in the step S600 in FIG. 7A. Hereinafter, this process will be described by also referring to FIG. 15. FIG. 14 shows the process of a case where the video image mode is selected by the image pickup mode switch 12. When the still image mode is selected, this process starts from a step S601 and is finished after a process of a step S606.

In a step S601a, the overall control CPU 101 reads an image of one frame to which the processes in steps S601 through S606 have not been applied from among the video image developed in the recording area development process (FIG. 7E). Moreover, the overall control CPU (a metadata generation unit) 101 generates correction data that is metadata of the read frame.

In the step S601, the overall control CPU 101 attaches the information about the extraction position of the image of the frame read in the step S601a to the correction data. The information attached in this step is the coordinate (Xi, Yi) of the image recording frame 127i obtained in the step S305. It should be noted that the information attached in this step may be the vector information that shows the observation direction vi.

In a step S602, the overall control CPU (an optical-correction-value obtainment unit) 101 obtains an optical correction value. The optical correction value is the optical distortion value set up in the step S303. Alternatively, the optical correction value may be a correction value corresponding to the lens optical property, such as a marginal-light-amount correction value or a diffraction correction value.

In a step S603, the overall control CPU 101 attaches the optical correction value used for the distortion conversion in the step S602 to the correction data.

In a step S604, the overall control CPU 101 determines whether the image stabilization mode is effective. Specifically, when the image stabilization mode set up in advance is "Middle" or "Strong", it is determined that the image stabilization mode is effective and the process proceeds to a step S605. In the meantime, when the image stabilization mode set up in advance is "OFF", it is determined that the image stabilization mode is not effective and the process proceeds to the step S606. The reason why the step S605 is skipped when the image stabilization mode is "OFF" is because the calculation data amount of the overall control CPU 101 and the data amount of the wireless communication are reduced and the power consumption and heat generation of the camera body 1 can be reduced by skipping the step S605. Although the reduction of the data used for the image stabilization process is described, the data about the marginal-light-amount correction value or the data about the diffraction correction value obtained as the optical correction value in the step S602 may be reduced.

Although the image stabilization mode is set up by the user's operation to the display apparatus 800 in advance in this embodiment, it may be set up as a default setting of the camera body 1. Moreover, when the camera system is configured to switch the effectiveness of the image stabilization process after transferring image data to the display apparatus 800, the process may directly proceed to the step S605 from the step S603 by omitting the step S604.

In the step S605, the overall control CPU (a moving amount detection unit) 101 attaches the gyro data, which is associated with the frame read in the step S601a and is stored in the primary memory 813, to the correction data.

In the step S606, the overall control CPU 101 updates a video file 1000 (FIG. 15) by data obtained by encoding the image data of the frame read in the step S601a and the correction data to which the various data are attached in the steps S601 through S605. It should be noted that when a first frame of the video image is read in the step S601a, the video file 1000 is generated in the step S606.

In a step S607, the overall control CPU 101 determines whether all the frames of the video image developed by the recording area development process (FIG. 7E) have been read. When not all the frames have been read, the process returns to the step S601a. In the meantime, when all the frames have been read, the process exits from this subroutine. The generated video file 1000 is stored into the internal nonvolatile memory 102. The video file may be stored into the large-capacity nonvolatile memory 51 too in addition to the primary memory 813 and the internal nonvolatile memory 102. Moreover, the transmission process (the step S700 in FIG. 7A) that transfers the generated image file 1000 to the display apparatus 800 immediately is executed. The image file 1000 may be stored into the primary memory 813 after transferring it to the display apparatus 800.

In this embodiment, the encoding means to combine the image data and the correction data into one file. At that time, the image data may be compressed or the data file that is combined by the image data and correction data may be compressed.

Figure 15:
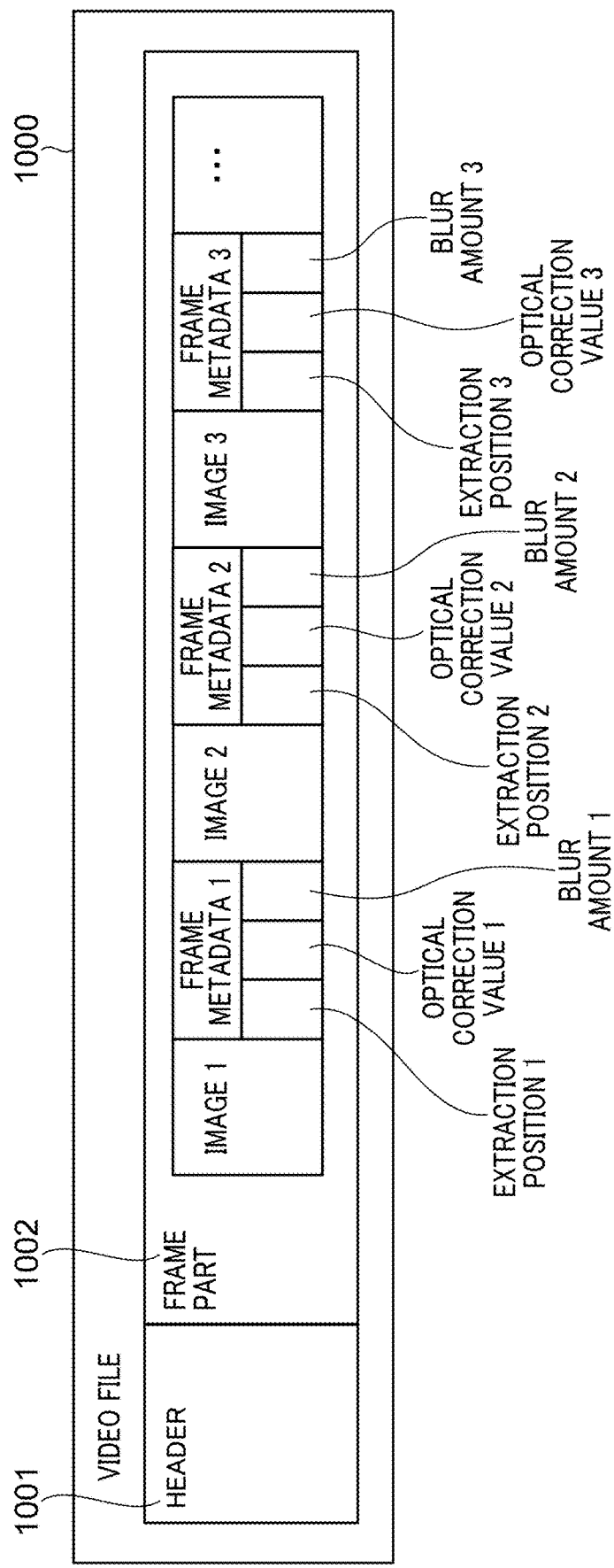
FIG. 15 is a view showing a data structure of an image file generated by the primary recording process.

FIG. 15 is a view showing a data structure of the video file 1000. The video file 1000 consists of a header part 1001 and a frame part 1002. The frame part 1002 consists of frame data sets each of which consists of an image of each frame and corresponding frame metadata. That is, the frame part 1002 includes frame data sets of the number of the total frames of the video image.

In this embodiment, the frame metadata is information obtained by encoding correction data to which an extraction position (in-image position information), an optical correction value, and gyro data are attached if needed. However, the frame metadata is not limited to this. An information amount of the frame metadata may be changed. For example, other information may be added to the frame metadata according to the image pickup mode selected by the image pickup mode switch 12. Alternatively, a part of the information in the frame metadata may be deleted.

An offset value to a frame data set of each frame or a head address of each frame is recorded in the header part 1001. Alternatively, metadata like the time and size corresponding to the video file 1000 may be stored in the header part 1001.

In the primary recording process (FIG. 14), the video file 1000 is transferred to the display apparatus 800 in this way. The video file 1000 includes data sets each of which consists of a frame of the video image developed by the recording area development process (FIG. 7E) and its metadata. Accordingly, even when the clock rate of the overall control CPU 101 in the camera body 1 slightly differs from the clock rate of the display-apparatus controller 801 in the display apparatus 800, the display-apparatus controller 801 appropriately applies the correction process to the video image developed in the camera body 1.

Although the optical correction value is included in the frame metadata in this embodiment, the optical correction value may be given to the entire video image.

Figure 16:
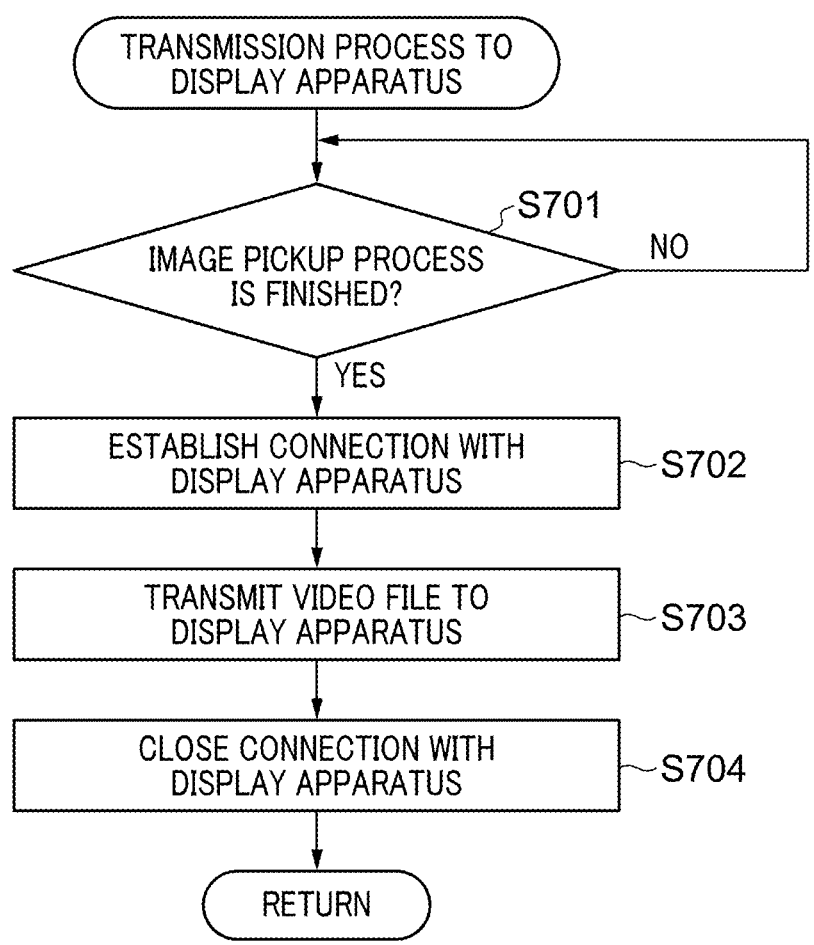
FIG. 16 is a flowchart of the subroutine of a transmission process to the display apparatus in a step S700 in FIG. 7A.

FIG. 16 is a flowchart showing the subroutine of the transmission process to the display apparatus 800 in the step S700 in FIG. 7A. FIG. 16 shows the process of a case where the video image mode is selected by the image pickup mode switch 12. It should be noted that when the still image mode is selected, this process starts from a process in a step S702.

In a step S701, it is determined whether the image pickup process (the step S400) of the video image by the image pickup unit 40 is finished or is under recording. When the video image is recording, the recording area development process (the step S500) for each frame and the update of the image file 1000 (the step S606) in the primary recording process (the step S600) are executed sequentially. Since a power load of wireless transmission is large, if the wireless transmission is performed during the video image pickup operation in parallel, the battery 94 is needed to have large battery capacity or a new measure against heat generation is needed. Moreover, from a viewpoint of arithmetic capacity, if the wireless transmission is performed during the video image pickup operation in parallel, an arithmetic load will become large, which needs to prepare a high-specification CPU as the overall control CPU 101, increasing the cost.

In view of these points, in this embodiment, the overall control CPU 101 proceeds with the process to a step S702 after the video image pickup operation is finished (YES in the step S701), and establishes the wireless connection with the display apparatus 800. In the meantime, if the camera system of the embodiment has a margin in the electric power supplied from the battery 94 and a new measure against heat generation is unnecessary, the overall control CPU 101 may beforehand establish the wireless connection with the display apparatus 800 when the camera body 1 is started or before starting the recording.

In the step S702, the overall control CPU 101 establishes the connection with the display apparatus 800 through the high-speed wireless communication unit 72 in order to transfer the video file 1000 having much data volume to the display apparatus 800. It should be noted that the small-power wireless communication unit 71 is used for transmission of a low-resolution image for checking a field angle to the display apparatus 800 and is used for exchange of various set values with the display apparatus 800. In the meantime, the small-power wireless communication unit 71 is not used for transfer of the video file 1000 because a transmission period becomes long.

In a step S703, the overall control CPU 101 transfers the video file 1000 to the display apparatus 800 through the high-speed wireless communication unit 72. When the transmission is finished, the overall control CPU 101 proceeds with the process to a step S704. In the step S704, the overall control CPU 101 closes the connection with the display apparatus 800 and exits from this subroutine.

The case where one image file includes the images of all the frames of one video image is transferred has been described so far. In the meantime, if the recording period of the video image is longer than several minutes, the video image may be divided by a unit time into a plurality of image files. When the video file has the data structure shown in FIG. 15, even if one video image is transferred to the display apparatus 800 as a plurality of image files, the display apparatus 800 can correct the video image without the timing gap with the correction data.

Figure 17:
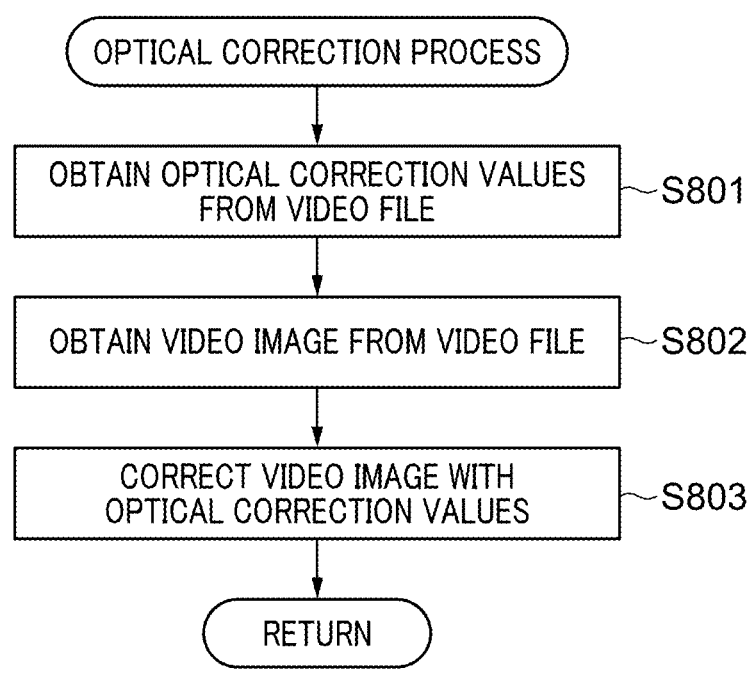
FIG. 17 is a flowchart showing a subroutine of an optical correction process in a step S800 in FIG. 7A.

FIG. 17 is a flowchart showing a subroutine of the optical correction process in the step S800 in FIG. 7A. Hereinafter, this process will be described by also referring to FIG. 18A through FIG. 18E. As mentioned above, this process is executed by the display-apparatus controller 801 of the display apparatus 800.

In a step S801, the display-apparatus controller (a video file reception unit) 801 first receives the video file 1000 from the camera body 1 transferred in the transmission process (the step S700) to the display apparatus 800. After that, the display-apparatus controller (a first extraction unit) 801 obtains the optical correction values extracted from the received video file 1000.

In the next step S802, the display-apparatus controller (a second extraction unit) 801 obtains an image (an image of one frame obtained by the video image pickup operation) from the video file 1000.

In a step S803, the display-apparatus controller (a frame image correction unit) 801 corrects optical aberrations of the image obtained in the step S802 with the optical correction value obtained in the step S801, and stores the corrected image into the primary memory 813. When the extraction from the image obtained in the step S802 is performed in the optical correction, an image area (extraction-development area) that is narrower than the development area (target visual field 125*i*) determined in the step S303 is extracted and is subjected to the process.

FIG. 18A through FIG. 18F are views for describing a process of applying distortion correction in the step S803 in FIG. 17.

Figure 18A:
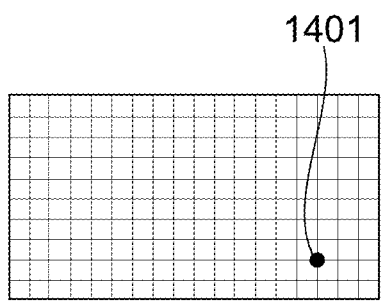
FIG. 18A through FIG. 18F are views for describing a process of applying distortion correction in a step S803 in FIG. 17.
Figure 18B:
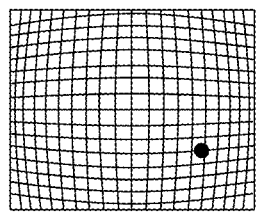

FIG. 18A is a view showing a position of an object 1401 at which the user looks with a naked eye in picking up an image. FIG. 18B is a view showing an image of the object 1401 formed on the solid state image sensor 42.

Figure 18C:
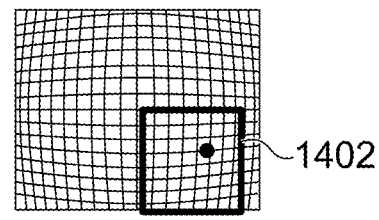

FIG. 18C is a view showing a development area 1402 in the image in FIG. 18B. The development area 1402 is the extraction-development area mentioned above.

Figure 18D:
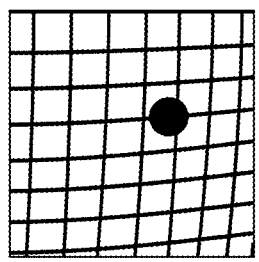
Figure 18E:
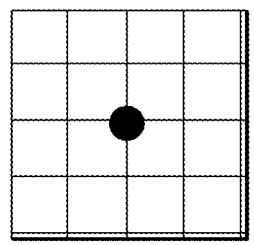

FIG. 18D is a view showing an extraction-development image obtained by extracting the image of the development area 1402. FIG. 18E is a view showing an image obtained by correcting distortion in the extraction-development image shown in FIG. 18D. Since an extraction process is performed in correcting distortion of the extraction-development image, a field angle of the image shown in FIG. 18E becomes still smaller than that of the extraction-development image shown in FIG. 18D.

Figure 19:
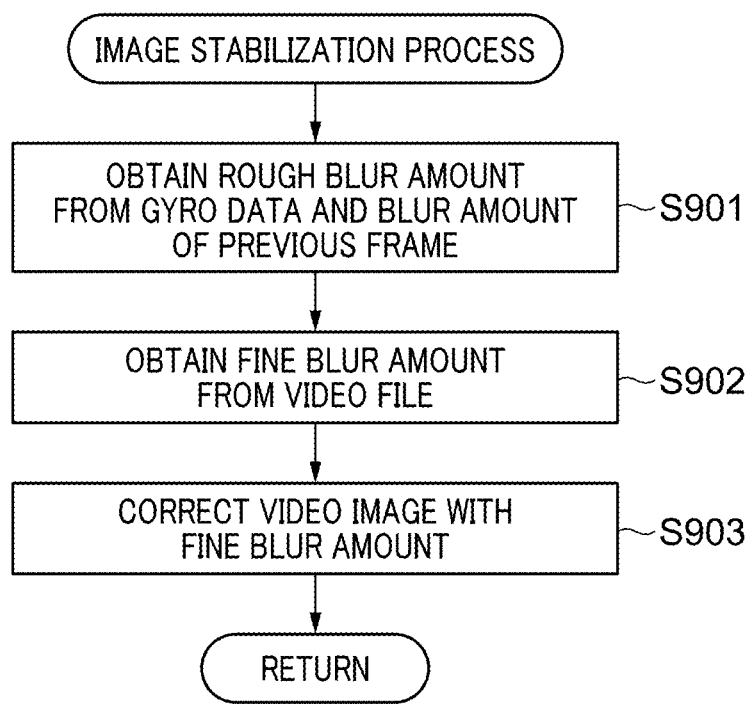
FIG. 19 is a flowchart showing a subroutine of an image stabilization process in a step S900 in FIG. 7A.

FIG. 19 is a flowchart showing a subroutine of the image stabilization process in the step S900 in FIG. 7A. As mentioned above, this process is executed by the display-apparatus controller 801 of the display apparatus 800.

In a step S901, the display-apparatus controller 801 obtains gyro data of a frame (current frame) that is currently processed and gyro data of a frame (previous frame) that is an immediately preceding frame from the frame metadata of the video file 1000. Moreover, in the step S901, a blur amount $V_{n-1}^{Det}$ of the previous frame calculated in a step S902 mentioned below is also obtained. After that, a rough blur amount $V_n^{Pre}$ is calculated from these pieces of information.

In the step S902, the display-apparatus controller 801 calculates a fine blur amount $V_n^{Det}$ from the video file. A blur amount is detected by calculating a moving amount of a feature point in the image from a previous frame to a current frame.

A feature point can be extracted by a known method. For example, a method using a luminance information image that is generated by extracting only luminance information of an image of a frame may be employed. This method subtracts an image that shifts the original luminance information image by one or several pixels from the original luminance information image. A pixel of which an absolute value of difference exceeds a threshold is extracted as a feature point. Moreover, an edge extracted by subtracting an image generated by applying a high-pass filter to the above-mentioned luminance information image from the original luminance information image may be extracted as a feature point.

Differences are calculated multiple times while shifting the luminance information images of the current frame and previous frame by one or several pixels. The moving amount is obtained by calculating a position at which the difference at the pixel of the feature point diminishes.

Since a plurality of feature points are needed as mentioned later, it is preferable to divide each of the images of the present frame and previous frame into a plurality of blocks and to extract a feature point for each block. A block division depends on the number of pixels and aspect ratio of the image. In general, 12 blocks of 4*3 or 54 blocks of 9*6 are preferable. When the number of blocks is too small, trapezoidal distortion due to a tilt of the image pickup unit 40 of the camera body 1 and rotational blur around the optical axis, etc. cannot be corrected correctly. In the meantime, when the number of blocks is too large, a size of one block becomes small, which shortens a distance between adjacent feature points, causing an error. In this way, the optimal number of blocks is selected depending on the pixel number, ease of detection of feature points, a field angle of an object, etc.

Since the calculation of the moving amount needs a plurality of difference calculations while shifting the luminance information images of the current frame and previous frame by one or several pixels, the calculation amount increases. Since the moving amount is actually calculated on the basis of the rough blur amount V" and deviation (the number of pixels) therefrom, the difference calculations are performed only near the rough blur amount, which can significantly reduce the calculation amount.

Next, in a step S903, the display-apparatus controller 801 performs the image stabilization process using the fine blur amount $V_n^{Det}$ obtained in the step S902. And then, the process exits form this subroutine.

It should be noted that Euclidean transformation and affine transformation that enable rotation and parallel translation, and projective transformation that enables keystone correction are known as the method of the image stabilization process.

Although the Euclid transformation can correct movement in an X-axis direction and a Y-axis direction and rotation, it cannot correct blur caused by camera shake of the image pickup unit 40 of the camera body 1 in a front-back direction or directions of pan and tilt. Accordingly, in this embodiment, the image stabilization process is executed using the affine transformation that enables correction of skew. The affine transformation from a coordinate (x, y) of the feature point used as criteria to a coordinate (x', y') is expressed by the following formula 100.

$$\begin{pmatrix} x' \\ y' \\ 1 \end{pmatrix} = \begin{pmatrix} a & b & c \\ d & e & f \\ 0 & 0 & 1 \end{pmatrix} \begin{pmatrix} x \\ y \\ 1 \end{pmatrix} \quad \text{Formula 100}$$

Affine coefficients of a 3*3 matrix of the formula 100 are computable if deviations of at least three feature points are detected. However, when the detected feature points are mutually near or are aligned on a straight line, the image stabilization process becomes inaccurate in areas distant from the feature points or distant from the straight line. Accordingly, it is preferable to select the feature points to be detected that are mutually distant and do not lie on a straight line. Accordingly, when a plurality of feature points are detected, mutually near feature points are excluded and remaining feature points are normalized by a least square method.

Figure 18F:
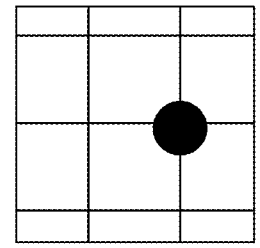

FIG. 18F is a view showing an image obtained by applying the image stabilization process in the step S903 to the distortion-corrected image shown in FIG. 18E. Since the extraction process is performed in executing the image stabilization process, a field angle of the image shown in FIG. 18F becomes smaller than that of the image shown in FIG. 18E.

It is available to obtain a high quality image of which blur is corrected by performing such an image stabilization process.

In the above, the series of operations executed by the camera body 1 and display apparatus 800 that are included in the camera system of this embodiment have been described.

When the user selects the video image mode by the image pickup mode switch 12 after turning the power switch 11 ON and observes the front without turning the face in the vertical and horizontal directions, the face direction defection unit 20 detects the observation direction vo (vector information [0°, 0°]) as shown in FIG. 12A. After that, the recording-direction/field-angle determination unit 30 extracts the image (FIG. 11B) in the target visual field 125o shown in FIG. 12A from the superwide-angle image projected onto the solid state image sensor 42.

Figure 11C:
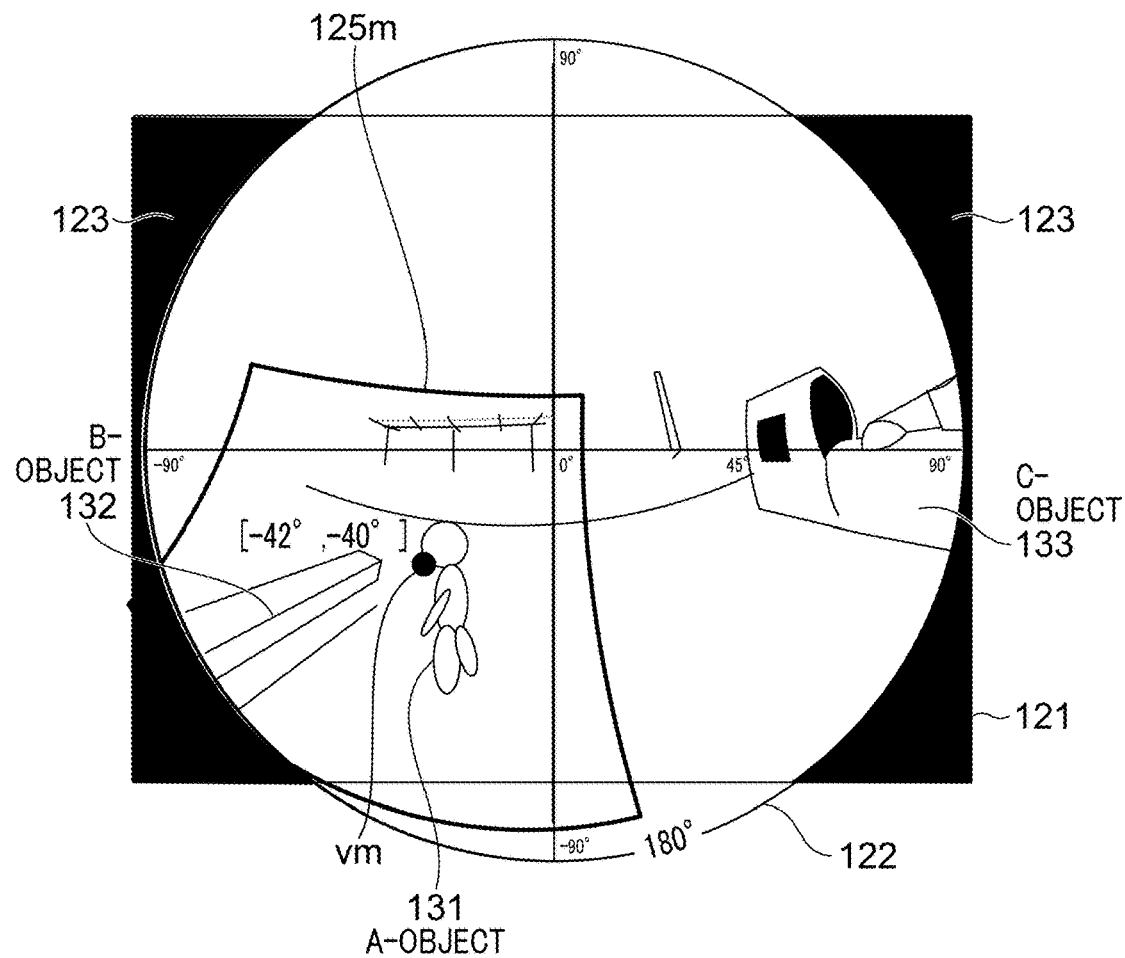
FIG. 11C is a view showing the target visual field set in the superwide-angle image in a case where the user is observing an A-object.

After that, when the user starts observing the child (A-object) 131 in FIG. 11A, for example, without operating the camera body 1, the face direction detection unit 20 detects the observation direction vm (vector information [−42°, −40°]) as shown in FIG. 11C. After that, the recording-direction/field-angle determination unit 30 extracts the image (FIG. 11C) in the target visual field 125m from the superwide-angle image picked up by the image pickup unit 40.

Figure 11D:
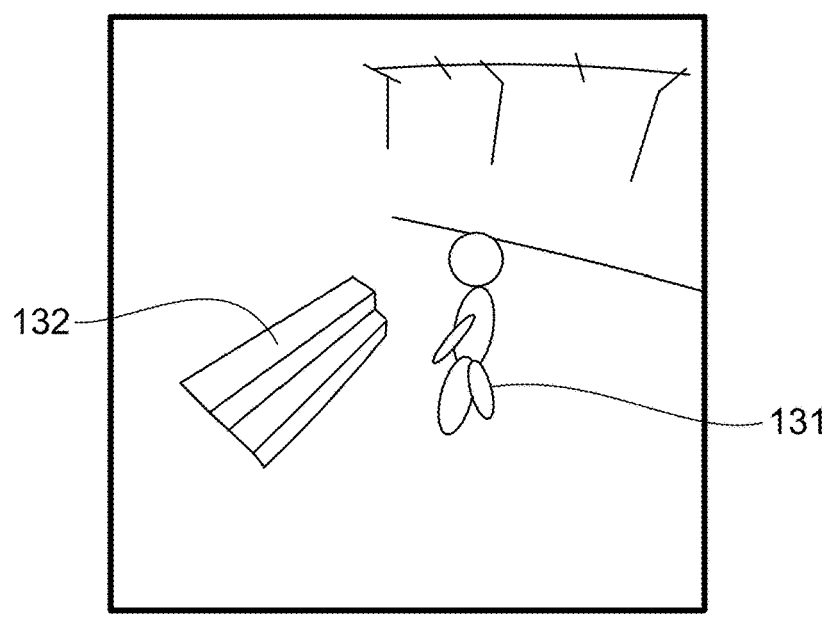
FIG. 11D is a view showing an image that is obtained by correcting distortion and blur of an image in the target visual field in FIG. 11C extracted from the superwide-angle image.

In this way, the display apparatus 800 applies the optical correction process and image stabilization process to the extracted image of the shape depending on the observation direction in the steps S800 and S900. Thereby, even if the specification of the overall control CPU 101 of the camera body 1 is low, the significantly distorted image in the target visual field 125m (FIG. 11C) is converted into the image around the child (A-object) 131 of which the blur and distortion are corrected as shown in FIG. 11D. That is, the user is able to obtain an image picked up in the own observation direction, even if the user does not touch the camera body 1 except to turn the power switch 11 ON and to select the mode with the image pickup mode switch 12.

Hereinafter, the preset mode will be described. Since the camera body 1 is a compact wearable device as mentioned above, operation switches, a setting screen, etc. for changing advanced set values are not mounted on the camera body 1. Accordingly, in this embodiment, the advanced set values of the camera body 1 are changed using the setting screen (FIG. 13) of the display apparatus 800 as an external device.

For example, a case where the user would like to change the field angle from 90° to 45° while picking up a video image continuously is considered. In such a case, the following operations are needed. Since the field angle is set to 90° in a regular video image mode, the user performs the video image pickup operation in the regular video image mode, once finishes the video image pickup operation, displays the setting screen of the camera body 1 on the display apparatus 800, and changes the field angle to 45° on the setting screen. However, this operation to the display apparatus 800 during the continuous image pickup operation is troublesome and an image that the user wants to pick up may be missed.

In the meantime, when the preset mode is preset to a video image pickup operation at the field angle of 45°, the user can change to a zoom-up video image pickup operation at the field angle of 45° immediately by only sliding the image pickup mode switch 12 to "Pre" after finishing the video image pickup operation at the field angle of 90°.

The contents of the preset mode may include the image stabilization level ("Strong", "Middle", or "OFF") and a set value of voice recognition that is not described in this embodiment in addition to the field angle.

Figure 11E:
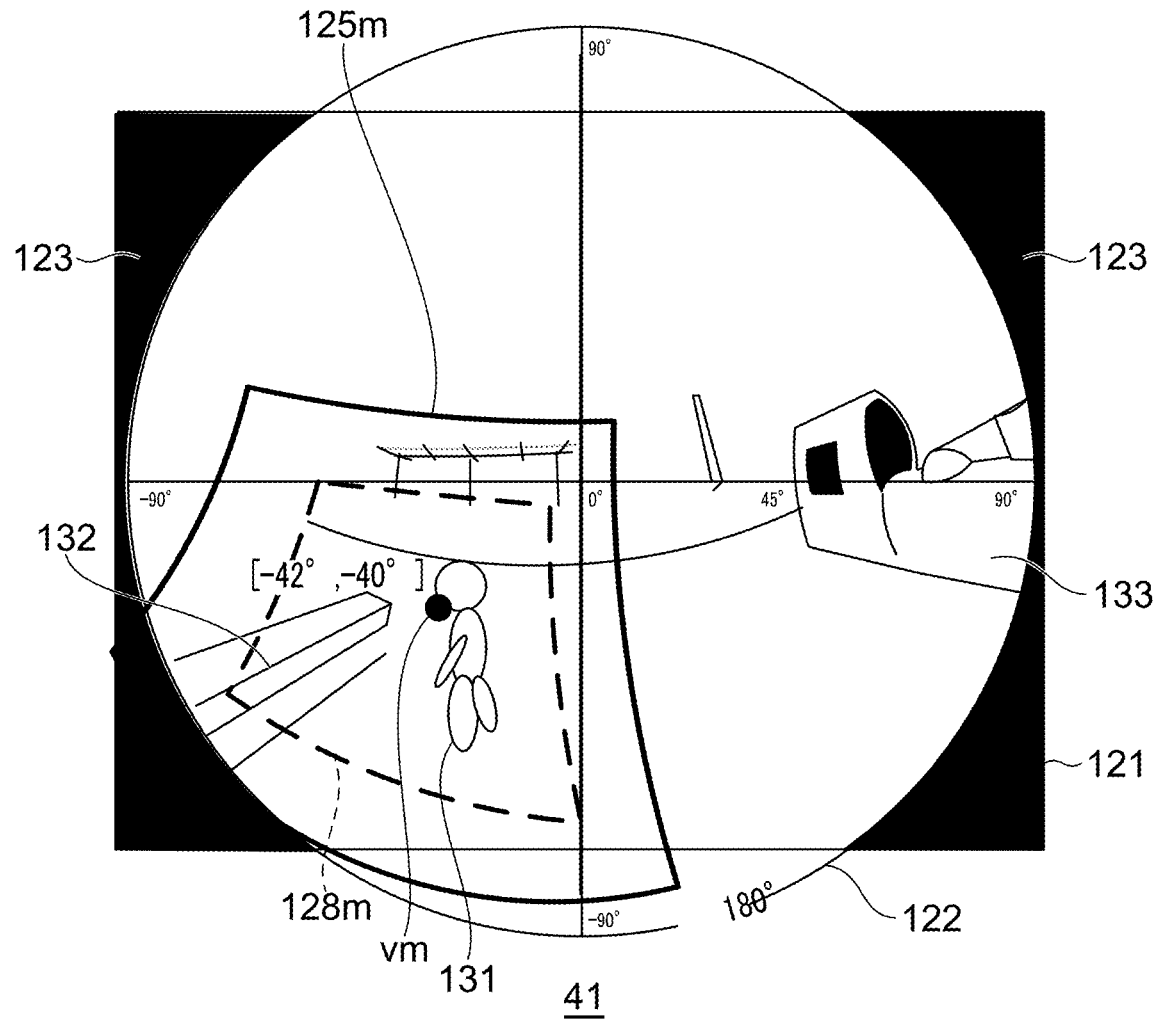
FIG. 11E is a view showing a target visual field set in the superwide-angle image in a case where the user is observing the A-object at a field-angle set value smaller than that in FIG. 11C.

For example, when the user switches the image pickup mode switch 12 from the video image mode to the preset mode while continuously observing the child (A-object) 131 in the previous image pickup situation, the field-angle set value $V_{ang}$ is changed from 90° to 45°. In this case, the recording-direction/field-angle determination unit 30 extracts the image in the target visual field 128m shown by a dotted line frame in FIG. 11E from the superwide-angle image picked up by the image pickup unit 40.

Figure 11F:
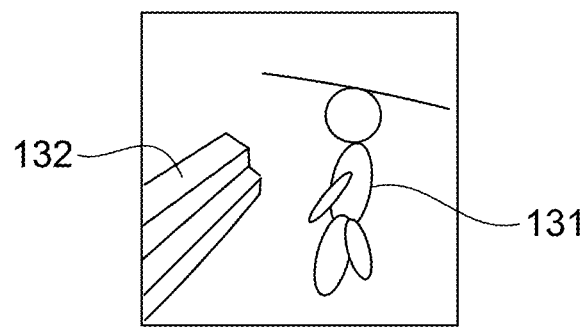
FIG. 11F is a view showing an image that is obtained by correcting distortion and blur of an image in the target visual field in FIG. 11E extracted from the superwide-angle image.

Also in the preset mode, the optical correction process and image stabilization process are performed in the display apparatus 800 in the steps S800 and S900. Thereby, even if the specification of the overall control CPU 101 of the camera body 1 is low, the zoom-up image around the child (A-object) 131 of which the blur and distortion are corrected as shown in FIG. 11F is obtained. Although the case where the field-angle set value $V_{ang}$ is changed from 90° to 45° in the video image mode has been described, the process in the still image mode is similar. Moreover, a case where the field-angle set value $V_{ang}$ of a video image is 90° and the field-angle set value $V_{ang}$ of a static image is 45° is also similar.

In this way, the user is able to obtain the zoom-up image that picks up the own observation direction by just switching the mode with the image pickup mode switch 12 of the camera body 1.

Although the case where the face direction detection unit 20 and the image pickup unit 40 are integrally constituted in the camera body 1 is described in this embodiment, the configuration is not limited to this as long as the face direction detection unit 20 is worn on the user's body other than the head and the image pickup unit 40 is worn on the user's body. For example, the image-pickup/detection unit 10 of this embodiment can be worn on a shoulder or an abdomen. However, when the image pickup unit 40 is worn on a right shoulder, an object of the left side is obstructed by the head. In such a case, it is preferable that a plurality of image pickup units be worn on places including a left shoulder.

Hereinafter, a second embodiment will be described. A user may want to change a position and size of an extraction image, which will be extracted from a fish-eye image and stored, depending on variation degrees of movement of the user and the face direction. For example, when a user turns right, a sight line of the user varies before change of a face direction. That is, the user looks at right a little than the face direction in many cases. In this case, it is preferable to obtain an image at which the user is actually looking by recording an image that is right than the detected face direction. Moreover, when the user is difficult to change a direction of a body by twisting a waist (for example, when the user is running), the user is probably catching an object to record at the end of the visual field. In such a case, it is preferable to record an image in which the object is arranged near the center.

In this embodiment, the camera body 1 is constituted so that a recording direction (position of an extraction image) and a recording area (size of an extraction image) will be corrected depending on variation degrees of movement of a user and a face direction. Hereinafter, this configuration and effect are described.

Figure 20:
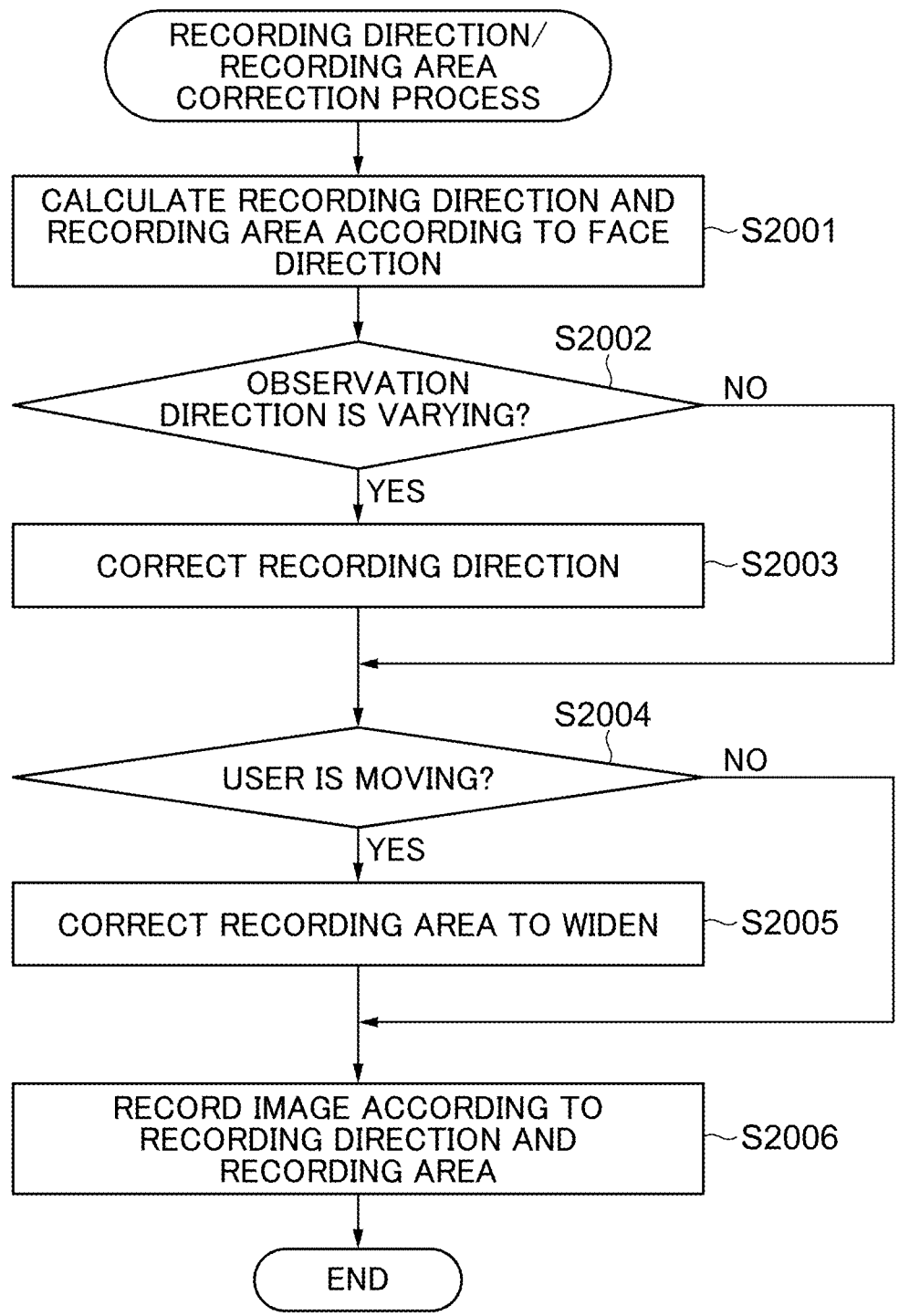
FIG. 20 is a flowchart showing a recording direction/recording area correction process according to a second embodiment.

FIG. 20 is a flowchart showing a recording direction/recording area correction process according to the second embodiment. Each process in this flowchart is achieved because the overall control CPU 101 runs the program stored in the internal nonvolatile memory 102. This program enables the overall control CPU 101 (computer) to operate and function each part and each unit of the camera body 1.

In a step S2001, the overall control CPU 101 calculates a recording direction and a recording area first on the basis of a direction vector showing the face direction recorded in the step S212. It should be noted that the process in the step S2001 is similar to the process in the step S300.

Next, in a step S2002, the overall control CPU 101 determines whether the observation direction is varying. Determination of whether the observation direction is varying is executable by comparing a variation amount between the detection results of the observation direction of past several times held as history, for example.

For example, the observation direction at time t shall be vm [h(t), v(t)] and the observation direction at time t−1 shall be vn [h(t−1), v(t−1)]. In this case, the variation amount of the observation direction in the horizontal direction (left-and-right direction) from the time t−1 to the time t is found by h(t)−h(t−1). Then, when this variation amount keeps a positive value during a certain period, it is determined that the observation direction is varying rightward. In the meantime, when the variation amount keeps a negative value during the certain period, it is determined that the observation direction is varying leftward.

Similarly, the variation amount of the observation direction in the horizontal direction (up-and-down direction) from the time t−1 to the time t is found by v(t)−v(t−1). Then, when this variation amount keeps a positive value during a certain period, it is determined that the observation direction is varying upward. In the meantime, when the variation amount keeps a negative value during the certain period, it is determined that the observation direction is varying downward.

Moreover, an absolute value |h(t)−h(t−1)| shall be a speed of the face when the observation direction varies horizontally. An absolute value |v(t)−v(t−1)| shall be a speed of the face when the observation direction varies vertically.

In this way, the overall control CPU 101 functions as a face movement detection unit that detects at least one of the vertical movement and the horizontal movement of the user's face (a face movement detection step) in this embodiment.

Then, as a result of the determination in the step S2002, when the overall control CPU 101 determines that the observation direction (face direction) is varying, the process proceeds to a step S2003. In the meantime, as a result of the determination in the step S2002, when the overall control CPU 101 determines that the observation direction (face direction) is not varying, the process proceeds to a step S2004.

In the step S2003, the overall control CPU 101 (recording-direction/field-angle determination unit 30) corrects the recording direction, i.e., the position of the extraction image, calculated in the step S2001. The correction of the recording direction is described by referring to FIG. 21A through FIG. 21D.

Figure 21A:
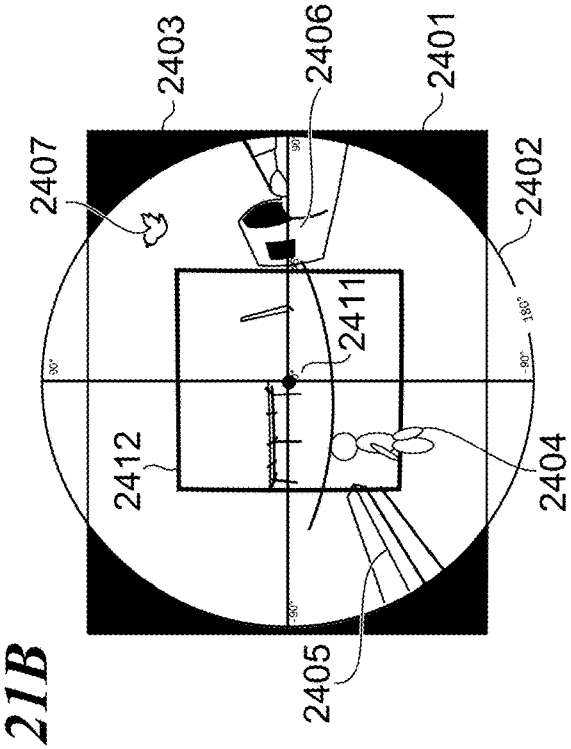
FIG. 21A through FIG. 21D are schematic views showing examples of the correction of the recording direction in a step S2003 in FIG. 20.

FIG. 21A is a view showing an example of a superwide-angle image (fish-eye image). A pixel area 2401 is a rectangular area that can be picked up by the solid state image sensor 42. An effective projection area 2402 is a fish-eye projection area that is projected to the solid state image sensor 42 by the image pickup lens 16. An outermost periphery of the effective projection area 2402 shows a position where the FOV angle is 180°. Invalid pixel areas 2403 are parts of the pixel area 2401 that are not included in the effective projection area 2402. Moreover, an object 2404 shows a child, an object 2405 shows steps, an object 2406 shows playground equipment, and an object 2407 shows a bird.

Figure 21B:
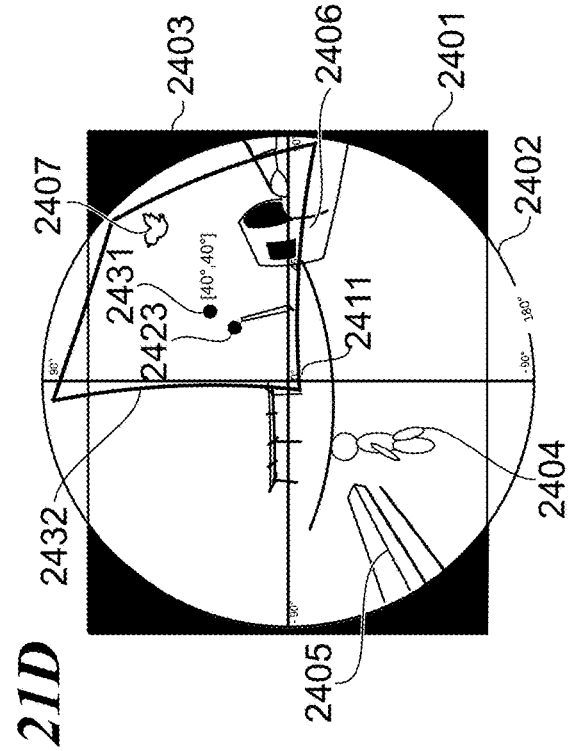

FIG. 21B is a view showing an area (extraction image) extracted from the superwide-angle image when the user faces the front. As shown in FIG. 21B, when the user faces the front, an observation direction 2411 of the user becomes vo=[0°, 0°] and coincides with the center point of the effective projection area 2402. An extraction area (extraction image) 2412 is determined by preset field angles (45° in this case) in four directions (left, right, up, and down) centering on the observation direction 2411 of the face before correction.

Figure 21C:
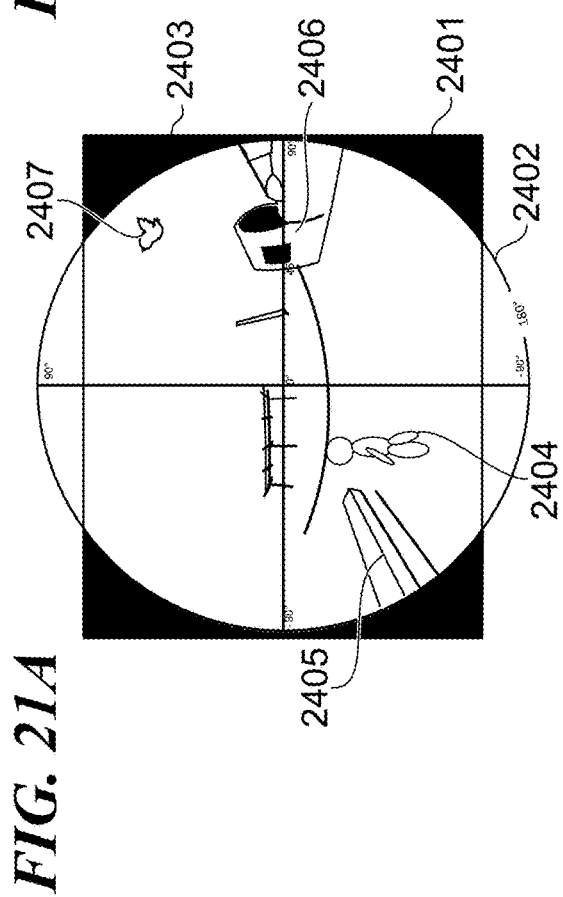

FIG. 21C is a view showing temporal variation of the observation direction of the user in a case where the user who faced the front at certain time t looks up an upper right direction because the user notices the bird of the object 2407. The observation direction 2411 (a vector [0°, 0°], see FIG. 21B) of the user at the time t varies to an observation direction 2421 (a vector [10°, 10°]) at time t+1. Furthermore, it varies to an observation direction 2422 (a vector [20°, 20°]) at time t+2, and varies to an observation direction 2423 (a vector [30°, 30°]) at time t+3. Then, at the time t+3, an extraction area (extraction image) 2424 from the superwide-angle image is determined by the field angles 45° in the four directions centering on the observation direction 2423 as well as the case of FIG. 21B. As shown in FIG. 21C, the bird of the object 2407 is not contained in the extraction area 2424. However, since a sight line of the user is directed to a little ahead of the observation direction, it is assumed that the bird of an object 2407 is actually contained in the visual field of the user at the time t+3.

Accordingly, in the step S2003, the observation direction is corrected so that the extraction area will approach the area of the visual field of the user. The direction of this correction is determined using the variation amount of the face direction from the time t to the time t+3, as mentioned above. In the case of FIG. 21C, the variation amounts of the observation direction from the time t to the time t+3 become positive values in both the horizontal direction and vertical direction. Thereby, the observation direction is determined to be varying in the upper right direction and the direction of the correction is also determined as the similar direction. Moreover, the correction amount is determined as a predetermined value (10° in this case). Although the correction amount shall be the predetermined value in this embodiment, the determination of the correction amount is not limited to this. The correction amount may be adjusted depending on a variation speed of the observation direction, for example. That is, the high speed may increase the correction amount and the low speed may decrease the correction amount.

Figure 21D:
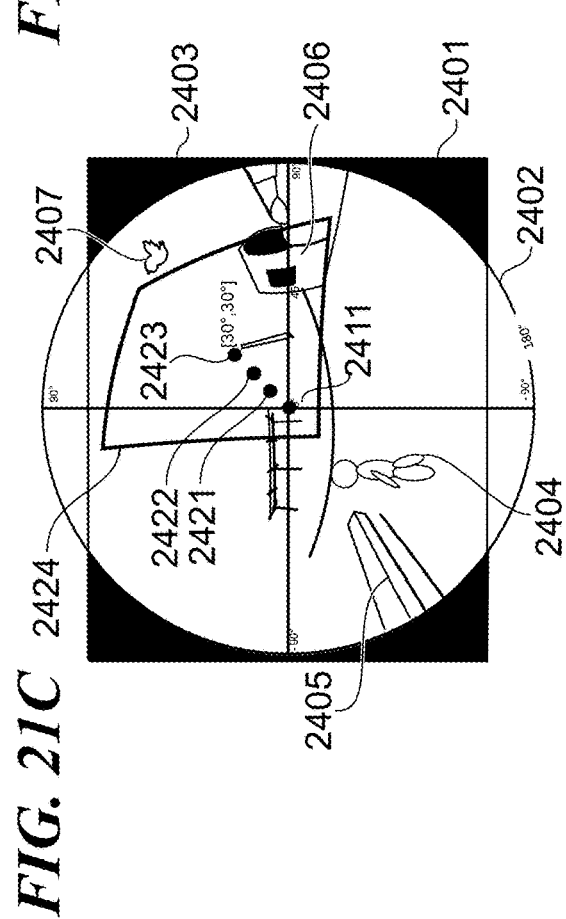

FIG. 21D is a view showing an extraction area in the case where the observation direction is corrected as mentioned above. An observation direction 2431 (a vector [40°, 40°]) is found by correcting the observation direction 2423 (the vector [30°, 30°]) in FIG. 21C by 10° in each of the right and up directions. Then, an extraction area (extraction image) 2432 is determined by the field angles 45° in the four directions centering on the observation direction 2431. Thereby, the bird of the object 2407 is contained in the end of the extraction area 2432 as shown in FIG. 21D.

In the step S2003, the overall control CPU 101 (the recording-direction/field-angle determination unit 30) corrects and determines the recording direction as the extraction condition of the extraction area in this way on the basis of the variation (the detection result of the face movement detection unit) of the observation direction (face direction).

Moreover, when the variation of the observation direction (face direction) is detected, the overall control CPU 101 (the recording-direction/field-angle determination unit 30) moves the position of the extraction image in the direction of the variation. Thereby, the extraction image that the user intends can be obtained correctly.

As shown in FIG. 20, in the step S2004 after execution of the step S2002 or S2003, the overall control CPU 101 determines whether the user is moving on the basis of the result of a user movement detection unit (a user movement detection step) that detects movement of the user. In this embodiment, the gyro 107 or the acceleration sensor 108 is used as the user movement detection unit, for example. Although the gyro 107 or the acceleration sensor 108 can detect movement of the camera body 1, the movement of the camera body 1 can be considered as the movement of the user because the camera body 1 picks up an image while being worn to the user body. It should be noted that a GPS (Global Positioning System) sensor can also be used as the user movement detection unit. Also in this case, the GPS sensor is built in the camera body 1 like the gyro 107 and the acceleration sensor 108, and the movement of the camera body 1 can be considered as the movement of the user.

As a result of the determination in the step S2004, when the overall control CPU 101 determines that the user is moving, the process proceeds to a step S2005. In the meantime, as a result of the determination in the step S2004, when the overall control CPU 101 determines that the user is not moving, the process proceeds to a step S2006.

In the step S2005, the overall control CPU 101 (recording-direction/field-angle determination unit 30) corrects the recording area (the extraction area, i.e., the extraction image) calculated in the step S2001 so as to widen. The correction of the extraction area is performed by widening the extraction field angle by a predetermined amount (10° in this case, for example). For example, when the extraction field angles in the four directions are 45° before the correction, the extraction field angles in the four directions after the correction become 55°. Accordingly, a new extraction area is defined by the field angles 55° in the four directions centering on the observation direction.

Figure 22:
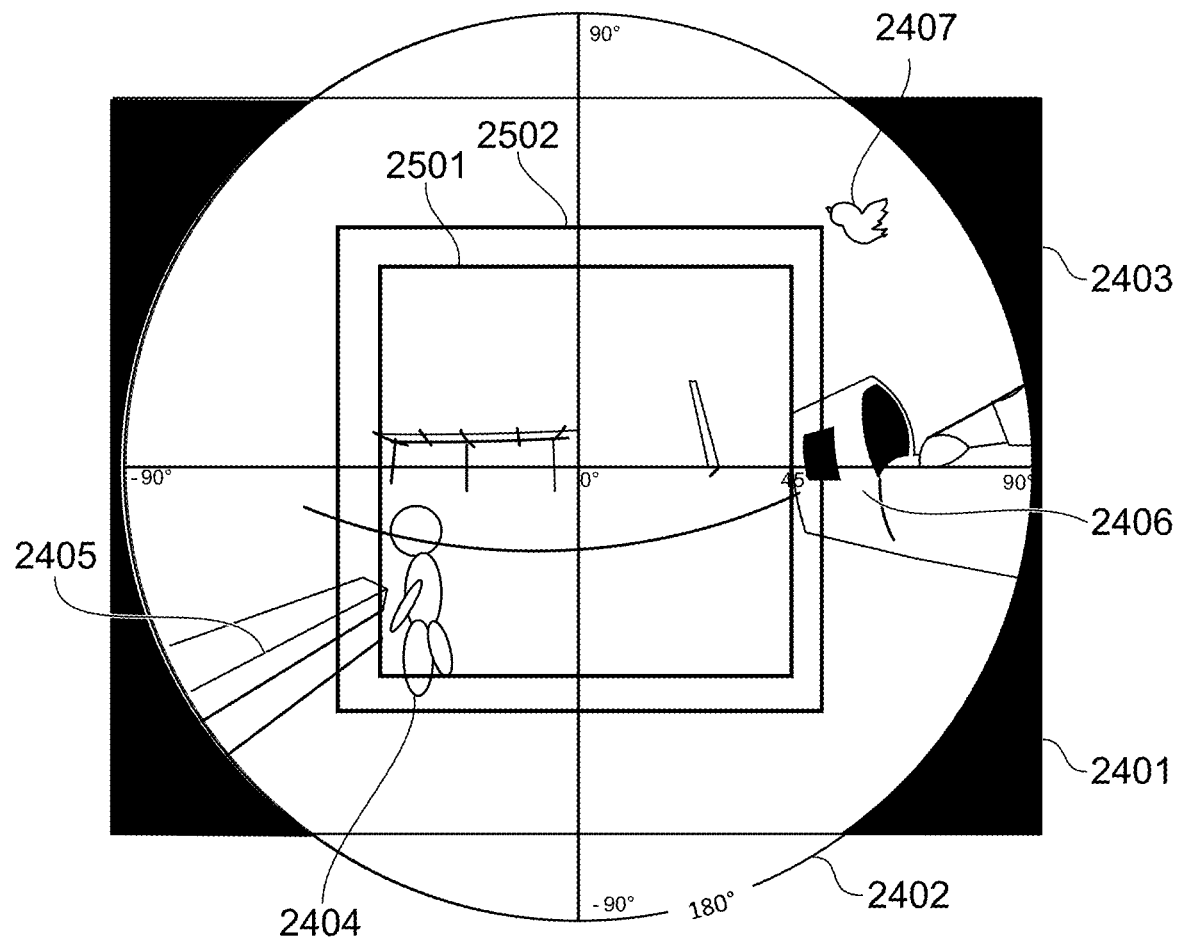
FIG. 22 is a schematic view showing an example of the correction of the recording area in a step S2005 in FIG. 20.

An example of the correction of the recording area will be described by referring to FIG. 22. FIG. 22 is a view showing extraction from the superwide-angle image in the case where the user faces the front. An extraction area (extraction image) 2501 is determined by the field angles 45° in the four directions centering on the observation direction [0°, 0°]. Moreover, an extraction area (extraction image) 2502 is arranged centering on the observation direction [0°, 0°] as with the extraction area 2501. This extraction area 2502 is corrected in its recording area and is determined by the field angles 55° in the four directions, for example. As shown in FIG. 22, the child of the object 2404 is located in the end of the extraction area 2501, but a tip of a leg of the child is not contained in the extraction area 2501.

In the meantime, the child of the object 2404 is located at a position a little closer to the center of the extraction area 2502 of which the recording area is corrected as compared with the extraction area 2501. And the tip of the leg of the child is also contained in the extraction area 2502. In this way, the overall control CPU 101 (recording-direction/field-angle determination unit 30) widens the recording area (the area of the extraction image), when the movement of the user is detected. Thereby, an object that the user is catching at the end of the visual field can be arranged at a position closer to a center of an image.

In the step S2005, the overall control CPU 101 (recording-direction/field-angle determination unit 30) corrects and determines the recording area as the extraction condition of the extraction area in this way on the basis of the movement of the user (the detection result of the user movement detection unit).

Moreover, when the movement of the user is detected, the recording area (the area of the extraction image) is widened. This configuration is also applicable to the case where the variation of the observation direction is detected. That is, the recording-direction/field-angle determination unit 30 may widen the area of the extraction image, also when the variation of the observation direction is detected. Also, in this case, an object that the user is catching at the end of the visual field can be arranged at a position closer to a center of an image As shown in FIG. 20, the process proceeds to the step S2006 after executing the process in the step S2004 or S2005. In the step S2006, the overall control CPU 101 (image extraction/development unit 50) extracts an extraction image from the fish-eye image (extraction step) on the extraction condition determined by the recording-direction/field-angle determination unit 30, and records the image concerned. The process in the step S2006 is the same as the processes in the steps S400, S500, and S600.

In this embodiment, a recording direction (position of an extraction image) and a recording area (size of an extraction image) can be corrected depending on variation degrees of movement of a user and a face direction. Thereby, the extraction image that the user intends can be obtained, and the convenience of the camera body 1 improves. That is, manual change of an image pickup direction during an image pickup operation becomes unnecessary, and an image that records experience can be easily obtained while focusing attention on the experience.

Next, a third embodiment will be described. A recording direction and a recording area may be determined on the basis of a user's observation direction detected at the same time as an image pickup operation. In this case, there is a possibility that an image different from an image that the user essentially intended to record is recorded depending on various conditions. In this embodiment, an image in a suitable recording direction can be recorded by using an observation direction detection result with a time difference. Hereinafter, this configuration and effect are described.

Figure 23:
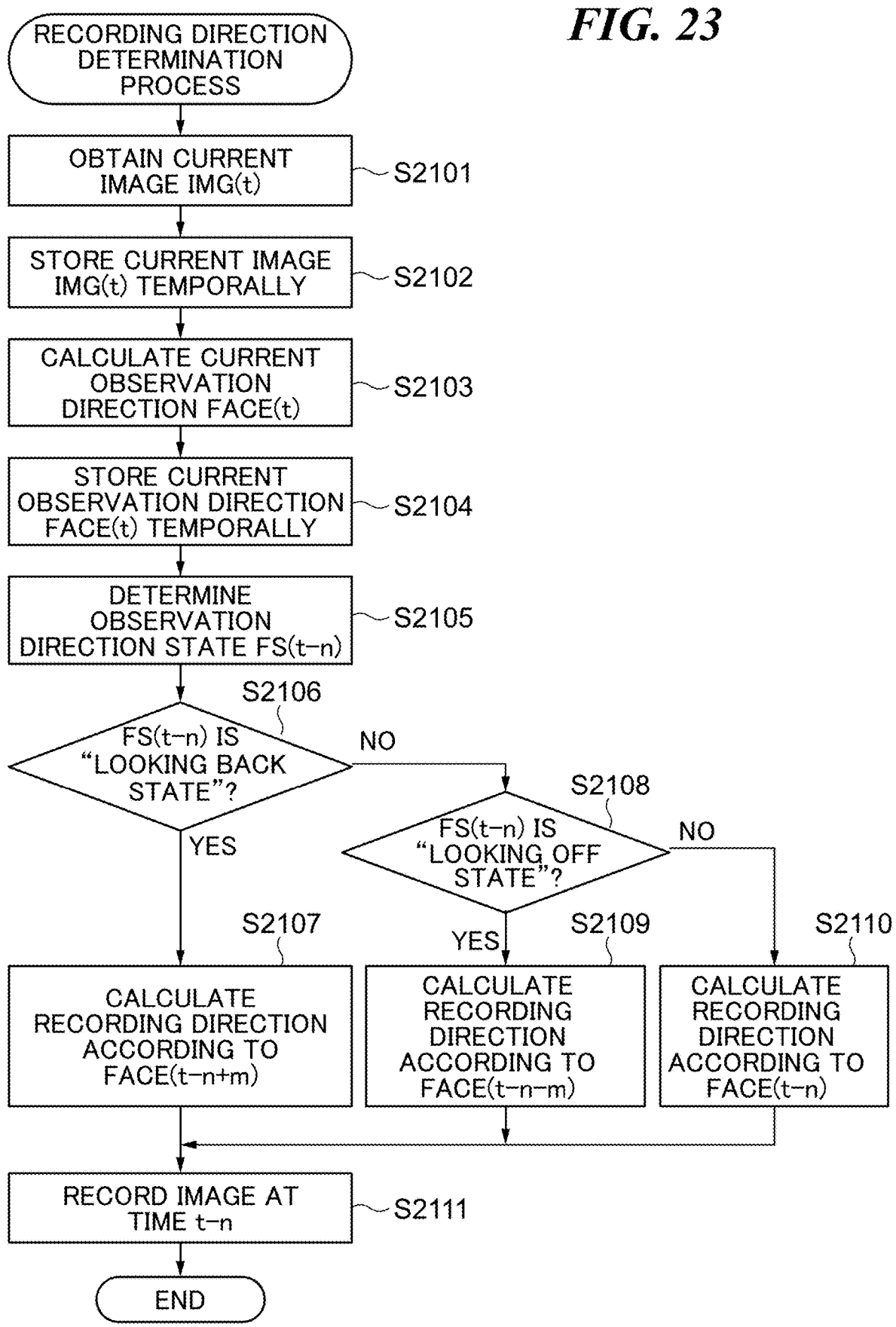
FIG. 23 is a flowchart showing a recording direction determination process according to a third embodiment.

FIG. 23 is a flowchart showing a recording direction determination process according to the third embodiment. Each process in this flowchart is achieved because the overall control CPU 101 runs the program stored in the internal nonvolatile memory 102.

In a step S2101, the overall control CPU 101 picks up an image (fish-eye image) IMG(t) at a current time t with the image pickup unit 40 first. Next, in a step S2102, the overall control CPU 101 stores the image IMG(t) into a temporary image storage location. The process in the step S2001 is similar to the process in the step S400. It should be noted that the primary memory 103 can be used as the temporary image storage location (a wide angle image storage unit that holds the fish-eye image temporarily).

In step S2103, the overall control CPU 101 (the face direction detection unit 20) calculates an observation direction FACE(t) at the current time t (a face direction storage step). Next, in a step S2104, the overall control CPU 101 stores the observation direction FACE(t) into a temporary observation direction storage location. The process in the step S2103 is similar to the process in the step S200. It should be noted that the primary memory 103 can be used as the temporary observation direction storage location (a face direction storage unit that stores the detection result of the face direction detection unit 20 temporarily).

Next, in a step S2105, the overall control CPU 101 determines an observation direction state FS(t−n) at time t−n earlier than the time t by a predetermined period n (a state determination step). Observation direction states include a "looking-back state" in which the observation direction is varying in the left or right direction, a "looking-off state" in which the observation direction varies to another direction from a certain direction for an instant, and the like.

The process in the step S2105 is described by referring to FIG. 24A and FIG. 24B. FIG. 24A shows a variation of a horizontal observation direction in a period from time t−5 to time t. As shown in FIG. 24A, the observation direction at the time t−5 is 0° (facing front), and the observation direction at the time t−1 is 60° (facing right). The observation direction varies rightward from 0° at the time t−5, 15° at the time t−4, 30° at the time t−3, and 45° at the time t−2 in order. Then, the observation direction keeps 60° from the time t−1. Namely, the observation direction is varying rightward in the period from the time t−5 to the time t−2 and is stabilized in the position of 60°. In this case, the overall control CPU 101 determines that this observation direction state in the period is the "looking-back state".

FIG. 24B shows a variation of a vertical observation direction in the period from the time t−5 to the time t. As shown in FIG. 24B, the observation direction at the time t−5 is 0° (facing front). The observation direction varies downward from 0° at the time t−5, −25° at the time t−4, and −50° at the time t−3 in order. Then, the observation direction varies upward to −40° at the time t−2 and −20° at the time t−1 conversely. At the time t, the observation direction returns to 0°. In this case, the overall control CPU 101 determines that the observation direction state in the period from the time t−4 to the time t−1 is the "looking-off state".

It is preferable that a threshold period of determining whether the observation direction state is the "looking-off state" or not (i.e., a normal variation of the observation direction) depend on a user. Accordingly, length of the threshold period used for the determination may be changed depending on a user. Moreover, a threshold angle of determining whether the variation of the observation direction corresponds to the "looking-off state" may be changed depending on a user in the same manner. In order to enable such changes, the threshold period and threshold angle used to determine whether the variation of the observation direction (the face direction) is a temporary change (i.e., looking-off) are suitably settable with setting means like the various switches 110 in this embodiment.

As mentioned above, the overall control CPU 101 functions as a state determination unit that determines a state of variation of an observation direction (a face direction of a user) on the basis of a detection result that is detected by the face direction detection unit 20 and is stored in the primary memory 103 in this embodiment.

The process proceeds to a step S2106 after executing the process in the step S2105. In the step S2106, the overall control CPU 101 determines whether the observation direction state FS(t−n) determined in the step S2105 is the "looking-back state". As a result of the determination in the step S2106, when the overall control CPU 101 determines that the observation direction state is the "looking-back state", the process proceeds a step S2107. In the meantime, as a result of the determination in the step S2106, when the overall control CPU 101 determines that the observation direction state is not the "looking-back state", the process proceeds a step S2108.

In the step S2107, the overall control CPU 101 calculates a recording direction on the basis of the face direction FACE(t−n+m) of the time (after the time t−n) at which a "looking-back action" is completed. The process in the step S2107 is similar to the process in the step S300.

In a step S2108, the overall control CPU 101 determines whether the observation direction state FS(t−n) determined in the step S2105 is the "looking-off state". As a result of the determination in the step S2108, when the overall control CPU 101 determines that the observation direction state is the "looking-off state", the process proceeds a step S2109. In the meantime, as a result of the determination in the step S2108, when the overall control CPU 101 determines that the observation direction state is not the "looking-off state", the process proceeds a step S2110.

In the step S2109, the overall control CPU 101 calculates a recording direction on the basis of the face direction state FACE(t−n−m) of the time (before the time t−n) before start of a "looking-off action". The process in the step S2109 is similar to the process in the step S300.

In the step S2110, the overall control CPU 101 calculates a recording direction on the basis of the face direction FACE(t−n) of the time t−n that is the same as the pickup timing of the image.

In a step S2111, the overall control CPU 101 develops and record the recording area to the image IMG(t−n) of the time t−n on the basis of the calculated recording direction. The process in the step S2111 is similar to the processes in the steps S500 and S600.

As mentioned above, when determining that the face direction is varying in a fixed direction, the overall control CPU 101 determines an extraction area on the basis of the face direction after the variation of the face direction is stabilized (see FIG. 24A). Furthermore, when determining that the variation of the face direction is a temporary variation, the overall control CPU 101 determines an extraction area on the basis of the face direction before the start of the variation or the face direction after the completion of the variation (see FIG. 24B). Since such two determinations are available, the extraction area can be adjusted (corrected) appropriately depending on the "looking-back state" and the "looking-off state". This certainly enables the image pickup operation intended by a user.

In this way, the overall control CPU 101 (the recording-direction/field-angle determination unit 30) can select any of the face directions stored in the primary memory 103 on the basis of the determination result by the state determination unit and can determine the extraction area of the extraction image. Accordingly, the image in the suitable recording direction can be recorded (i.e., the image intended by the user can be picked up) by using an observation direction detection result with a time difference in this embodiment.

As mentioned above, in the example in FIG. 24A, the observation direction becomes 60° from the time t−1 and is stable. The overall control CPU 101 (the face movement detection unit) can detect stability of the observation direction. Then, when detecting the stability of the observation direction, the overall control CPU 101 (the recording-direction/field-angle determination unit 30) may increase the size of the extraction image gradually so as to be restored to the size before determining the size of the extraction image. Moreover, stability of a movement of a user, which is detection result of the user movement detection unit (the gyroscope 107 or the acceleration sensor 108), is also detectable. When detecting the stability of the movement of the user, the overall control CPU 101 may increase the size of the extraction image gradually so as to be restored to the size before determining the size of the extraction image. For example, when the observation direction and the movement of the user are stabilized, the change of the size of the image accompanying this can be reduced. Accordingly, the configuration that restores the extraction image to the former size is suitable during a period when the observation direction and the movement of the user are stabilized.

Moreover, when detecting the stability of the observation direction, the overall control CPU 101 may decrease the moving amount of the position of the extraction image gradually. For example, when the observation direction is stable, the movement of the position of the extraction image accompanying this is also stabilized, which enables to decrease the moving amount concerned gradually. Thereby, an ineffectual movement of the position of the extraction image can be prevented.

Moreover, the primary recording unit 60 may record the following two extraction images, when the overall control CPU 101 determines that the variation of the face direction is a temporary variation. The first extraction image is extracted on the basis of the face direction before the start of the variation or the face direction after the completion of the variation. The second extraction image is extracted on the basis of the face direction detected by the face direction detection unit 20 at the same time as the time when the wide-angle image (the fish-eye image) is picked up. Since such two extraction images are recorded, the user can select one of the two extraction images when checking an image.

Next, a fourth embodiment will be described. A user may check a preview image or an image under recording using a device like the display apparatus 800. In this case, if the observation direction detection result is used with a time difference, a reaction speed of update of an image may become slow. Accordingly, when an image is displayed on the display apparatus 800, it is preferable to regulate (restrict) the use of the observation direction detection result with a time difference.

In the meantime, if the observation direction detection result is used without a time difference for the image displayed on the display apparatus 800 and the observation direction detection result is used with a time difference only for the recording image, the recording direction of the image watched with the display apparatus 800 differs from the recording direction of the recording image, which causes an unnatural state. This embodiment provides a configuration that reduces such an unnatural state. Hereinafter, this configuration and effect are described.

Figure 25A:
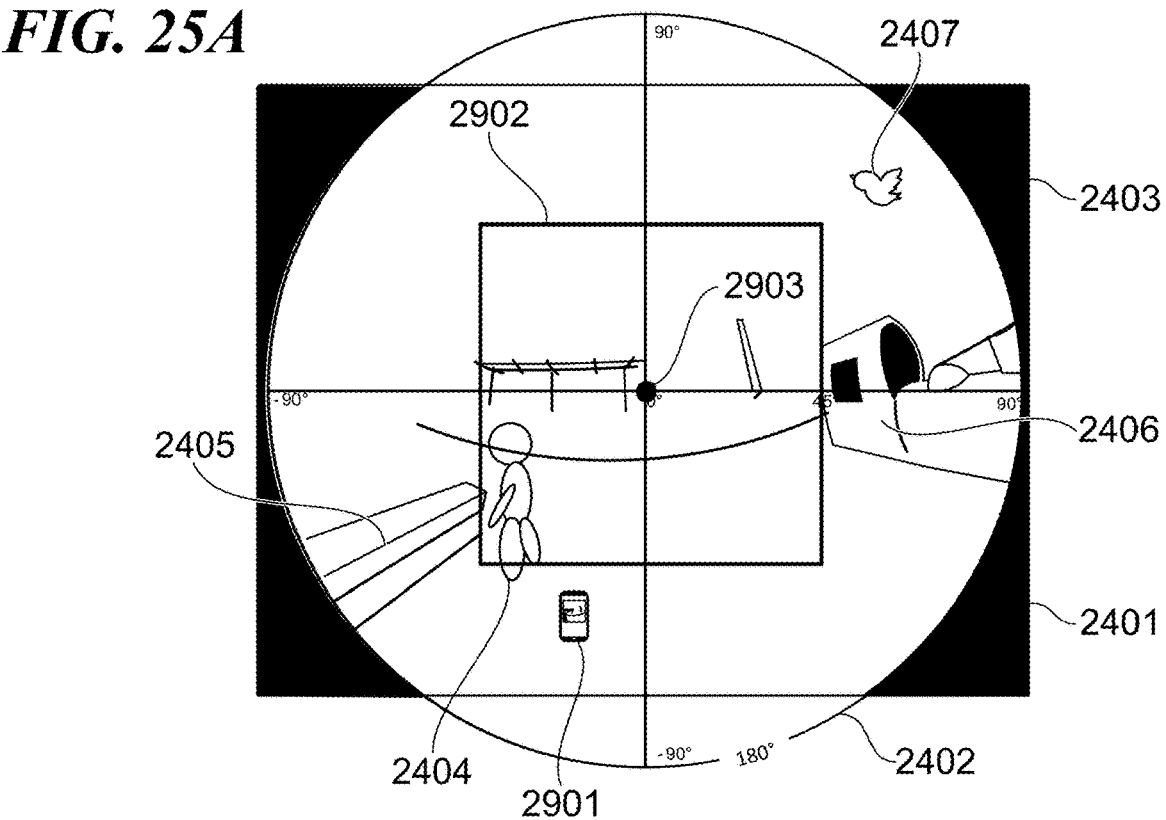
FIG. 25A and FIG. 25B are schematic views showing an example of change of an extraction area.

FIG. 25A is a view showing an image extracted from the superwide-angle image in the case where the user faces the front. An extraction area (an extraction image) 2902 is extracted by field angles 45° in four directions (left, right, up, and down) centering on an observation direction 2903 (a vector [0°, 0°]). When the user faces the front, the display apparatus that is an object 2901 is not included in the extraction area 2902.

Figure 25B:
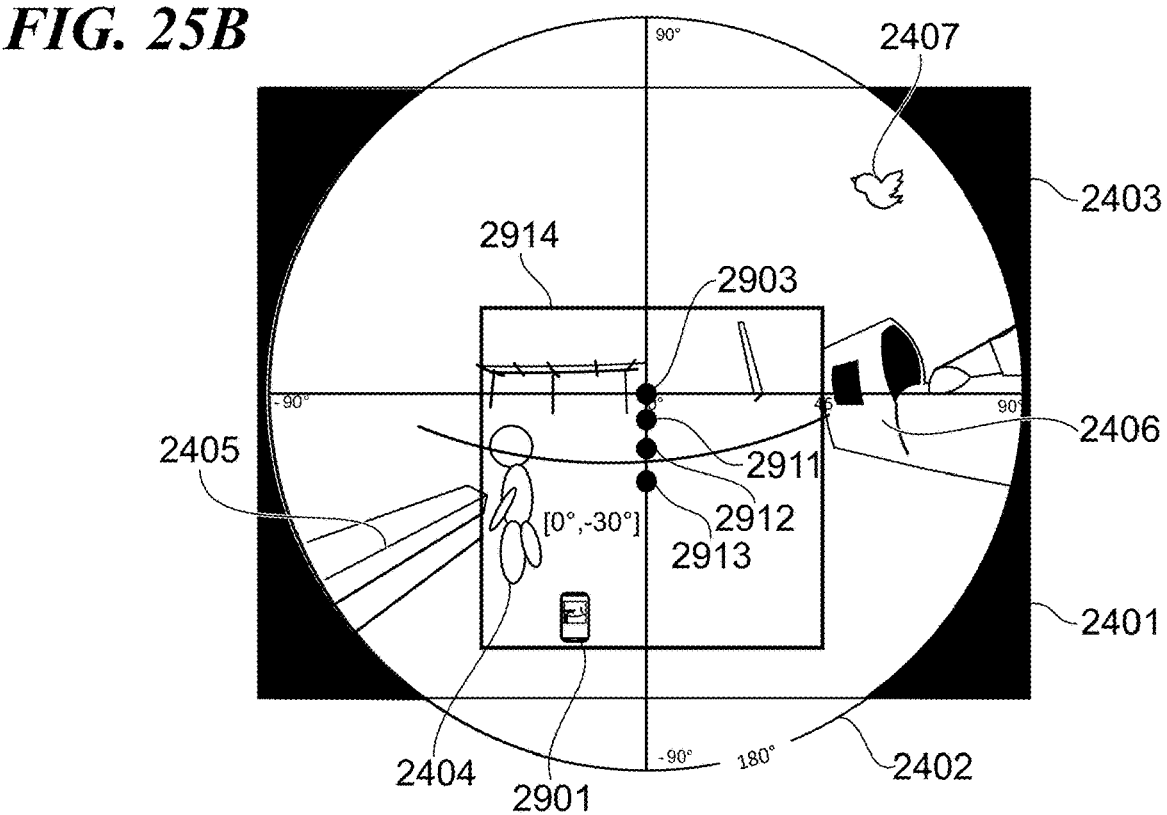

FIG. 25B shows variation of the observation direction of a user in a case where the user who faced the front at certain time t directs the face downward in order to check a screen of the display apparatus as the object 2901. As shown in FIG. 25B, the user is looking in the observation direction 2903 (the vector [0°, 0°]) at the time t. After that, the user is looking in an observation direction 2911 (a vector [0°, −10°]) at time t+1, an observation direction 2912 (a vector [0°, −20°]) at time t+2, and an observation direction 2913 (a vector [0°, −30°]) at time t+3. The extraction area 2914 at the time t+3 is extracted by field angles 45° in four directions (left, right, up, and down) centering on the observation direction 2913. The display apparatus as the object 2901 is included in this extraction area 2914. Thereby, the user can check the image that includes the display apparatus as the object 2901.

After the time t+3, the observation direction shall vary to the vector [0°, −20°] at time t+4 and to the vector [0°, −10°] at time t+5, and shall finally return to the vector [0°, 0°], which is equivalent to the observation direction 2903 (the vector [0°, 0°]) of the time t, at time t+6. In this case, in the process in the step S2105, it is determined that the observation direction state is the "looking-off state". Accordingly, if the observation direction detection result is applied with the time difference to the recording images, all the recording images at the time t through the time t+6 will be extracted by the extraction area 2902. Accordingly, the image that includes the display apparatus as the object 2901 will not be recorded.

In the meantime, as mentioned above, the user is checking the image that includes the display apparatus as the object 2901. In this way, if the image that includes the object 2901 is not recorded in spite of checking such an image, the user may feel unnatural.

Figure 26:
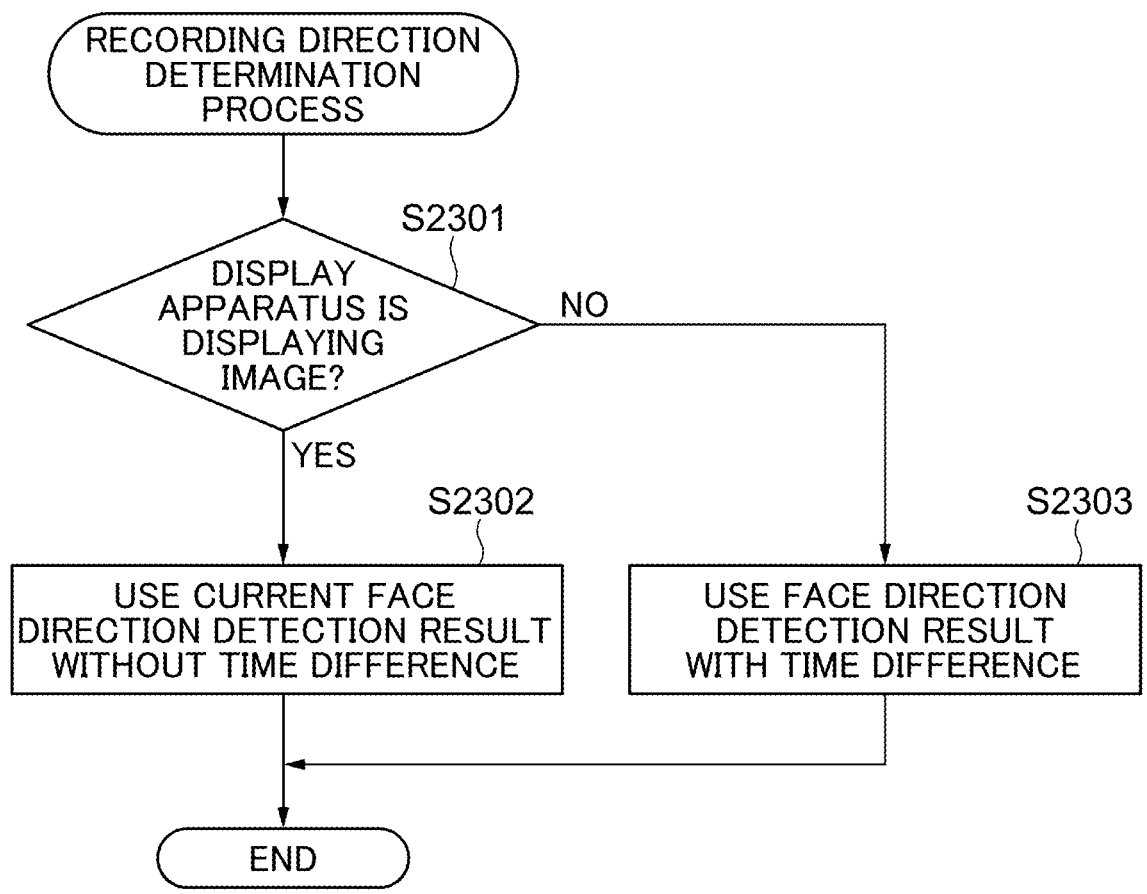
FIG. 26 is a flowchart showing a recording direction determination process executed while checking a preview image according to a fourth embodiment.

Consequently, it is preferable to use the observation direction detection result without the time difference while checking the preview image or the image under recording. FIG. 26 is a flowchart showing a recording direction determination process executed while checking the preview image according to the fourth embodiment. Each process in this flowchart is achieved because the overall control CPU 101 runs the program stored in the internal nonvolatile memory 102.

In a step S2301, the overall control CPU 101 determines first whether the display apparatus 800 is displaying an image. Determination of whether the display apparatus 800 is displaying an image is determined by whether the image is being transmitted by the transmission unit 70. As a result of the determination in the step S2301, when the overall control CPU 101 determines that the display apparatus is displaying an image, the process proceeds to a step S2302.

In the meantime, as a result of the determination in the step S2301, when the overall control CPU 101 determines that the display apparatus is not displaying an image, the process proceeds to a step S2303.

In the step S2302, the overall control CPU 101 determines the recording direction by using the current observation direction detection result without a time difference. Moreover, in the step S2303, the overall control CPU 101 determines the recording direction by using the observation direction detection result with a time difference.

As mentioned above, in this embodiment, when the user is checking the preview image using the device (a display control unit) like the display apparatus 800, the observation direction detection result is used without a time difference. That is, when the user is checking the preview image, the overall control CPU 101 (the state determination unit) regulates the determination of the observation direction.

Thereby, since the recording direction of the image displayed on the screen can be coincident with the recording direction of the recorded image, the user can check the preview image without feeling uncomfortable. As with the regulation of the determination of the observation direction, when the user is checking the preview image, the correction of the recording direction (the extraction area of the extraction image) based on the variation of the recording direction (the detection result of the face movement detection unit) may be regulated. For example, when the user is checking the recorded image, the image pickup operation is stopped. Then, due to this stop, the correction of the recording direction is also regulated. Thereby, ineffectual correction can be prevented.

Next, a fifth embodiment will be described. If an extraction position of an image is changed directly corresponding to variation of a face direction, the image may be hard to watch as a video image when a face moves frequently or suddenly. Considering such a case, the third embodiment shows a method for recording a video image while determining an extraction position after a certain period elapses. However, the configuration of the third embodiment needs image memory capacity that can accumulate a video image of a certain fixed period.

Consequently, the configuration (method) for generating a video image that is easily watched while extracting a video image according to a face direction of a user in real time will be described in this embodiment. It should be noted that an "extraction position" shall be an extraction center coordinate of an image in this embodiment. Moreover, an "extraction area" shall be an image area extracted on the basis of the extraction position (the extraction center coordinate) and image size. Moreover, the extraction position (the extraction center coordinate) at time t is expressed by (p(t), q(t)) in a two-dimensional coordinate system in which an origin is an upper left corner, a coordinate in a horizontal right direction is expressed by an h-coordinate, and a coordinate in a vertical lower direction is expressed by a v-coordinate.

Figure 27:
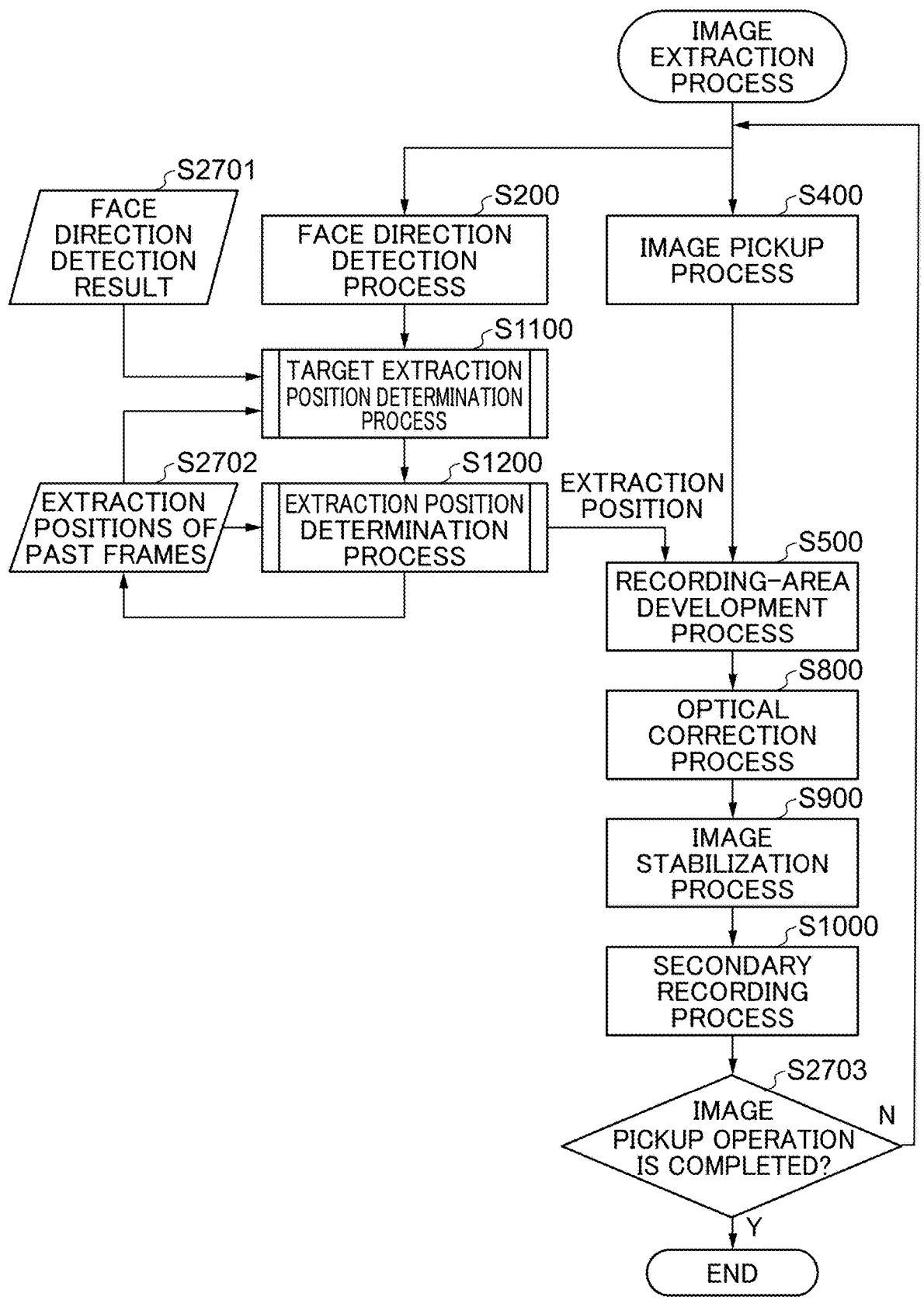
FIG. 27 is a flowchart showing an image extraction process according to a fifth embodiment.

FIG. 27 is a flowchart showing a process of the image extraction/development unit 50 in FIG. 4 in this embodiment. In FIG. 27, a step equivalent to that in FIG. 7A is indicated by the same step number and its description is omitted. Each process in this flowchart is achieved because the overall control CPU 101 runs the program stored in the internal nonvolatile memory 102.

As shown in FIG. 27, a face direction is detected in the step S200 by the face direction detection process of the face direction detection unit 20. It should be noted that the face direction detection unit 20 can detect the face directions of the user for every multiple frames that are included in the wide-angle images picked up continuously.

In the step S1100, the target extraction position determination process is executed by the recording-direction/field-angle determination unit 30 (the extraction position determination unit). In this target extraction position determination process, a target position of an extraction position to be reached corresponding to the face direction is determined on the basis of the face direction detection result (a step S2701) and the extraction positions of the past frames (a step S2702).

In a step S1200, the recording-direction/field-angle determination unit 30 executes an extraction position determination process. In this extraction position determination process, the extraction positions of future multiple frames are determined on the basis of the extraction positions of the past frames in the step S2702 and the target extraction position determined in the step S1100.

Then, in the step S500, the image extraction/development unit 50 (the extraction unit) executes the recording area development process using the result of the extraction position determination process in the step S1200 and executes the extraction process. After that, the processes in the steps S800, S900, and S1000 are executed in order. Such processes are executed until the image pickup operation is completed (until determining "YES" in a step S2703).

Figure 32:
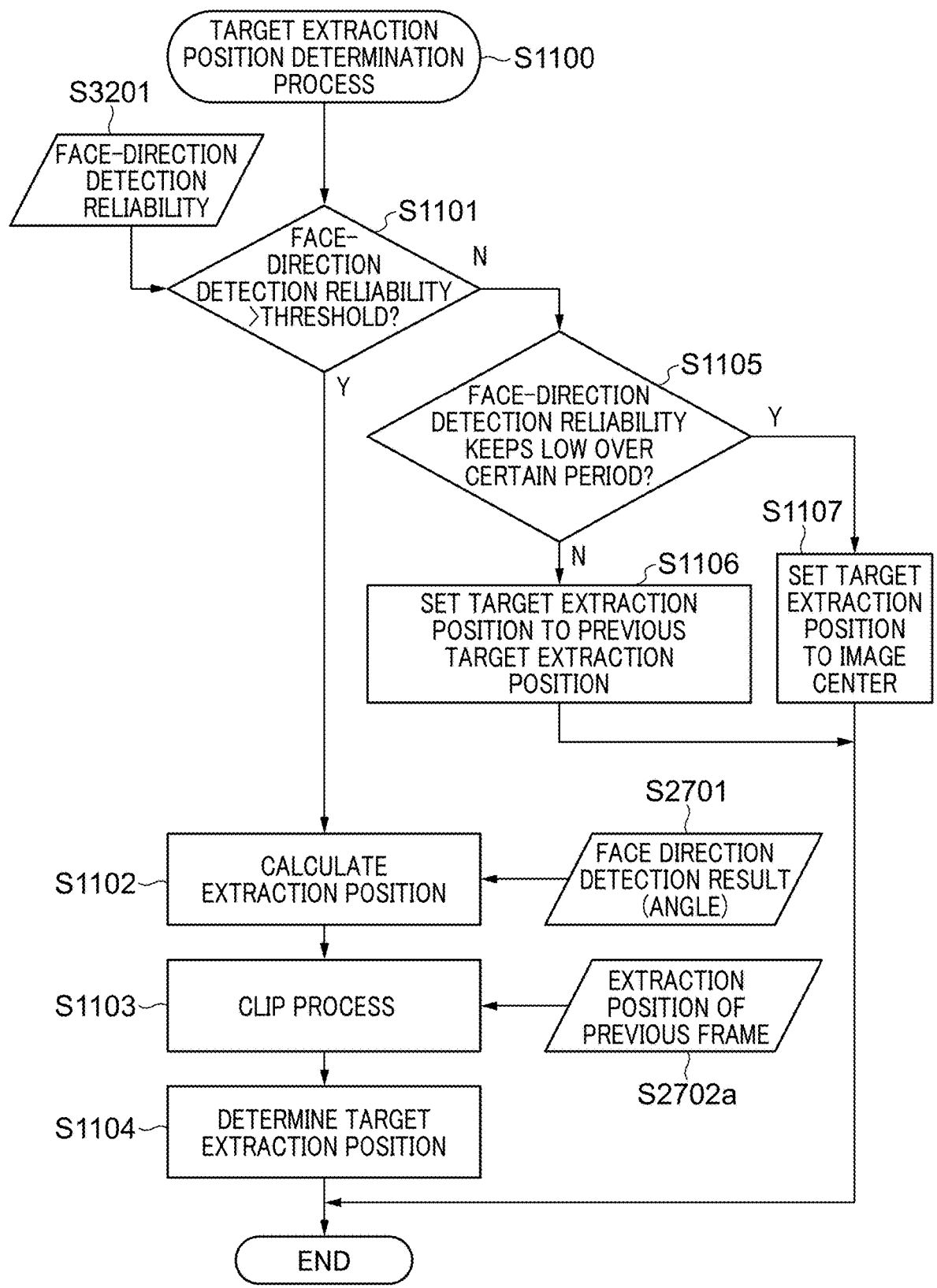
FIG. 32 is a flowchart showing the target extraction position determination process in a step S1100 in FIG. 27 (the fifth embodiment).

FIG. 32 is a flowchart showing the target extraction position determination process in the step S1100 in FIG. 27. In a step S1101, it is determined whether a face direction detection reliability (a step S3201) is higher than a predetermined threshold. The "face direction detection reliability (reliability)" is the reliability of the face direction detection result detected by the face direction detection unit 20, and can be calculated by the face direction detection unit 20.

The recording-direction/field-angle determination unit 30 determines the moving amount from the extraction position in accordance with the face direction detection reliability. As a result of the determination in the step S1101, when it is determined that the face direction detection reliability is higher than the predetermined threshold, the process proceeds to a step S1102. In the meantime, as a result of the determination in the step S1101, when it is determined that the face direction detection reliability is not higher than (i.e., is equal to or lower than) the predetermined threshold, the process proceeds to a step S1105. It should be noted that the threshold is suitably changeable and settable.

In the step S1102, the center coordinate of the extraction area (i.e., an extraction position) is calculated on the basis of the face direction detection result in the step S2701.

In a step S1103, a clip process is executed on the basis of a difference between the target extraction position obtained in the step S1102 and the extraction position of the previous frame (a step S2702a) among the extraction positions of the past frames obtained in the step S2702. In the clip process, when the difference (a moving amount A) of the extraction position from the previous frame is small, a movement of the extraction position from the previous frame is regulated. That is, the extraction position of the previous frame is set as the target extraction position so as not to move the extraction position. The moving amount A from the previous frame is expressed by the following formula 200.

$$A=\sqrt{(p(t)-p(t-1))^2+(q(t)-q(t-1))^2}$$ Formula 200

When the moving amount A is equal to or lower than the threshold, the extraction position of the previous frame is used as the target extraction position. This reduces the variation of the extraction position caused by the slight variation of the face direction detection result. It should be noted that the threshold is suitably settable. Moreover, the moving amount may be calculated after multiplying weights to differences in the horizontal direction and vertical direction. The moving amount A in which the weights are multiplied is calculated by the following formula 300. In the formula 300, w1 denotes the weight in the horizontal direction and w2 denotes the weight in the vertical direction. In this case, w1>w2 is preferable.

$$A=\sqrt{w1\cdot(p(t)-p(t-1))^2+w2\cdot(q(t)-q(t-1))^2}$$ Formula 300

When the weight w2 is set to be smaller than the weight w1 in the formula 300, the vertical movement is less evaluated. That is, the moving amount is determined so that the moving amount of the extraction position corresponding to the movement of the user's face in the vertical (up-down) direction will become smaller than the moving amount of the extraction position corresponding to the movement of the user's face in the horizontal (left-right) direction. Thereby, variation of the target extraction position corresponding to the vertical movement can be reduced. When a user is walking or is talking, a user's face moves vertically in many cases. In such a case, the face direction detection result tends to show that the face is moving vertically. However, actually, the user is not intentionally moving the face direction and viewing direction vertically. Accordingly, it is preferable to reduce variation of the extraction position corresponding to a small movement of the face in the vertical direction.

In a step S1104, the target extraction position is determined depending on the image-pickup field angle of the fish-eye image. As a process depending on the image-pickup field angle of the fish-eye image, there is a correction process that corrects the target extraction position so that the entire extraction area will be included in the fish-eye image, for example.

In a step S1105 after executing the step S1101, it is determined whether the face direction detection reliability keeps low over a certain period (for example, the reliability keeps low over 3 seconds). As a result of the determination in the step S1105, when it is determined that the reliability keeps low over the certain period, the process proceeds to a step S1107. In the meantime, as a result of the determination in the step S1105, when it is determined that the reliability does not keep low over the certain period, the process proceeds to a step S1106.

In the step S1107, the target extraction position is returned to the image center of the wide-angle image. Moreover, in the step S1106, the target extraction position is set to the same position as the previous target extraction position.

Figure 28:
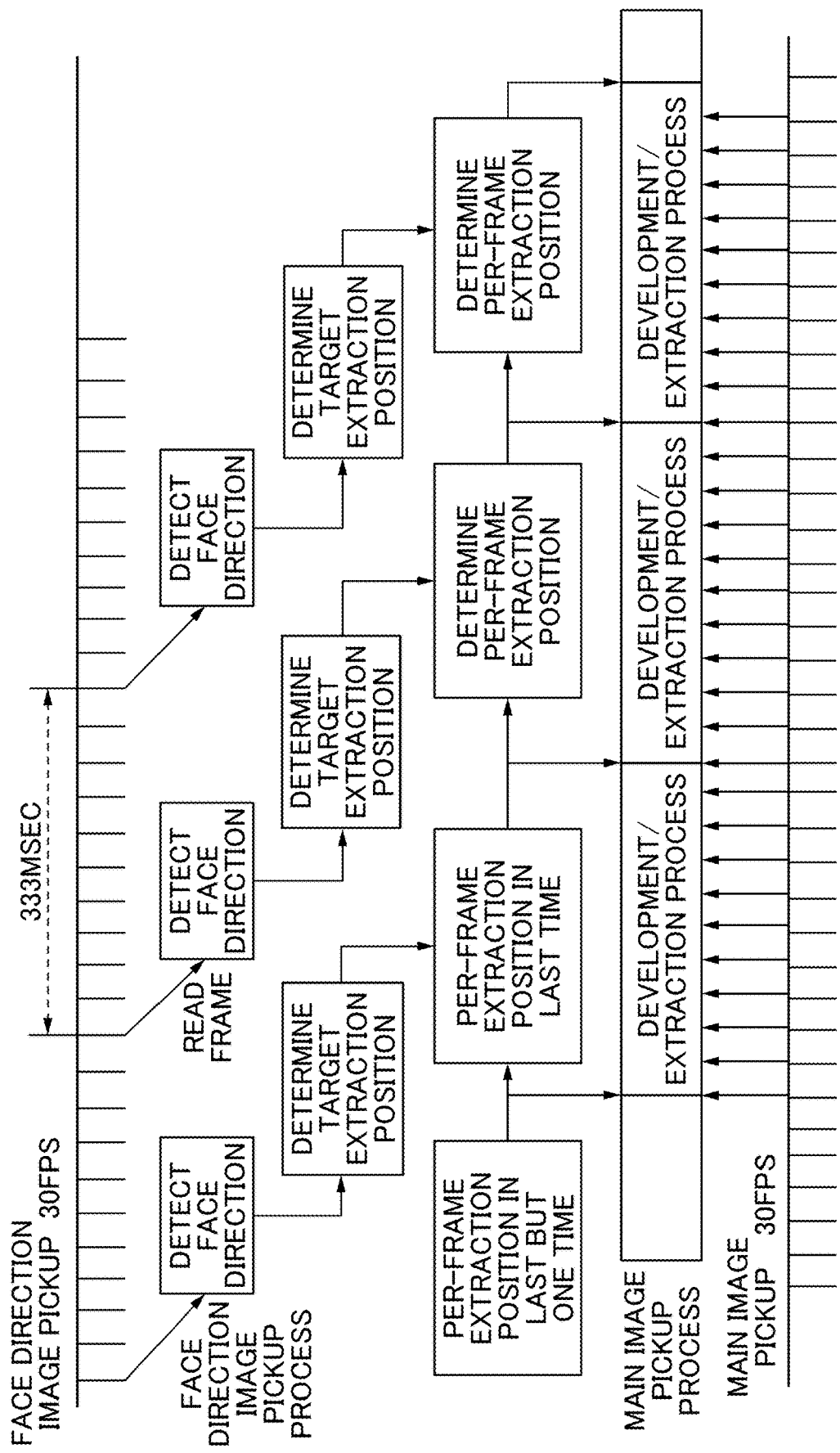
FIG. 28 is a timing chart showing timings of the process in the fifth embodiment.

FIG. 28 is a timing chart showing timings of the process in this embodiment. In FIG. 28, a processing speed of the face direction determination process and the extraction position determination process is 30 fps. Moreover, FIG. 28 shows a state where an extraction position in a next term is determined from the target extraction position and the extraction position determined by a per-frame extraction position determination process about the previous frame.

Figure 30:
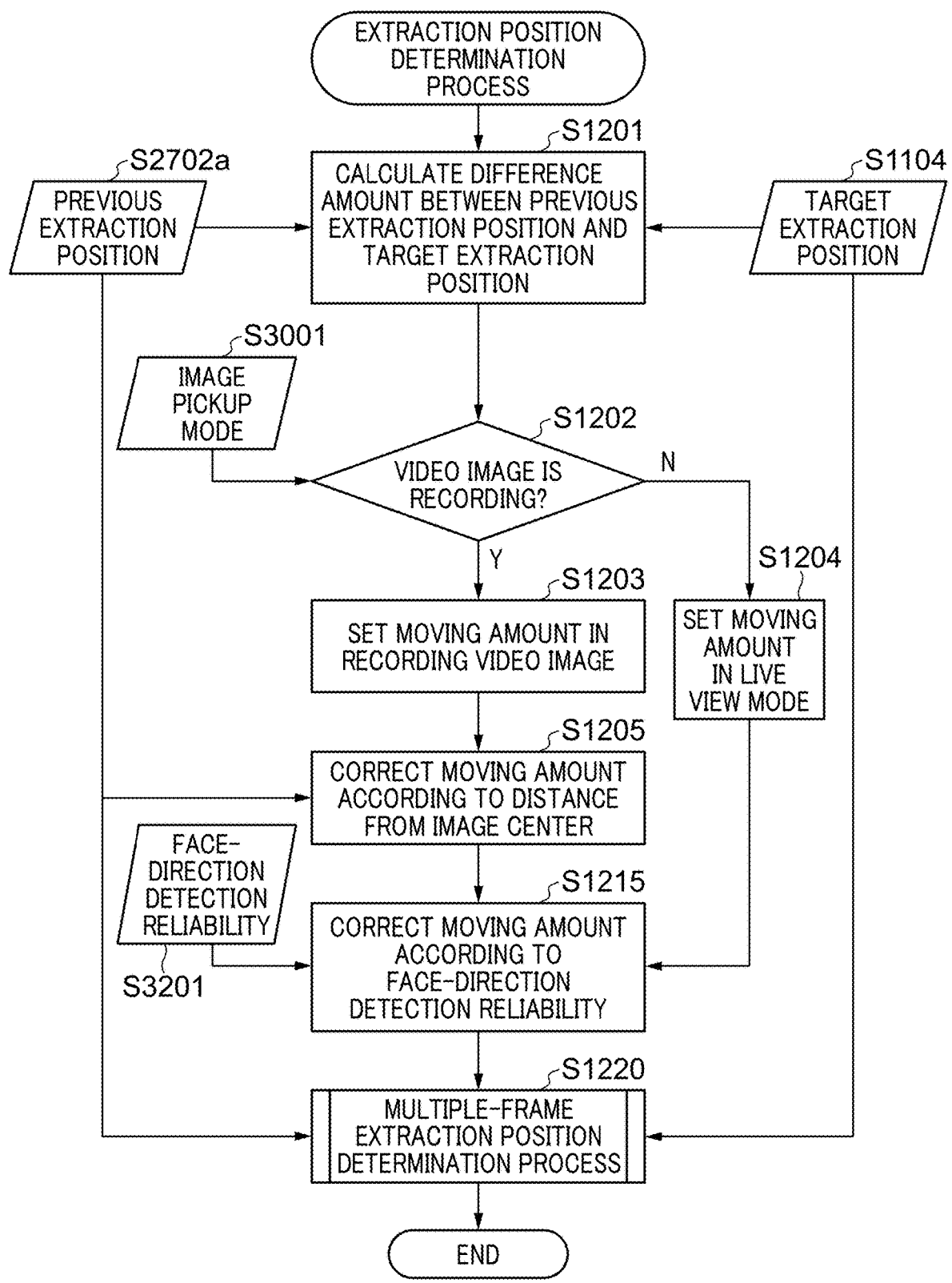
FIG. 30 is a flowchart showing details of the extraction position determination process in a step S1200 in FIG. 27.

FIG. 30 is a flowchart showing details of the extraction position determination process in the step S1200 in FIG. 27. As shown in FIG. 30, in a step S1201, a difference amount between a previous extraction position (the step S2702a) and a target extraction position (a step S1104), and a moving direction are calculated. When the coordinate of the target extraction position shall be (u, v), the difference amount (an inter-coordinate distance) B between the extraction position of the previous frame and the target extraction position is computable by the following formula 400.

$$B=\sqrt{(u-p(t-1))^2+(v-q(t-1))^2}$$ Formula 400

In a step S1202, it is determined whether the image pickup mode (a step S3001) is the video image mode (i.e., whether the video image is recording). As a result of the determination in the step S1202, when it is determined that the video image is recording, the process proceeds to a step S1203. In the meantime, as a result of the determination in the step S1202, when it is determined that the video image is not recording, the process proceeds to a step S1204. For example, when the image pickup mode is set to a live view mode in which the video image is not recording, it is determined that the image pickup mode is not the video image mode. Moreover, there is also a calibration mode for associating a face direction and an image extraction position in a wide angle image as another mode. The camera body 1 is constituted so as to allow selection of any mode.

Figure 29A:
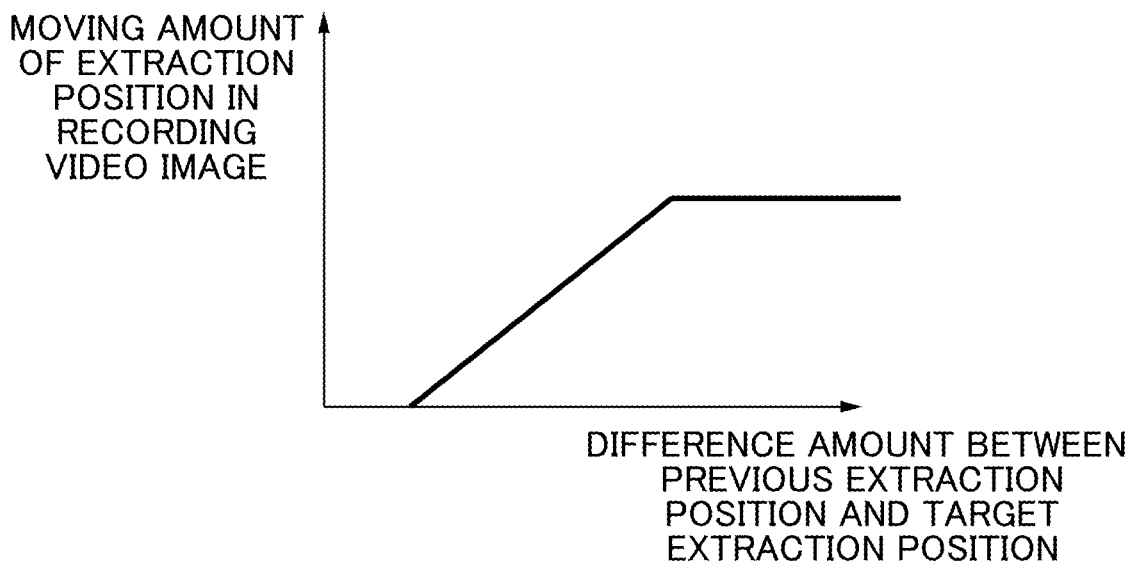
FIG. 29A is a graph showing a state of moving amount control based on a difference amount between a previous extraction position and a target extraction position in recording a video image.

In the step S1203, a moving amount of an extraction position in recording a video image is set on the basis of the difference amount between the target extraction position and the previous extraction position calculated in the step S1201. FIG. 29A is a graph showing a state of setting of a moving amount based on a difference amount between a previous extraction position and a target extraction position in recording a video image. As shown in FIG. 29A, when the difference amount is small (a predetermined fixed amount), the moving amount is not set constant, i.e., it varies. Moreover, when the difference amount is more than the fixed amount, the moving amount is set constant. This shows that the moving amount of the extraction position is limited so as not to become larger than the fixed amount when the variation of the face direction (angle) is large. Accordingly, even when the face direction varies intensely, the moving speed of the extraction position does not become fast more than needed.

Figure 29B:
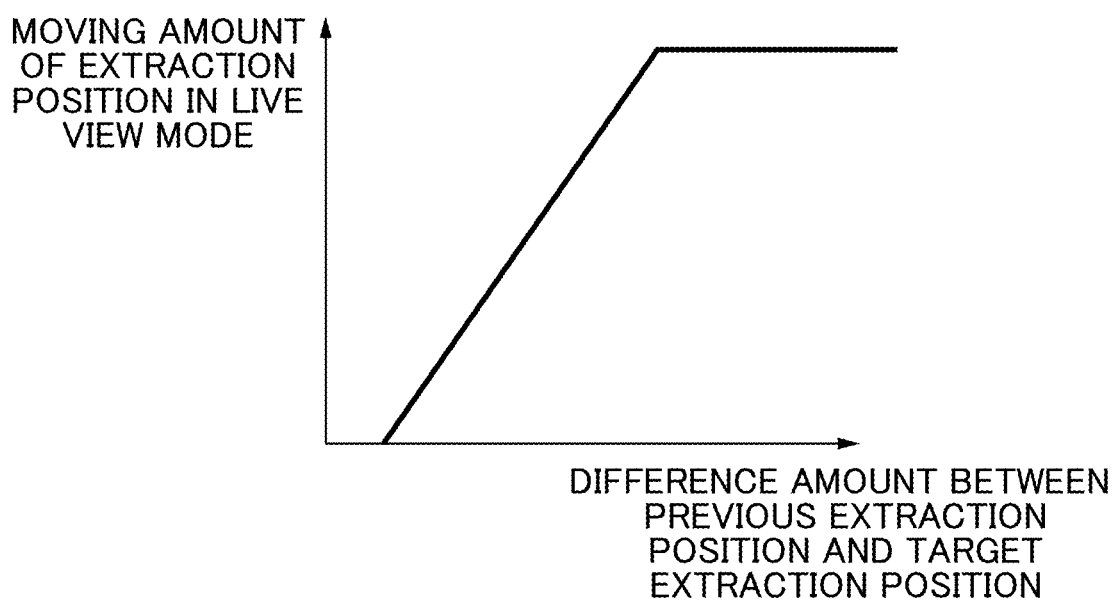
FIG. 29B is a graph showing a state of the moving amount control in a live view mode.

In the step S1204 after executing the step S1202, the moving amount in the live view mode is set on the basis of the difference amount between the last extraction position and the target extraction position. FIG. 29B shows a state of setting of the moving amount in the live view mode (the step S1204). As shown in FIG. 29B, the moving amount in the live view mode is set to be larger than the moving amount in the video image mode set in the step S1203. Moreover, even when the difference amount is small, the moving amount of the extraction position depends on the variation of the face direction more finely. In the live view mode, it is preferable that the image extraction position follow the face direction detection result more quickly and precisely in order to enable check of the image extraction position in real time.

Figure 29C:
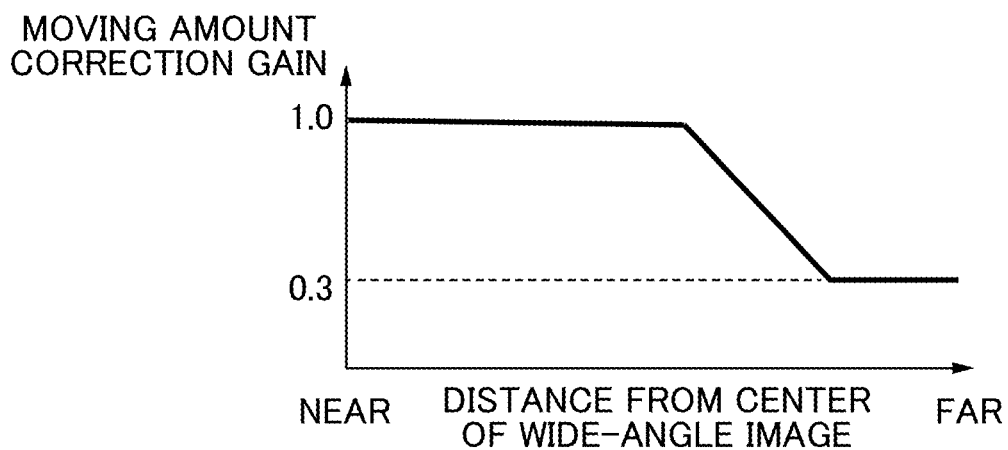
FIG. 29C is a graph showing a moving amount correction gain that is multiplied to the moving amount in order to reduce the moving amount in recording a video image.

In a step S1205, the moving amount of the extraction position in recording a video image is corrected according to the extraction position from the fish-eye image. FIG. 29C is a graph showing a moving amount correction gain multiplied to the moving amount in order to reduce the moving amount in accordance with a distance to the extraction position from the center of the fish-eye image (the wide-angle image). As shown in FIG. 29C, the more the distance to the extraction position from the center of the fish-eye image is, the smaller the moving amount correction gain multiplied becomes.

In this embodiment, a distortion correction centering on an extraction position is applied to an image in an area extracted from the fish-eye image. Since distortion of an image becomes relatively large in a periphery of a fish-eye image, a distortion correction amount becomes large in the periphery. Moreover, image quality deterioration due to the distortion correction increases toward the periphery of the fish-eye image. If a user watches an image with poor image quality in long time, the user easily recognizes the poor image quality. Accordingly, it is preferable that a period during which the user watches an image of a periphery of the fish-eye image be controlled as short as possible.

In this way, in the step S1205, the moving amount of the extraction position due to certain variation of the face direction in the central part of the wide-angle image differs from that in the periphery. That is, the moving amount in the periphery is reduced in comparison with that in the central part. Moreover, when a human looks in a specific direction, it is known that the human first changes a face angle and changes a direction of one's body during a short period thereafter in many cases. Accordingly, in this embodiment, opportunity to look at the periphery of the fish-eye image for long time can be reduced.

Moreover, the method to reduce a moving speed of an extraction area toward a periphery of a fish-eye image is suitable for this embodiment. Moreover, in this embodiment, the moving amount may be controlled so that the moving amount toward the periphery of the fish-eye image will become smaller than the moving amount toward the central part of the fish-eye image instead of reducing the moving amount toward the periphery from the central part of the fish-eye image. Moreover, since a real time nature of checking an image is required in the live view mode, it is preferable to stop the moving amount correction in the periphery in the live view mode.

Figure 29D:
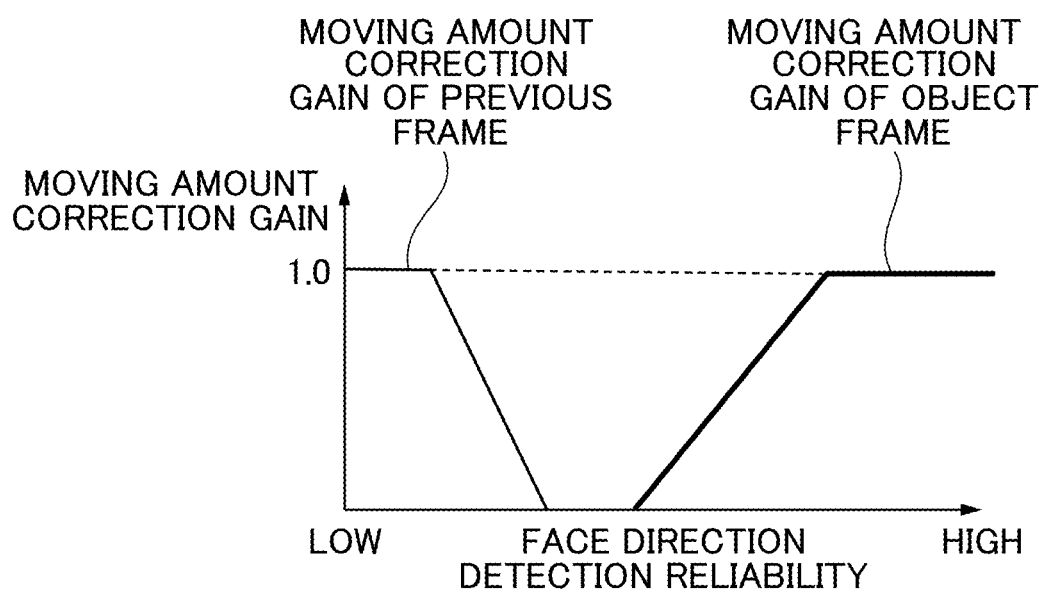
FIG. 29D is a graph showing a state of the moving amount control corresponding to face direction detection reliability.

In a step S1215, the moving amount is corrected according to the face direction detection reliability. FIG. 29D is a graph showing a state where the moving amount is determined according to the face direction detection reliability. As shown in FIG. 29D, when the face direction detection reliability is high, the moving amount correction gain of an object frame is increased so as to heighten the ratio of the moving amount of the extraction position that is found in the steps S1201 through S1205. In the meantime, when the face direction detection reliability is low, the moving amount correction gain of a previous frame is increased so as to heighten the ratio of the moving amount of the extraction position that is found before the previous frame. When the reliability is a middle value, the extraction position is not moved, i.e., it is controlled to fix the extraction position. Moreover, it may be controlled so as to decrease the moving amount of the extraction position of the previous frame.

In a step S1220, the extraction positions of the multiple frames are determined on the basis of the target extraction position and moving amounts that are determined. Specifically, a previous frame and following frame that are consecutive frames are focused and a moving amount from an extraction position of the previous frame is determined. Then, an extraction position of a following frame is determined on the basis of the determined moving amount and the extraction position of the previous frame.

Figure 31:
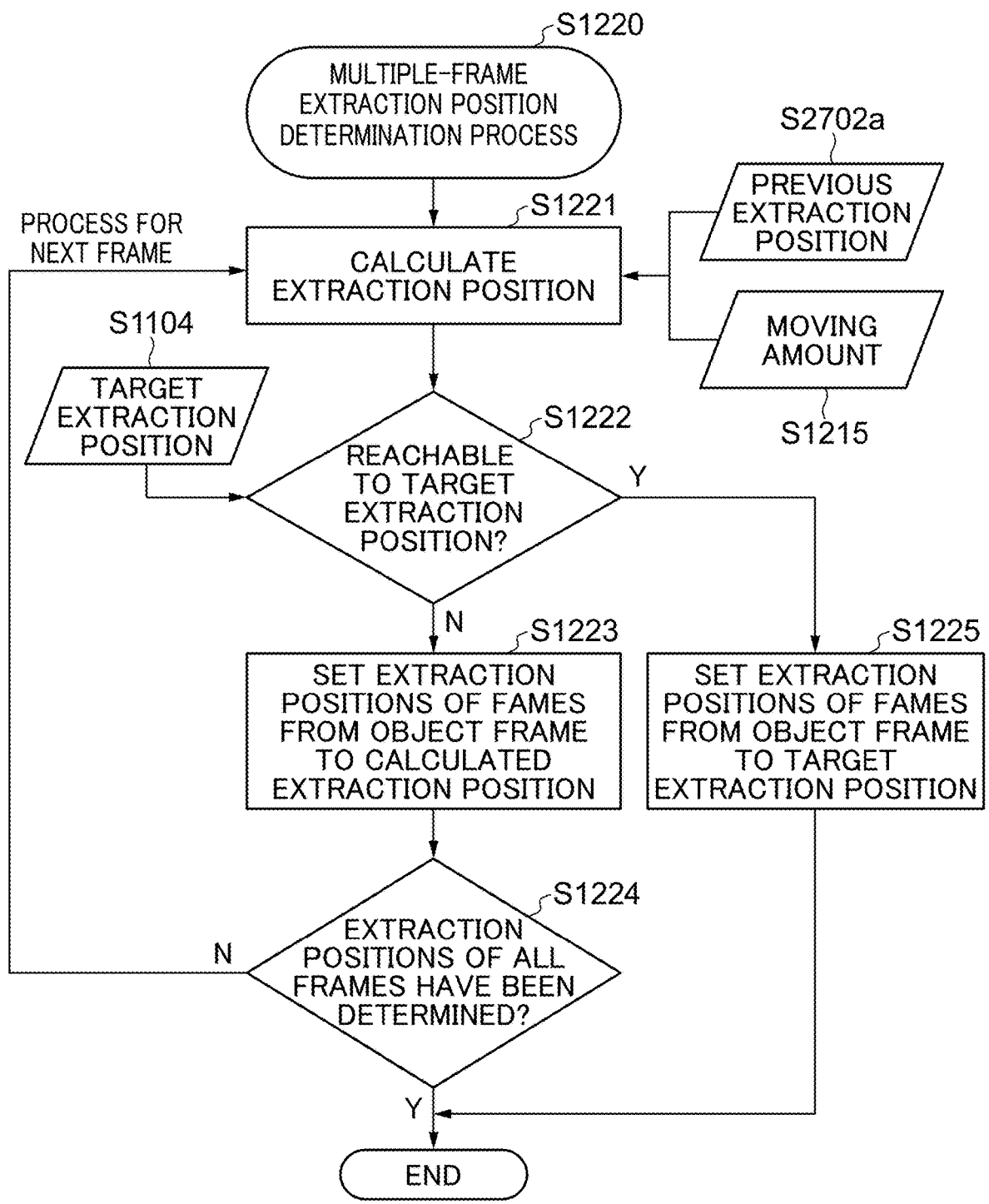
FIG. 31 is a flowchart showing the multiple-frame extraction position determination process in a step S1220 in FIG. 30.

FIG. 31 is a flowchart showing the multiple-frame extraction position determination process in the step S1220 in FIG. 30. As shown in FIG. 31, in a step S1221, an extraction position of the following frame is calculated on the basis of the extraction position of the previous frame (the step S2702a) and the moving amount found in the step S1215.

In a step S1222, it is determined whether an extraction position is reachable to a target extraction position. As a result of the determination in the step S1222, when it is determined that the extraction position is reachable to the target extraction position, the process proceeds to a step S1225. In the meantime, as a result of the determination in the step S1222, when it is determined that the extraction position is not reachable to the target extraction position, the process proceeds to a step S1223.

In the step S1225, the extraction positions of frames from the object frame that reaches the target extraction position are set to the target extraction position. And then, the multiple-frame extraction position determination process is finished.

In the step S1223 after executing the step S1222, the extraction position of the object frame is set to the extraction position calculated in the step S1221.

Then, in a step S1224, it is determined whether the extraction position determination process for all the frames has been completed. As a result of the determination in the step S1224, when it is determined that the extraction position determination process for all the frames has been completed, the multiple-frame extraction position determination process is finished. In the meantime, as a result of the determination in the step S1224, when it is determined that the extraction position determination process for at least one frame has not been completed, the process returns to the step S1221. and the steps therefrom will be sequentially executed.

As mentioned above, in this embodiment, the target extraction position to which the extraction position should reach is determined on the basis of the detection result of the face direction detection unit 20, and the extraction positions of multiple frames are determined so that the moving amounts will fall within a predetermined range. Then, a video image that is easy to watch is created while extracting a video image according to a face direction of a user in real time. By such a configuration, even when a face moves frequently or suddenly, a video image that is easy to watch is obtained. It should be noted that extraction positions of multiple frames can be determined so that moving amounts until reaching a target extraction position will vary at equal intervals in this embodiment. In this case, when the extraction position of an object frame among the multiple frames reaches the target extraction position, it is preferable to determine the target extraction position as the extraction positions of frames from the object frame. Such a determination contributes to creation of the video image that is easy to watch.

Next, the face direction detection method by the face direction detection unit 20 in FIG. 4 in this embodiment will be described. A face direction is detected using AI (Artificial Intelligence) in this embodiment. In recent years, there is a known learning model to which machine learning (for example, Deep Learning) for detecting a face direction without detecting feature points, such as eyes and a nose, is applied. For example, this learning model is described in Nataniel Ruiz, et al., *Fine-Grained Head Pose Estimation Without Keypoints*, CVF, 2017, https://app.journal.ieice.org/trial/102_10/k102_10_987_2/index.html (Searched Mar. 7, 2022). Then, a face direction is detectable on the basis of an image that is picked up an upper side from a clavicle position by using the learning model. The face direction detection unit 20 may be achieved by an exclusive processor using ASIC or FPGA, or may be achieved by the overall control CPU 101.

Parameters learned beforehand are set to the face direction detection unit 20. The face direction detection unit 20 can obtain angular information showing a face direction on the basis of the face image and the preset parameters. Learning of the parameters used for detecting the face direction needs many learning images (teacher data). Each learning image is a combination of a face image and information about vertical and horizontal angles of the face as correct answers.

FIG. 33A through FIG. 33C are schematic views showing examples of learning images. Then, FIG. 33A is a face image picked up in a state where face angles are 0° in the horizontal direction and 0° in the vertical direction. FIG. 33B is a face image picked up in a state where face angles are 30° in the horizontal direction and 0° in the vertical direction. FIG. 33C is a face image picked up in a state where face angles are 0° in the horizontal direction and 33° in the vertical direction.

Images (for example, hundred images) picked up at respective angles while moving a face by every 10° within a face direction detection range are used as the learning images. For example, when the face direction detection range covers −60° through +60° in the horizontal direction and −60° through +50° in the vertical direction, the learning images are picked up while changing the face angle in the vertical direction by every 10° within the range of −60° through +50° and while keeping the face angle in the horizontal direction to be constant. Next, the face angle in the horizontal direction is changed by 10° and the similar image pickup operation is performed. The learning images are obtained by repeating such an image pickup operation within the range of −60° through +60°. Moreover, in order to respond various users and situations, it is necessary to cover various conditions other than the face angle in accumulating learning images. For example, it is necessary to select human objects so as to cover estimated user's physique, age, and gender, in preparing learning images. Moreover, it is necessary to prepare learning images broadly so as to absorb difference of estimated backgrounds, such as indoor and outdoor.

Figure 34:
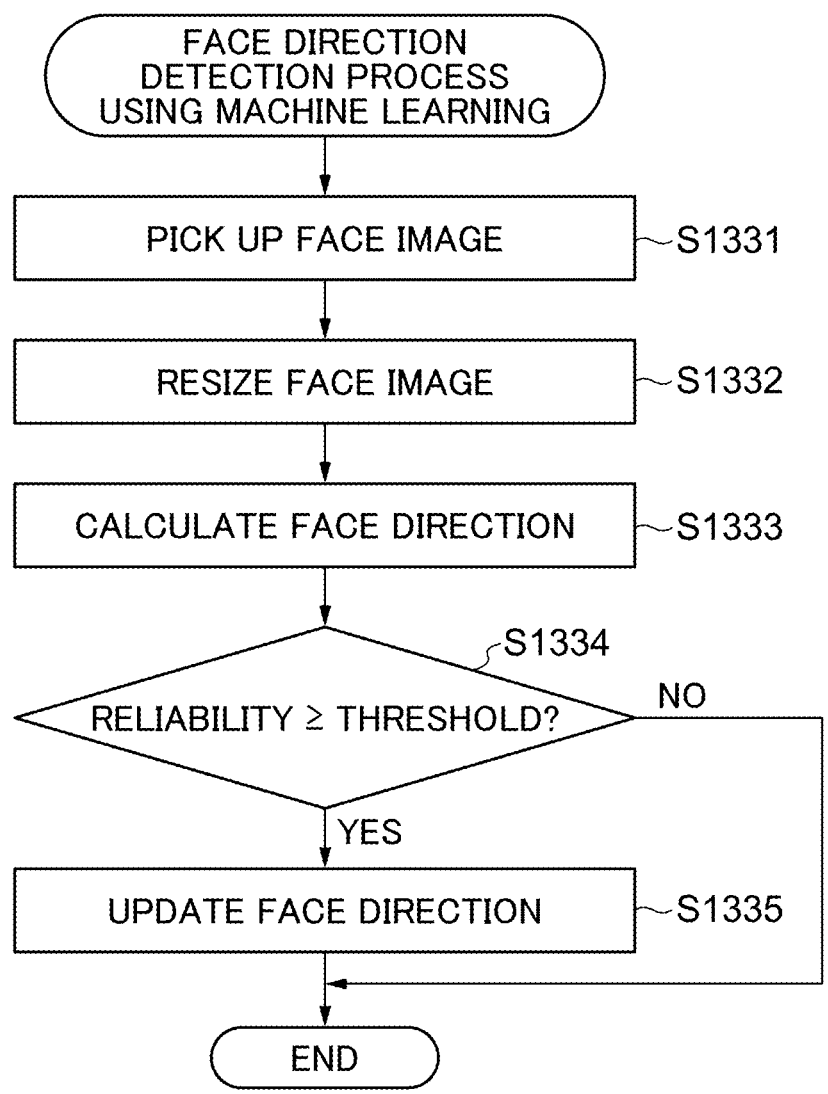
FIG. 34 is a flowchart showing a face direction detection process using machine learning.

FIG. 34 is a flowchart showing a face direction detection process using machine learning. Each process in this flowchart is achieved because the overall control CPU 101 runs the program stored in the internal nonvolatile memory 102. As shown in FIG. 34, in a step S1331, first, a face image is picked up by the image pickup unit 1311.

Next, in a step S1332, the pickup face image is resized to the size suitable to input into the face direction detection unit 20.

Next, in a step S1333, the face image resized in the step S1332 is input into the face direction detection unit 20, and a face direction is calculated by the face direction detection unit 20. In the above-mentioned machine learning, reliability showing probability (accuracy) of a processing result is calculated in addition to processing results, such as a face direction, in general.

Next, in a step S1334, it is determined whether the reliability calculated in the step S1333 is equal to or more than a predetermined threshold. As a result of determination in the step S1334, when it is determined that the reliability is equal to or more than the threshold, the process proceeds to a step S1335. In the meantime, as a result of determination in the step S1334, when it is determined that the reliability is less than the threshold, the process is finished.

In the step S1335, the face direction calculated in the step S1333 is set as a new face direction (the face direction is updated). In this way, in this embodiment, the face direction is detectable using the machine learning, such as Deep Learning.

Figure 35A:
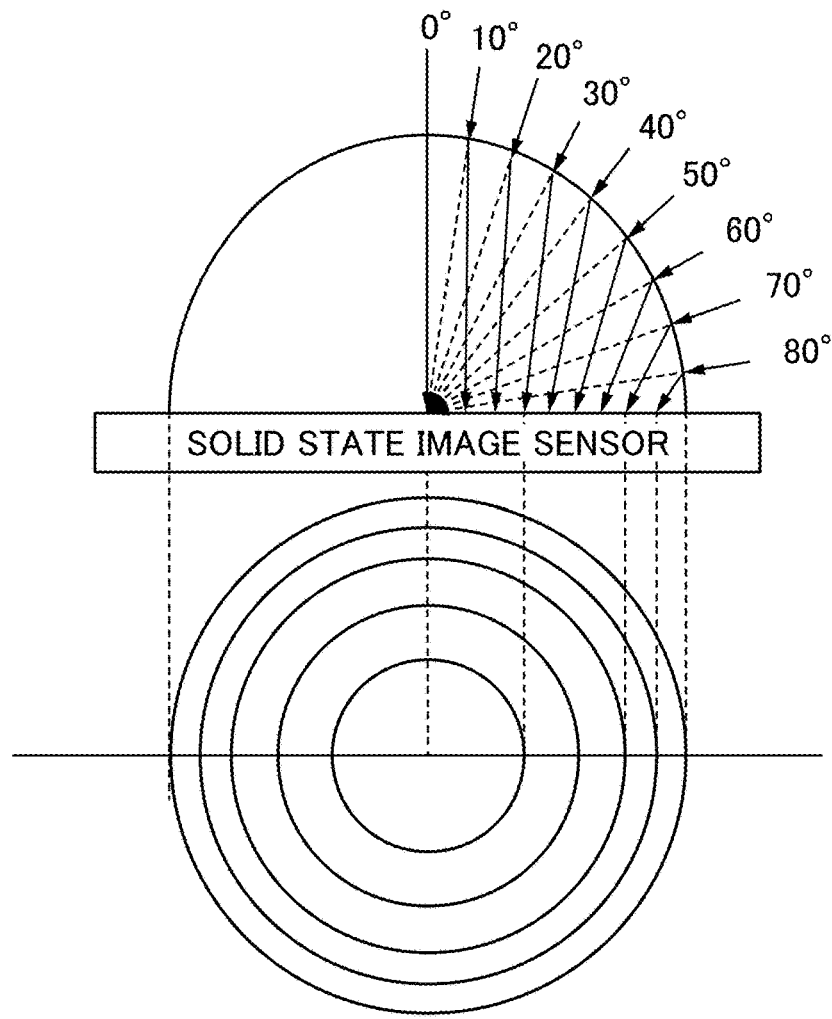
FIG. 35A is a schematic view showing a correspondence relation between an image plane of a fish-eye lens and a face direction and a state of calculating a coordinate of the image plane.

Next, describe the calculation method of the extraction position on the basis of a face angle. In the description, the image pickup lens 16 in FIG. 5 shall be an equidistant projection fish-eye lens. FIG. 35A is a schematic view showing a relation between an incident angle and an imaging position in a plane parallel to the optical axis and a relation between an incident angle of a light ray and an imaging position in an image plane perpendicular to the optical axis. Moreover, in this embodiment, as shown in FIG. 35A, a field angle of the equidistant projection fish-eye lens is 180° (±90° with respect to the optical axis). Moreover, when this equidistant projection fish-eye lens is used, an incident angle θ with respect to the optical axis and an image height T of an imaging point satisfy a relation T=θ/90.

Figure 35B:
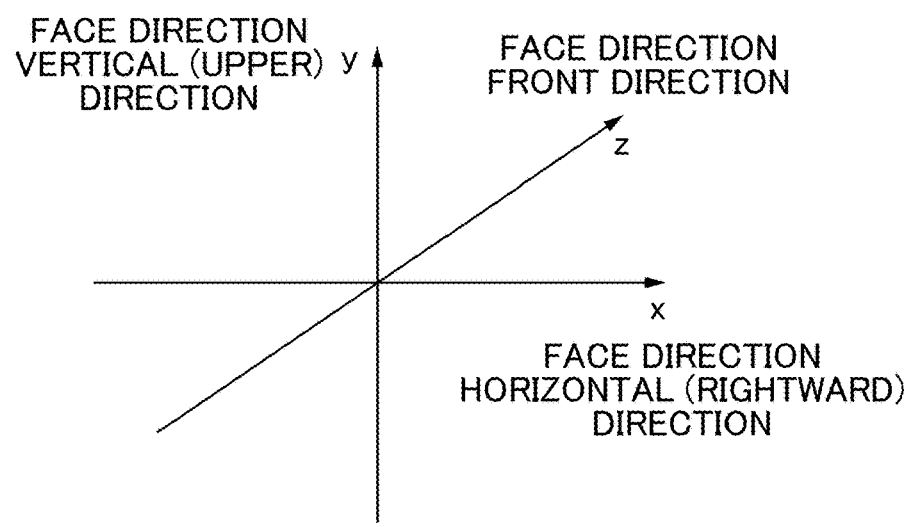
FIG. 35B is a schematic view showing the correspondence relation between the image plane of the fish-eye lens and the face direction and the state of calculating the coordinate of the image plane.
Figure 35C:
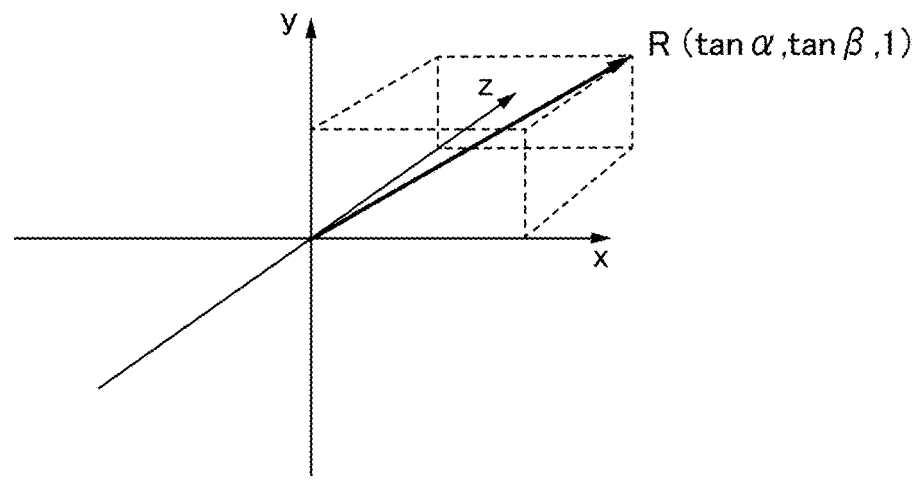
FIG. 35C is a schematic view showing the correspondence relation between the image plane of the fish-eye lens and the face direction and the state of calculating the coordinate of the image plane.
Figure 35D:
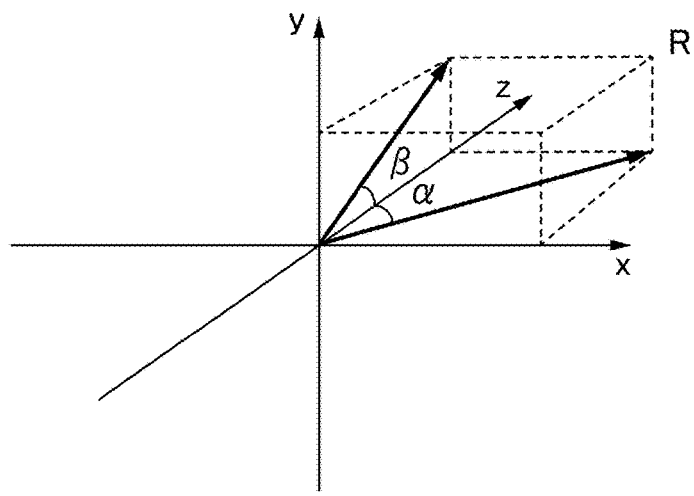
FIG. 35D is a schematic view showing the correspondence relation between the image plane of the fish-eye lens and the face direction and the state of calculating the coordinate of the image plane.

Hereinafter, in describing the direction and angle of a face, the horizontal direction, vertical direction, and front direction with respect to the face direction are described as a coordinate (x, y, z) as shown in FIG. 35B before describing the face direction and face angle. Moreover, a coordinate of a face direction R shown in FIG. 35C becomes as follows. As shown in FIG. 35D, the face direction R is divided into a horizontal component and a vertical component. An angle between the horizontal component and the z-axis (the front direction) shall be α, an angle between the vertical component and the z-axis shall be β, and a coordinate of the face direction R in the z-axis direction shall be "1". In such a case, the coordinate of the face direction R will be (tan α, tan β, 1). Accordingly, an angle Δ between the face direction R and the optical axis direction (the z-axis direction (0, 0, 1)) is calculated by the following formula 500 using an inner product calculation of vectors.

$$\cos \Delta = \frac{1}{\sqrt{\tan \alpha^2 + \tan \beta^2 + 1}} \quad \text{Formula 500}$$

Then, the distance from the optical axis in the image plane, i.e., the image height T, is found by an equation T=Δ/90.

Figure 35E:
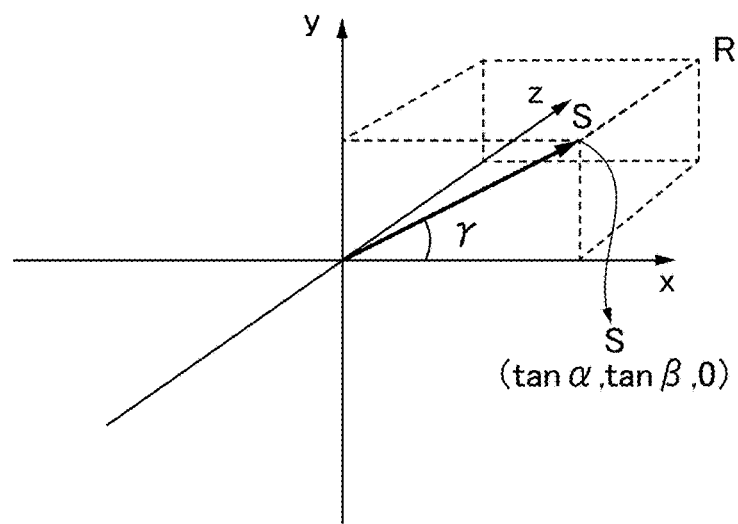
FIG. 35E is a schematic view showing the correspondence relation between the image plane of the fish-eye lens and the face direction and the state of calculating the coordinate of the image plane.
Figure 35F:
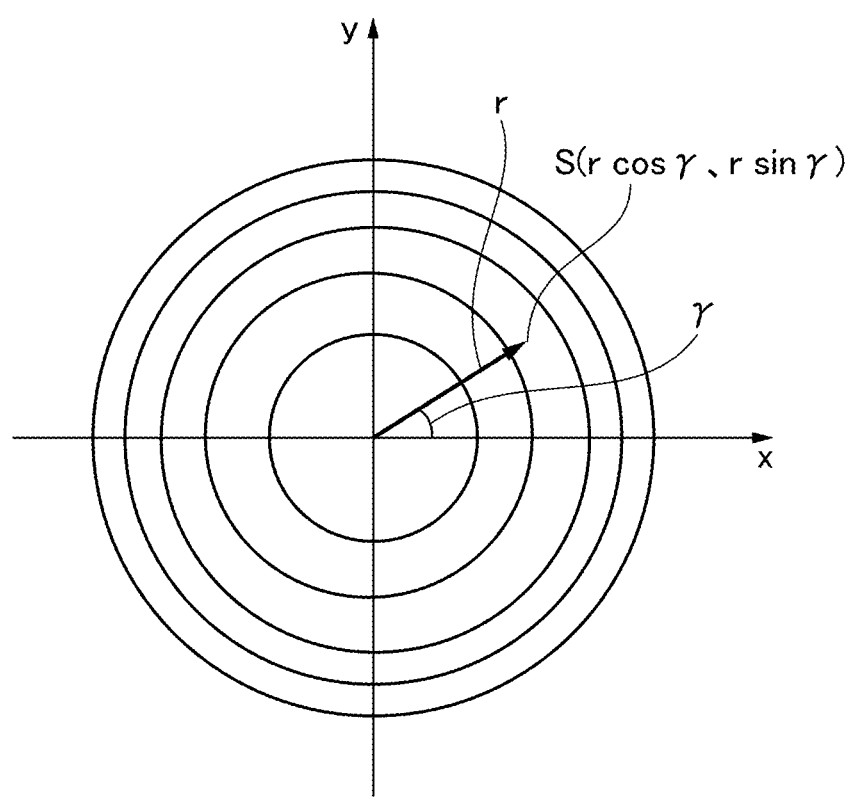
FIG. 35F is a schematic view showing the correspondence relation between the image plane of the fish-eye lens and the face direction and the state of calculating the coordinate of the image plane.

In the meantime, as shown in FIG. 35E, a coordinate of a mapping component S of the face direction R onto an xy-plane (the image plane) becomes (tan α, tan β, 0), and an angle γ formed between the mapping component S and the x-axis in the image plane is calculated by the following formula 600.

$$\tan \gamma = \tan \beta / \tan \alpha \quad \text{Formula 600}$$

Namely, the coordinate around the optical axis is expressed by (r cos γ, r sin γ), and the face angle and the imaging position can be converted.

Figure 36A:
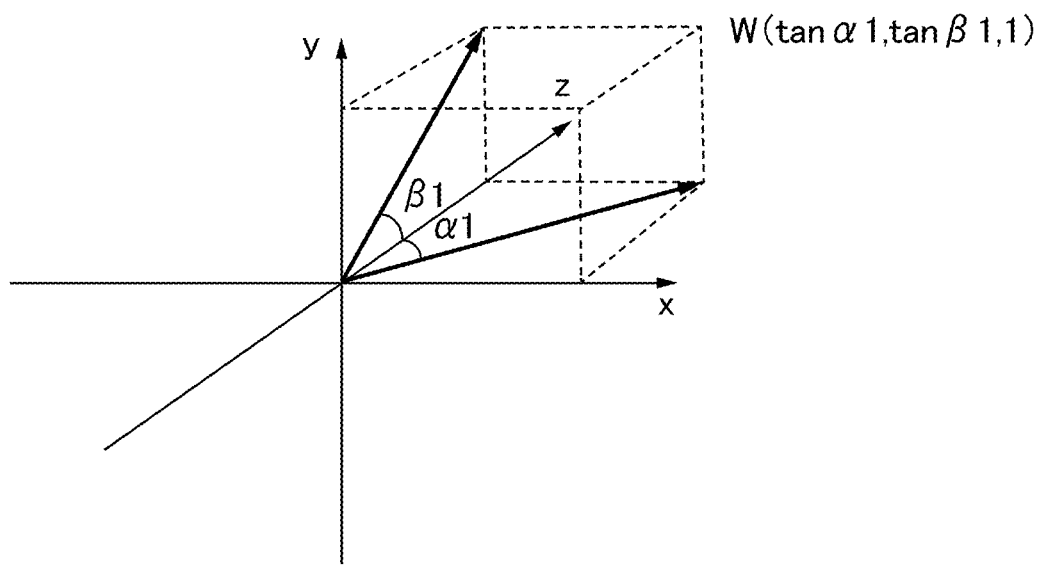
FIG. 36A and FIG. 36B are schematic views showing states of calculating extraction positions in a case where a face direction varies in the fifth embodiment.
Figure 36B:
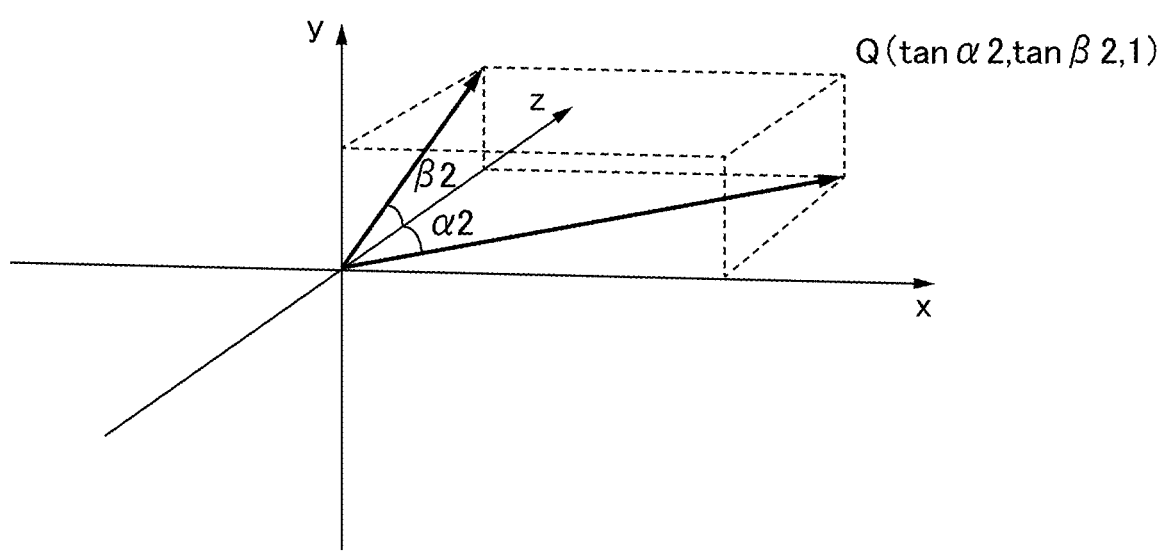

Next, a relation between variation of the face direction and movement of the coordinate in the image plane will be described. As shown in FIG. 36A and FIG. 36B, a previous extraction position shall be a point W, a target extraction position shall be a point Q, a face direction at the point W shall be (α1, β1), and a face direction at the point Q shall be (α2, β2). A coordinate of the point W is (tan α1, tan β1, 1) and a coordinate of the point Q is (tan α2, tan β2, 1). Moreover, a moving direction becomes (tan α2−tan α1, tan β2−tan β1, 0).

Figure 36C:
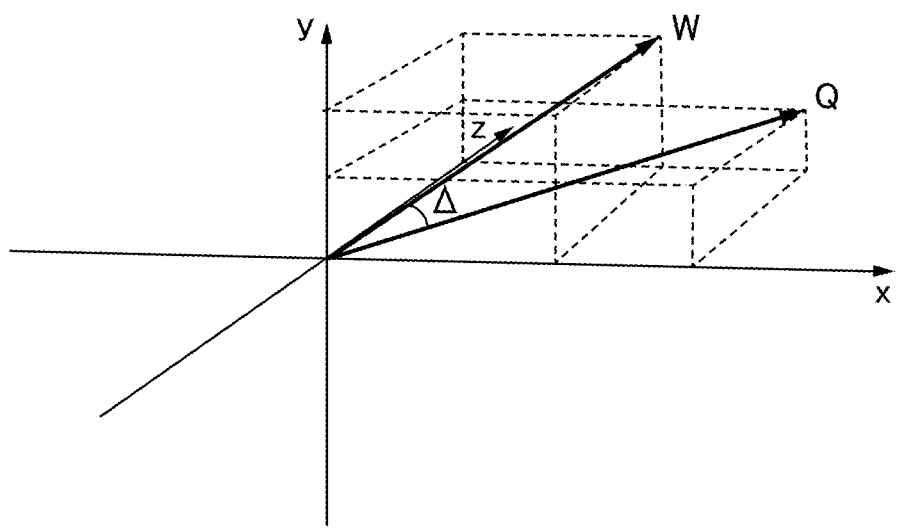
FIG. 36C and FIG. 36D are schematic views showing states of calculating extraction positions in the case where the face direction varies in the fifth embodiment.
Figure 36D:
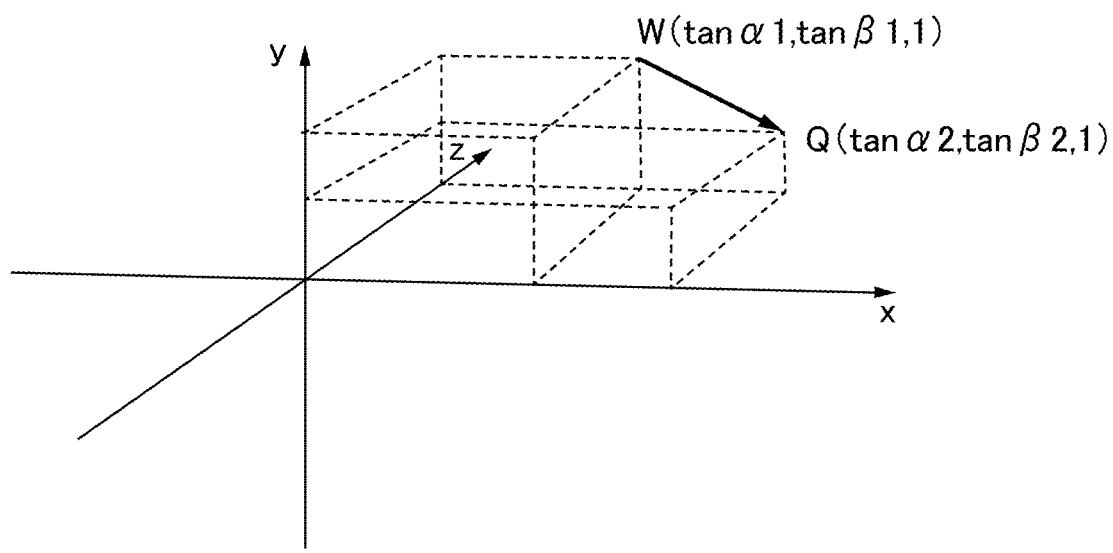

Moreover, as shown in FIG. 36C and FIG. 36D, an angle Δ between vectors of which start points are the origin O and respective end points are points W and Q is calculated by the following formula 700 using an inner product calculation of the vectors.

$$\cos \Delta = \frac{\tan \alpha 1 \cdot \tan \beta 1 + \tan \alpha 2 \cdot \tan \beta 2 + 1}{\sqrt{\tan \alpha 1^2 + \tan \beta 1^2 + 1} \cdot \sqrt{\tan \alpha 2^2 + \tan \beta 2^2 + 1}} \quad \text{Formula 700}$$

Figure 36E:
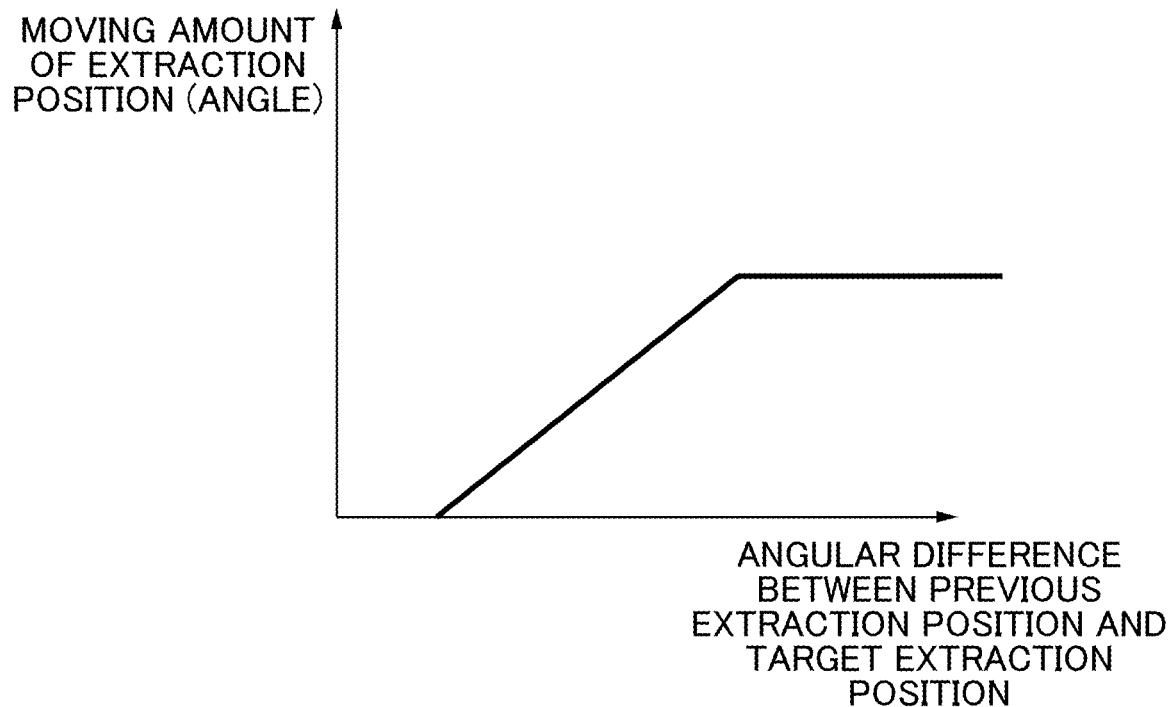
FIG. 36E is a graph showing a state of calculating an extraction position in the case where the face direction varies in the fifth embodiment.

FIG. 36E is a graph showing a state where a moving amount is determined in accordance with a difference angle between the previous extraction position and the target extraction position. This moving amount determination process is equivalent to the step S1203 in FIG. 30. As shown in FIG. 36E, when the difference angle between the previous extraction position and the target extraction position becomes larger than a predetermined value, the angle of the moving amount is restricted uniformly (maintained). In such a case, the extraction position moves at a fixed speed irrespective of the difference angle.

Figure 36F:
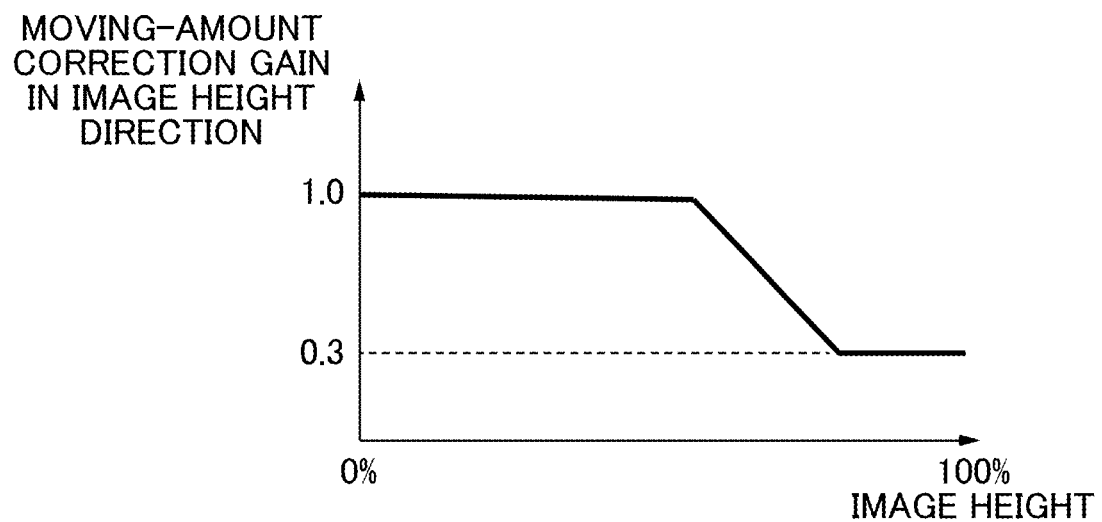
FIG. 36F is a graph showing a state of calculating an extraction position in the case where the face direction varies in the fifth embodiment.

FIG. 36F is a graph showing a state where the moving amount shown in FIG. 36E is corrected when the extraction position moves toward the periphery of the wide-angle image (i.e., in a high image height area). The higher the image height is, the smaller the moving amount correction gain is. This correction process is equivalent to the step S1205 in FIG. 30.

Figure 36G:
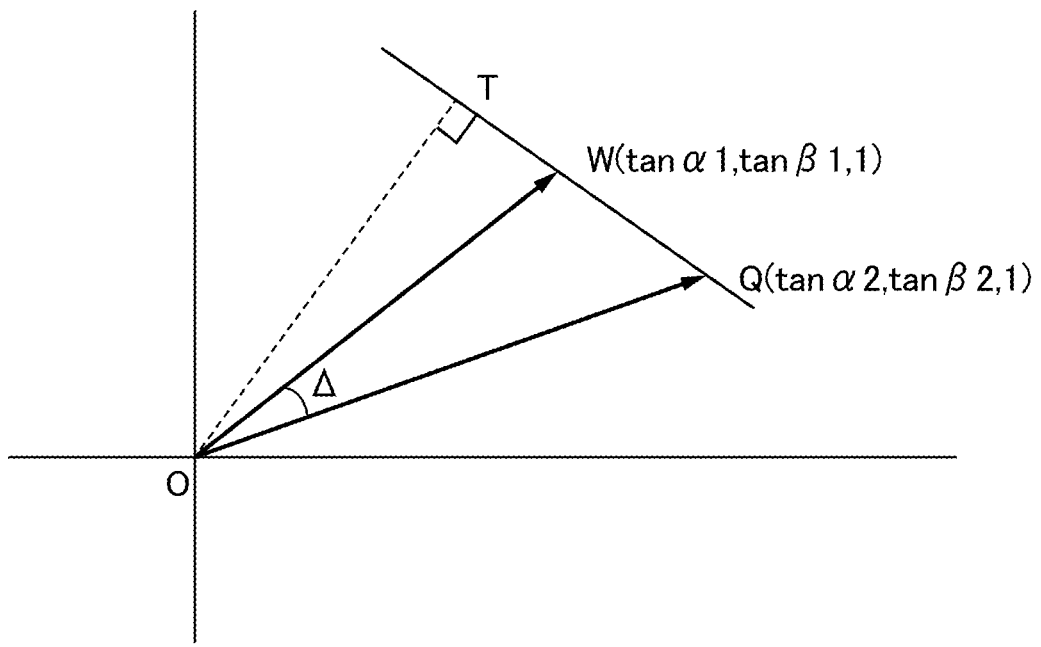
FIG. 36G is a graph showing a state of calculating an extraction position in the case where the face direction varies in the fifth embodiment.

FIG. 36G is a graph showing a plane that includes the origin O, the point Q, and the point W. A point T in FIG. 36G is a foot of a perpendicular on a plane of z=1 at which the perpendicular from the origin O intersects perpendicularly with a line segment WQ that connects the points Q and W. A length of a line segment OT that connects the points O and T can be calculated from the coordinates of the points W and Q because the line segment OT intersects perpendicularly with the line segment WQ. Accordingly, the extraction positions that are determined in the steps S1203 and S1205 to be moved from the point W to the point Q at equal angular intervals can be calculated.

It should be noted that there are methods other than the above-mentioned method. For example, the moving direction is separated into a direction of an image height in the image plane and a circumferential direction, and the moving amount may be corrected when the moving amount toward a high image height area is large. Moreover, although this embodiment is described so that the setting of the moving amount and the determination of the correction amount corresponding to the image height are performed to multiple frames, the moving amount and the correction amount may be determined for every frame.

Moreover, in this embodiment, although the image pickup lens 16 shall be the equidistant projection fish-eye lens, the lens type is not limited to this. For example, a fish-eye lens other than the equidistant projection fish-eye lens or a wide-angle lens may be employed. Also in such a case, a face direction and an imaging position are computable from a projection method, a field angle, and a distortion characteristic of a lens.

Moreover, although the moving amount of the extraction position in the live view mode is set (is determined) to be larger than that in the video recording mode in this embodiment, the present invention is not limited to this. For example, when this embodiment is applied to the calibration mode of the first embodiment, the moving amount of the extraction position in the calibration mode may be set (is determined) to be larger than that in the live view mode. Thereby, since the extraction position is correctly displayed corresponding to the face direction, more correct calibration is available.

Figure 37A:
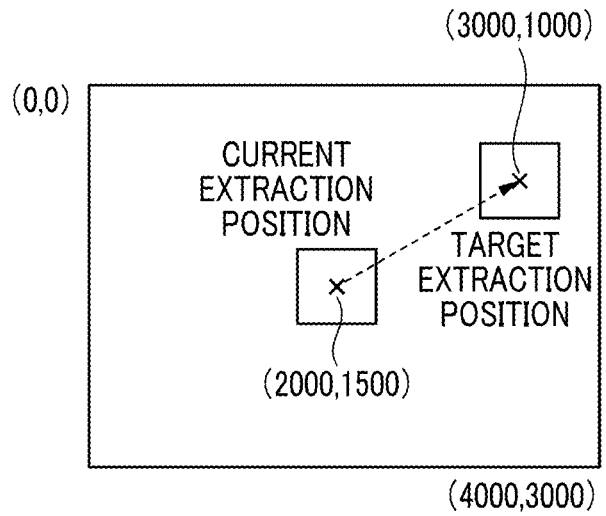
FIG. 37A and FIG. 37B are views describing states of calculating coordinates of image extraction positions from a fish-eye image using concrete numerical values in a sixth embodiment.
Figure 37B:
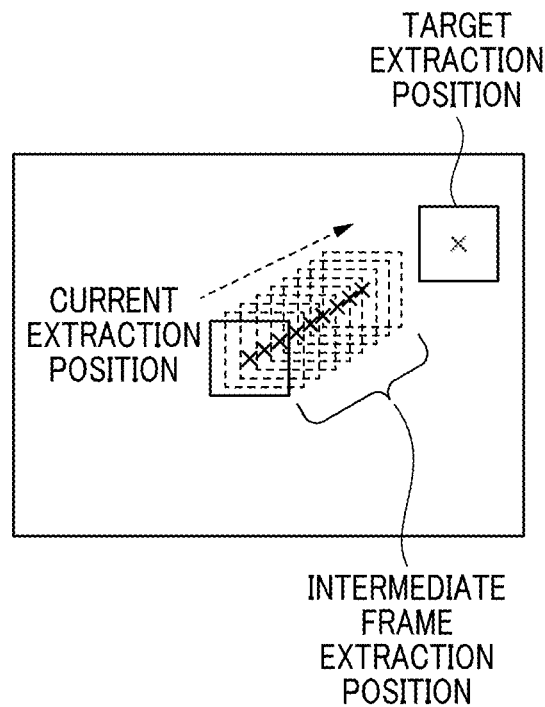

Next, a sixth embodiment will be described. In this embodiment, the state where the coordinate of the extraction position of the image extracted from the fish-eye image is calculated described by referring to FIG. 35A through FIG. 35F in the fifth embodiment is described using concrete numerical values. FIG. 37A and FIG. 37B are views each of which shows a state where the extraction positions of multiple frames move as a result of the calculation of the extraction positions of the multiple frames in this embodiment.

As shown in FIG. 37A and FIG. 37B, the size of the fish-eye image shall be 4000*3000 pixels, a current extraction position shall be (2000, 1500), a target extraction position shall be (3000, 1000), and a moving amount per one frame shall be 25 pixels. In this case, variation between the target extraction position and the current extraction position is (1000, −500) pixels. Accordingly, a direction of a movement vector of the image extraction position becomes (2, −1), and the moving amount for one frame becomes (22.5, −11.25) pixels on the basis of the moving amount of 25 pixels and the direction of the movement vector. Moreover, the extraction position of ten frames later becomes (2225, 1387). Moreover, when the face direction detection results from the following frames are identical, an extraction position of 44 frames later will reach the target extraction position. For example, when the frame rate of picking up an image is 30 fps, the extraction position will reach the target extraction position about 1.5 seconds later.

Figure 37C:
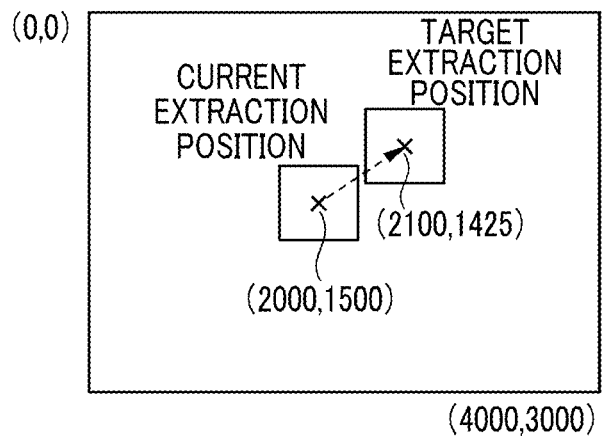
FIG. 37C and FIG. 37D are views describing states of calculating coordinates of image extraction positions from a fish-eye image using concrete numerical values in a seventh embodiment.
Figure 37D:
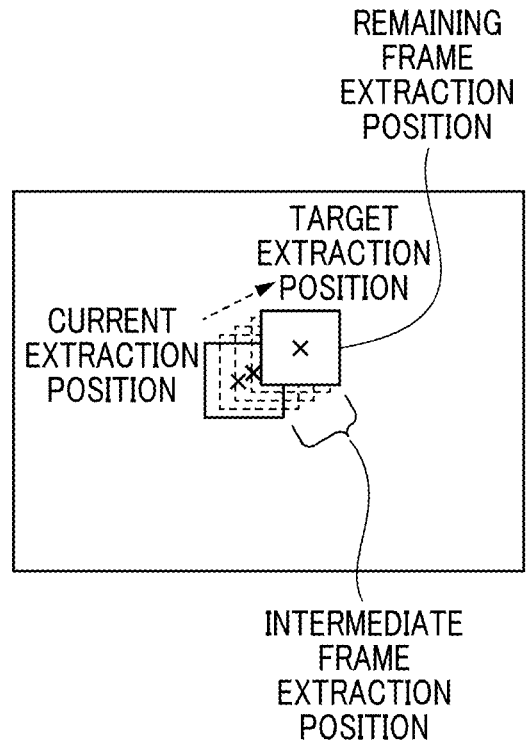

Next, a seventh embodiment will be described. In this embodiment, as with the sixth embodiment, the state where the coordinate of the extraction position of the image extracted from the fish-eye image is calculated described by referring to FIG. 35A through FIG. 35F in the fifth embodiment is described using concrete numerical values. FIG. 37C and FIG. 37D are views each of which shows a state where the extraction positions of multiple frames move as a result of the calculation of the extraction positions of the multiple frames in this embodiment.

As shown in FIG. 37C and FIG. 37D, the size of the fish-eye image shall be 4000*3000 pixels, a current extraction position shall be (2000, 1500), a target extraction position shall be (2100, 1425), and a moving amount per one frame shall be 25 pixels. In this case, variation between the target extraction position and the current extraction position is (100, −75) pixels. Moreover, a direction of a movement vector of the image extraction position becomes (4, −3), and the moving amount for one frame becomes (20, −15) pixels when the moving amount is 25 pixels. Accordingly, the extraction position will become (2100, 1425) pixels five frames later and will reach the target extraction position. The moving amount of the five remaining frames is set as "0".

Next, an eighth embodiment will be described. In this embodiment, the calculation of the coordinate in the image plane corresponding to the face direction described by referring to FIG. 35A through FIG. 35F in the fifth embodiment is described using concrete numerical values.

Figure 38A:
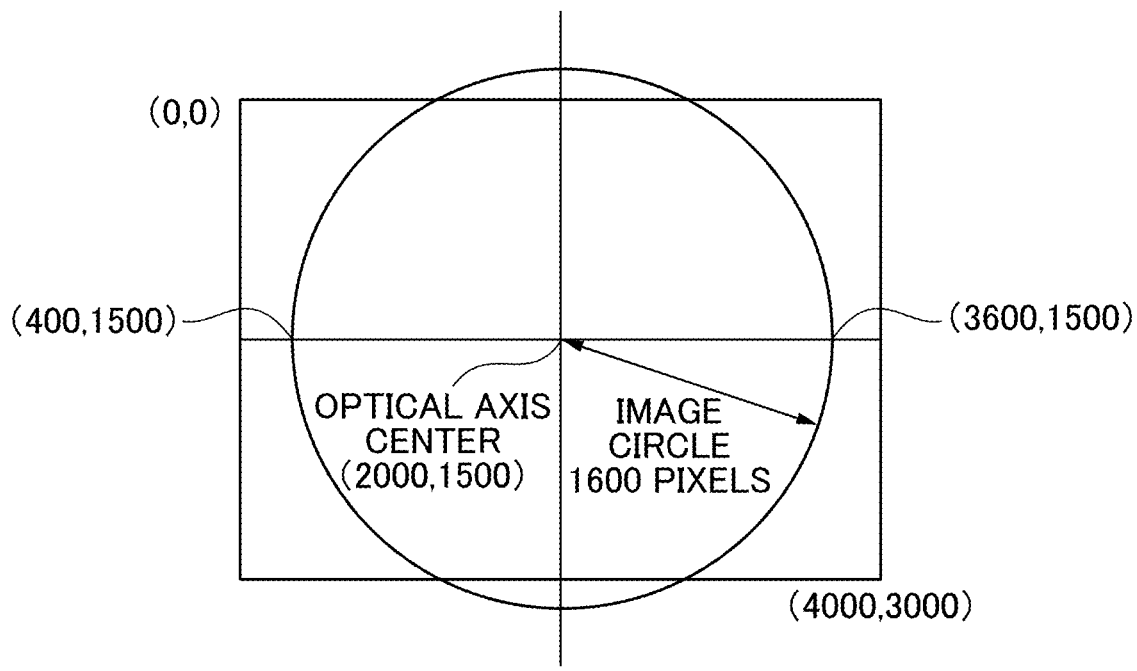
FIG. 38A is a schematic view showing a state of calculating a coordinate value of an image plane from a face direction in an eighth embodiment.
Figure 38B:
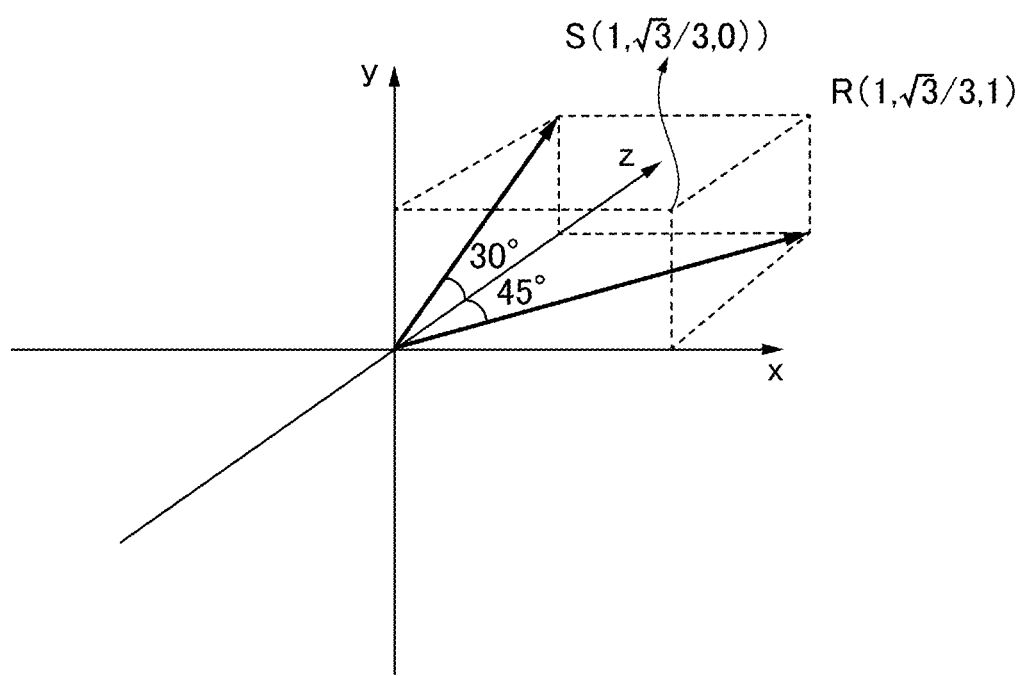
FIG. 38B is a schematic view showing the state of calculating the coordinate value of the image plane from the face direction in the eighth embodiment.

FIG. 38A shows the fish-eye image of which the size is 4000*3000 pixels in the image plane. The optical axis center of the fish-eye lens shall be (2000, 1500). The pixel number of the fish-eye image from the center to the image height 100% shall be 1600 pixels. Moreover, when the face angle α=45° in the horizontal direction and the face angle β=30° in the vertical direction, the point R becomes $$(\tan\alpha, \tan\beta, 1) = \left(\sqrt{3}, \frac{\sqrt{3}}{3}, 1\right),$$

and the point S becomes $$(\tan\alpha, \tan\beta, 0) = \left(1, \frac{\sqrt{3}}{3}, 0\right),$$

according to the above-mentioned calculation (see FIG. 38B). Accordingly, the angle γ of the imaging position in the image plane (the xy-plane) from the x-axis becomes 30°. The face angle, i.e., the incident angle Δ of the light ray becomes 49°, and the image height r in the image plane becomes 54.56%. Then, from these numeric values, the extraction position (center coordinate) in the image plane is calculated as (2000+0.5456·1600·cos 30°,1500−0.5456·1600·sin 30°)=(2756,1063)

Figure 38C:
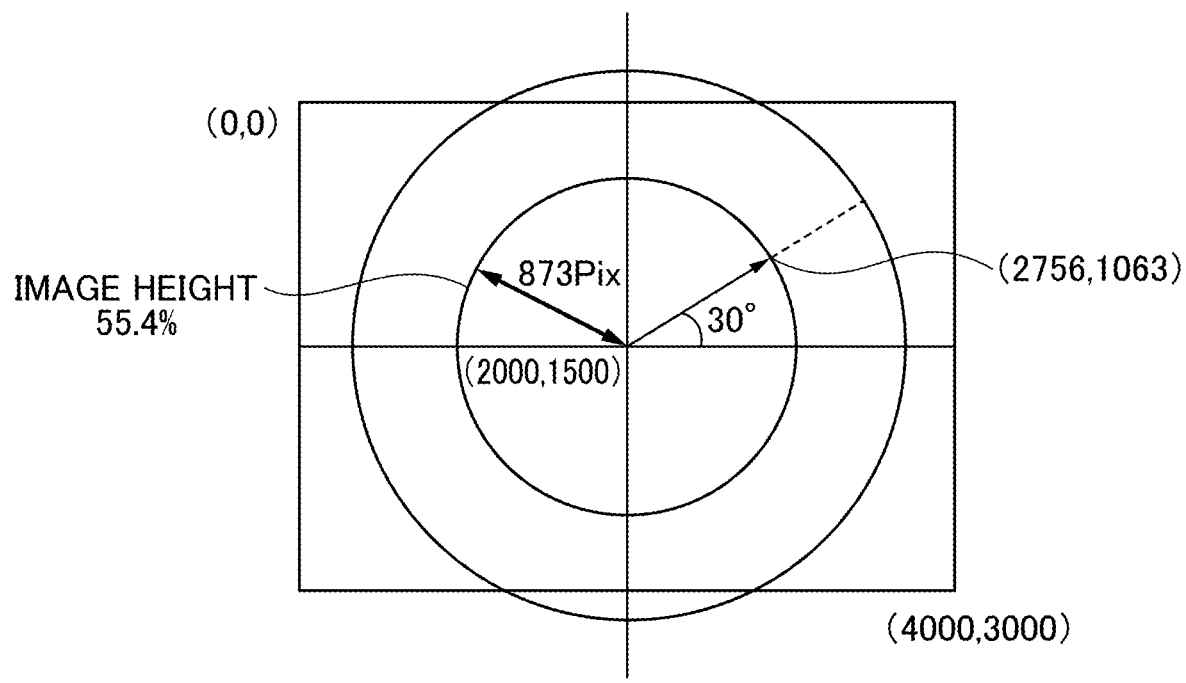
FIG. 38C is a schematic view showing the state of calculating the coordinate value of the image plane from the face direction in the eighth embodiment.

(see FIG. 38C). As mentioned above, the target extraction position and the extraction position may be expressed by the angle and the image height from the optical axis center in the image plane.

Next, a ninth embodiment will be described. In this embodiment, the variation of the coordinate in the image plane corresponding to the variation of the face direction described by referring to FIG. 35A through FIG. 35E in the fifth embodiment is described using concrete numerical values. In this embodiment, the size of the fish-eye image is 4000*3000 pixels, the optical axis center shall be (2000, 1500), and the pixel number from the center to the image height 100% shall be 1600 pixels as with the eighth embodiment.

Figure 39A:
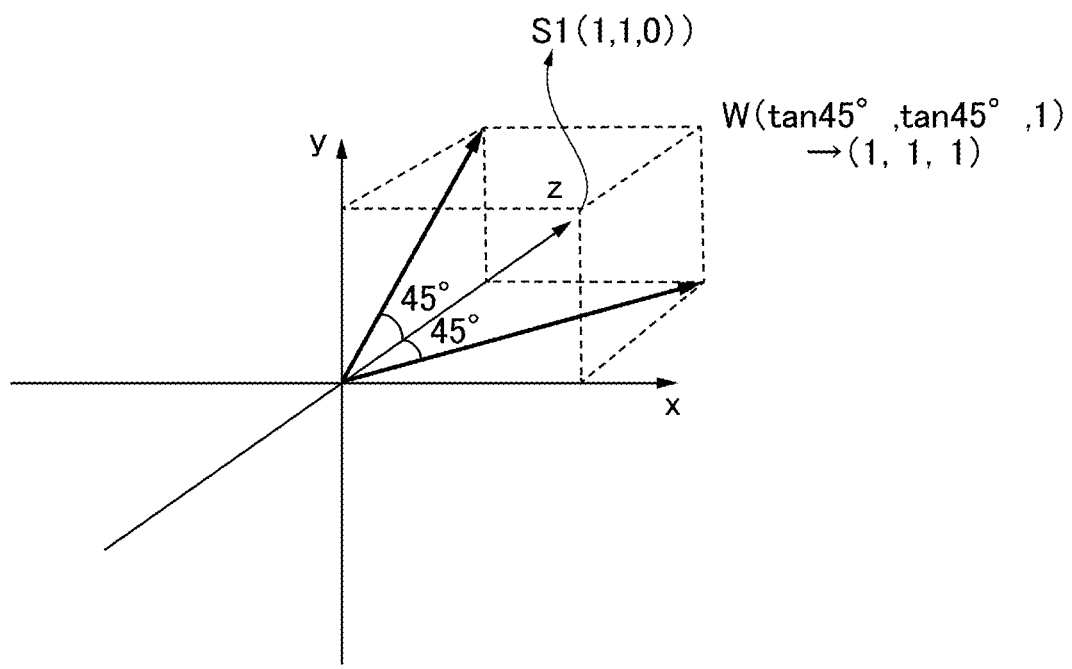
FIG. 39A and FIG. 39B are views showing states of calculating extraction positions in a case where a face direction varies using concrete numerical values in a ninth embodiment.
Figure 39B:
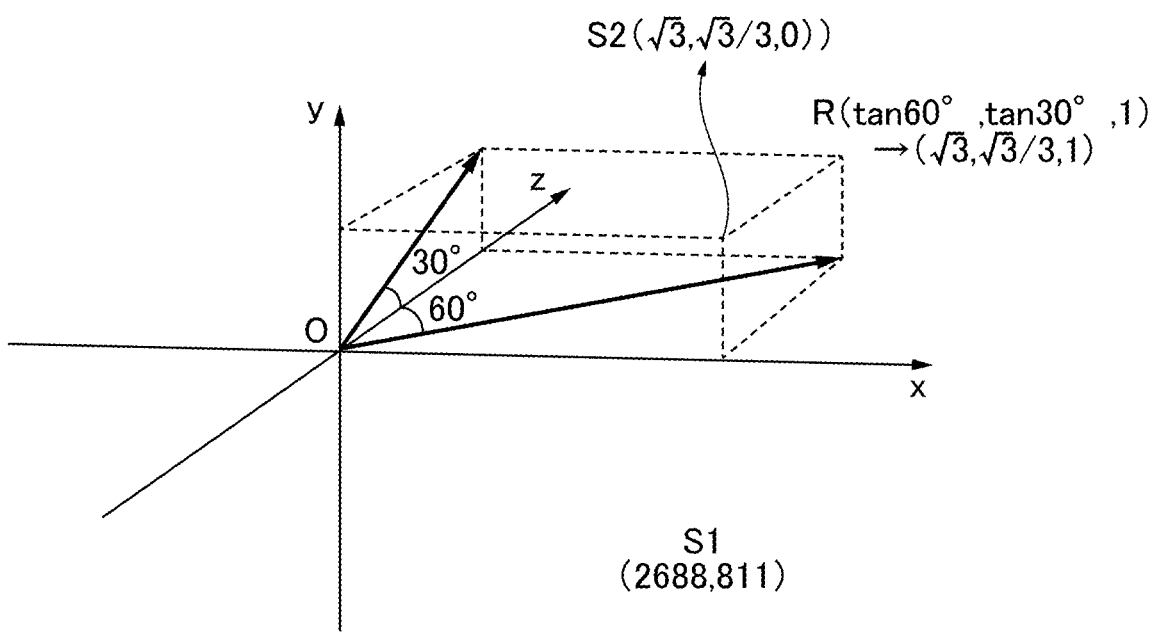
Figure 39C:
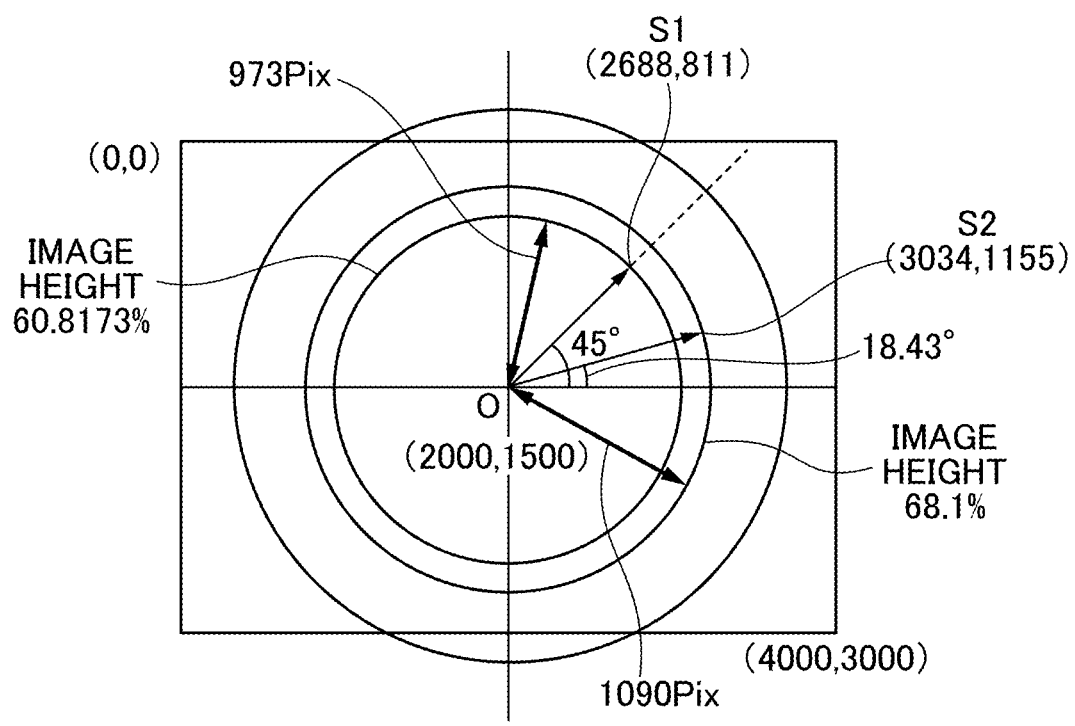
FIG. 39C is a view showing a state of calculating an extraction position in the case where the face direction varies using concrete numerical values in the ninth embodiment.
Figure 39D:
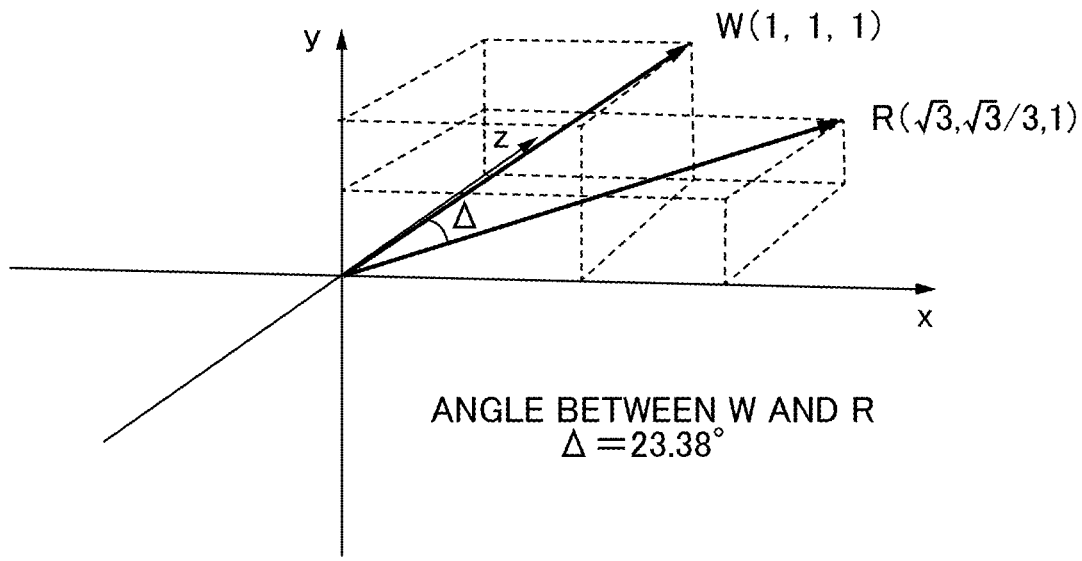
FIG. 39D and FIG. 39E are views showing states of calculating extraction positions in the case where the face direction varies using concrete numerical values in the ninth embodiment.
Figure 39E:
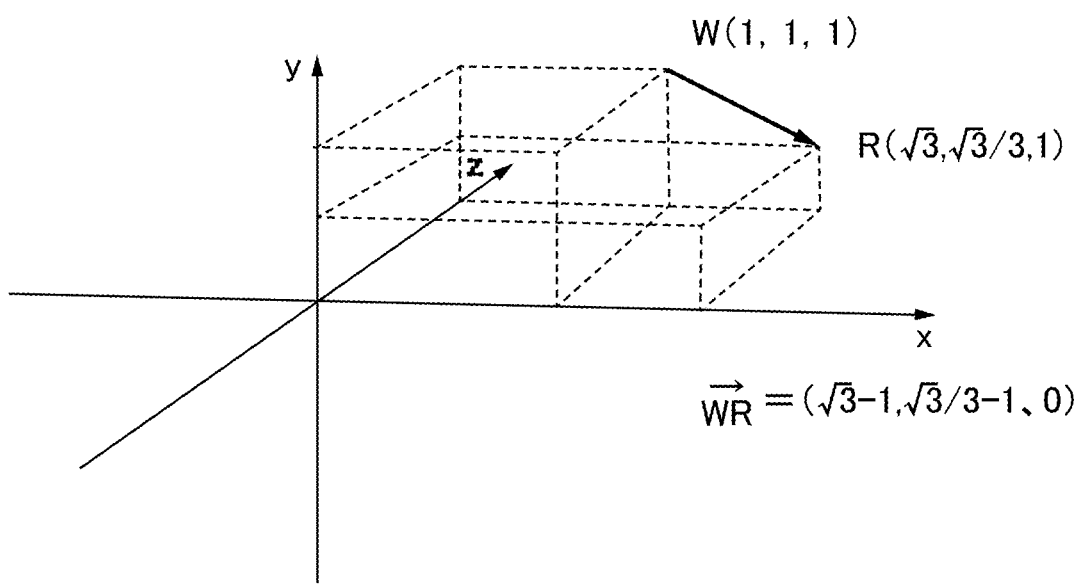

As shown in FIG. 39A and FIG. 39B, the face angles of the current extraction position are α1=45° in the horizontal direction and β1=45° in the vertical direction and the face angles of the target extraction position are α2=60° in the horizontal direction and β2=30° in the vertical direction. In this case, coordinates in the image plane are shown in FIG. 39C. As shown in FIG. 39C, image height of a point S1 on the image plane is 60.8173% and its coordinate on the image plane is (2688, 811). An angle between a line segment from the origin O to the point S1 and the x-axis is 45°. Image height of a point S2 on the image plane is 68.0994% (≈68.1%) and its coordinate on the image plane is (3034, 1155). An angle between a line segment from the origin O to the point S2 and the x-axis is 18.43495° (≈18.43°). Moreover, as shown in FIG. 39D and FIG. 39E, the point W is (1, 1, 1) and the point R is $$\left(\sqrt{3}, \frac{\sqrt{3}}{3}, 1\right).$$

Figure 39F:
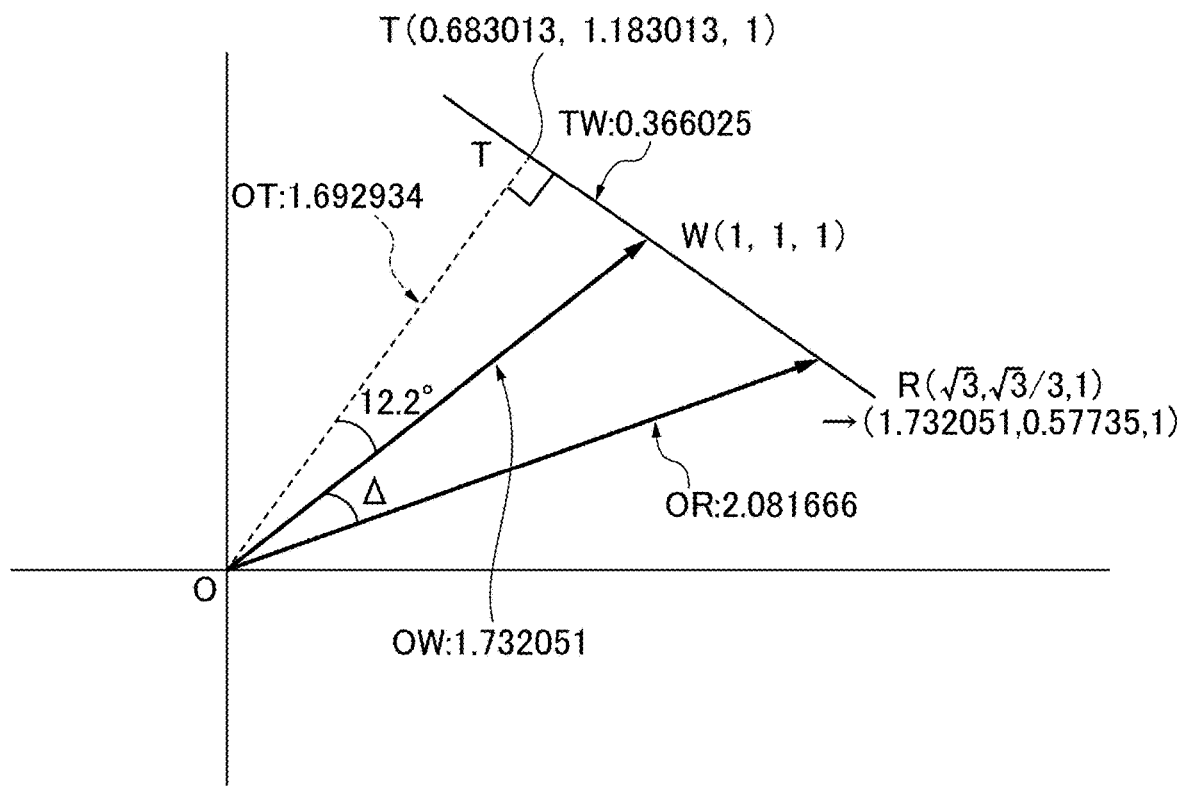
FIG. 39F is a view showing a state of calculating an extraction position in the case where the face direction varies using concrete numerical values in the ninth embodiment.

As shown in FIG. 39F, an angle Δ between vectors of which start points are the origin O and respective end points are points R and W is 23.38° and the moving direction from the point W to the point R is $$\left(\sqrt{3}-1, \frac{\sqrt{3}}{3}-1, 0\right).$$

Figure 39G:
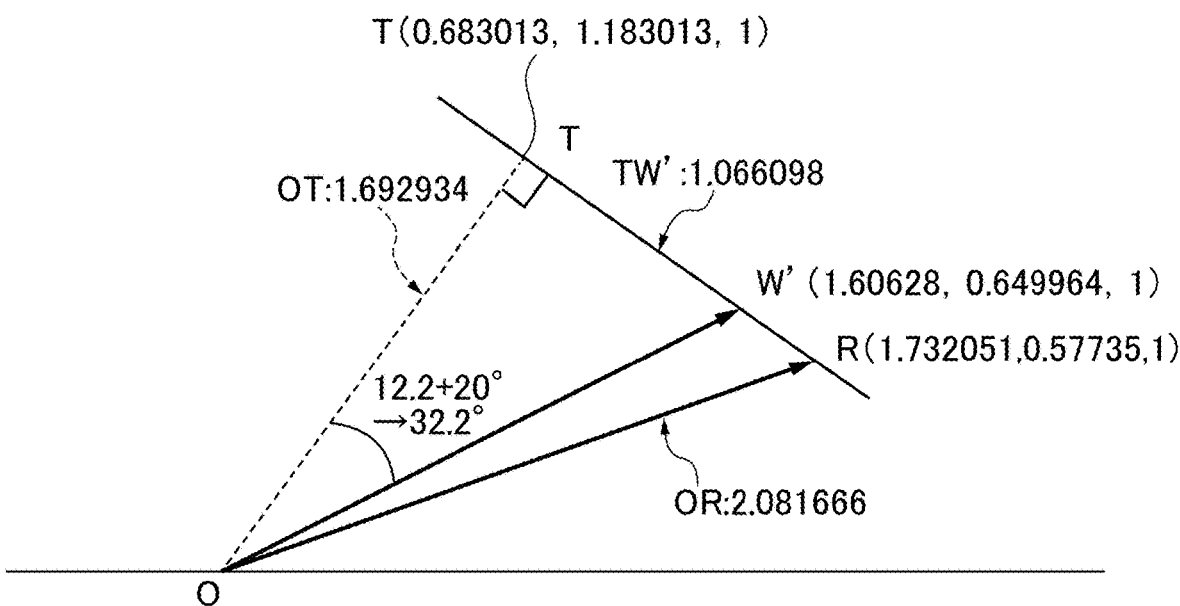
FIG. 39G is a view showing a state of calculating an extraction position in the case where the face direction varies using concrete numerical values in the ninth embodiment.
Figure 39H:
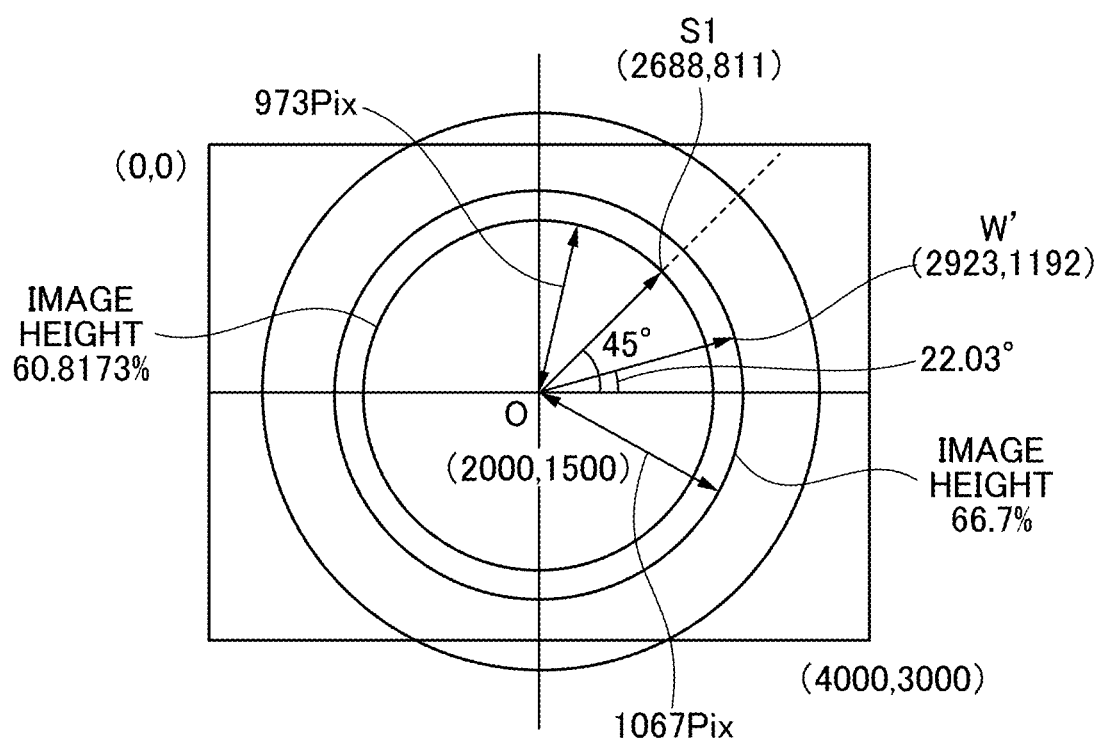
FIG. 39H is a view showing a state of calculating an extraction position in the case where the face direction varies using concrete numerical values in the ninth embodiment.
Figure 40A:
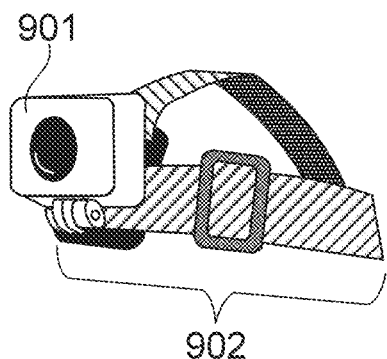
FIG. 40A and FIG. 40B are views showing a configuration example of a camera fixed to a head using a conventional fixing-to-head accessory.
Figure 40B:
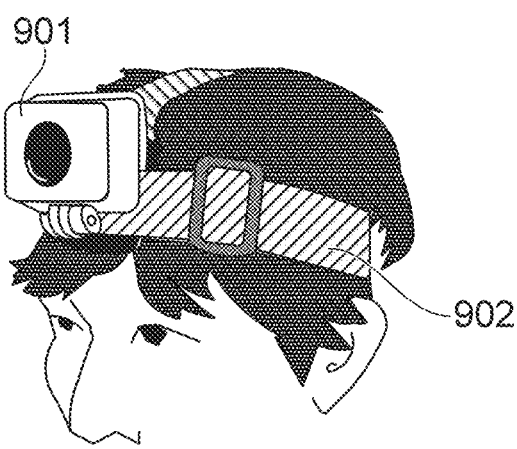
Figure 41:
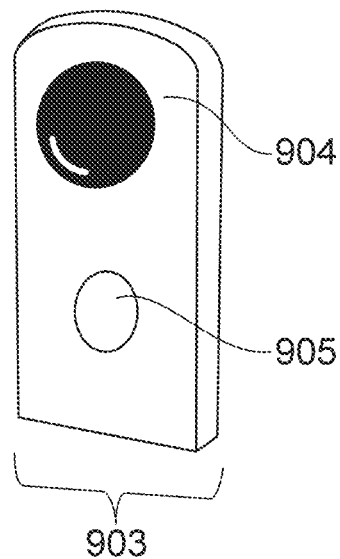
FIG. 41 is a view showing a configuration example of a conventional entire-celestial-sphere camera.
Figure 42A:
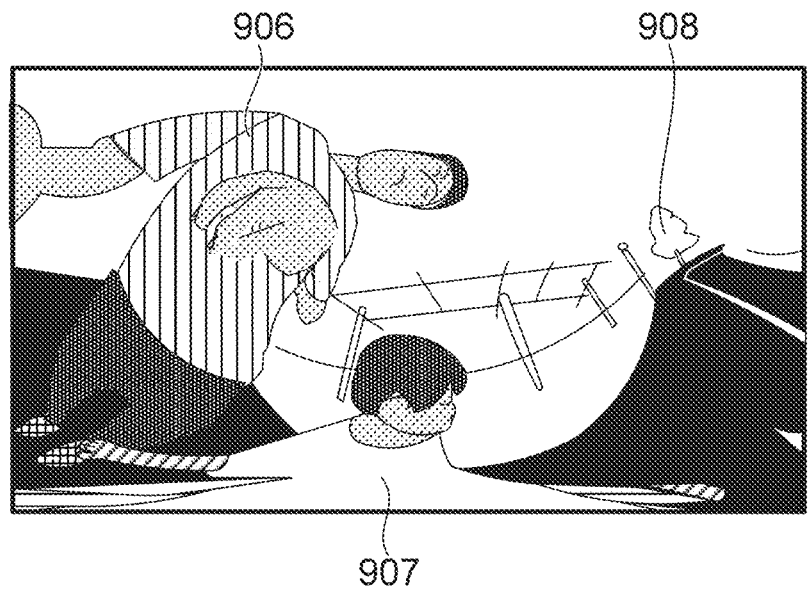
FIG. 42A, FIG. 42B, and FIG. 42C are views showing examples of conversion processes of the image picked up by the entire-celestial-sphere camera in FIG. 41.
Figure 42B:
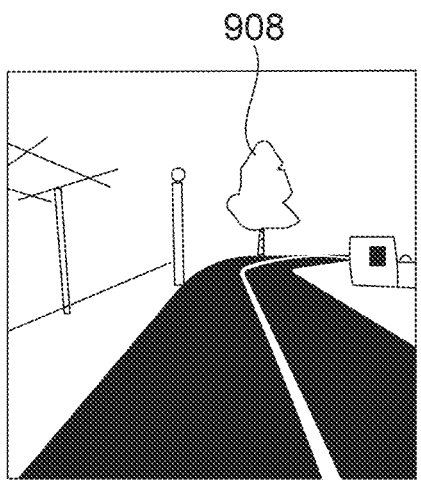
Figure 42C:
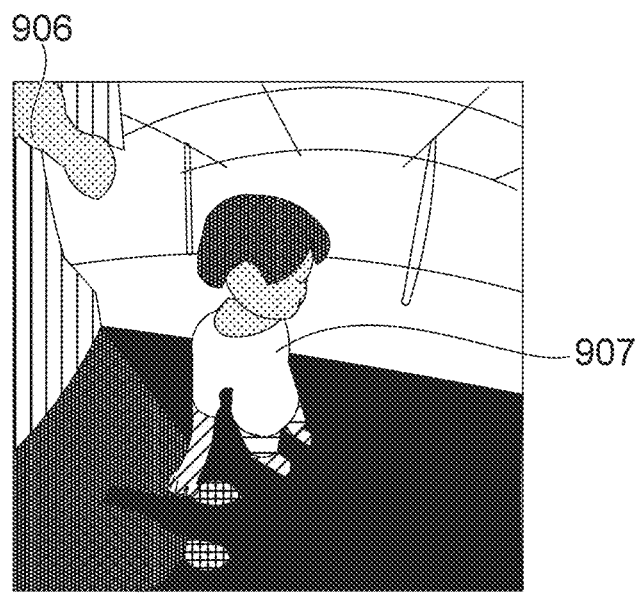

Accordingly, a length of a perpendicular from the origin O to the line segment WR is 1.48124 and an angle TOW is 31.22°. For example, when the extraction position moves 2° per one frame, the extraction position W' ten frames later becomes (1.60628, 0.649964, 1) as shown in FIG. 39G. Accordingly, as shown in FIG. 39H, image height of the extraction position W' ten frames later on the image plane is 66.67864% (≈66.7%) and its coordinate on the image plane is (2923, 1192). An angle between a line segment from the origin O to the extraction position W' and the x-axis is 22.03018° (≈22.03°). FIG. 39H shows the state where the extraction position ten frames later does not reach the target extraction position.

Although the superwide-angle image is described as the fish-eye image by the fish-eye lens in the above-mentioned embodiment, the embodiments are achievable by employing a wide-angle lens instead of a fish-eye lens. For example, a lens of which 35-mm conversion focal length is about 12 mm has a field angle of 120°. When the field angle of the extraction image is 60°, the extraction position can be changed in the range of ±60°.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-173015, filed Oct. 22, 2021 and No. 2022-038690, filed Mar. 11, 2022, which are hereby incorporated by reference herein in their entireties.

What is claimed is:

1. An image pickup apparatus comprising:
   an image pickup unit configured to pick up a wide-angle image;
   a face direction detection unit configured to detect a direction of a face of a user;
   a user movement detection unit configured to detect a movement of the user;
   a memory device that stores a set of instructions; and
   at least one processor that executes the set of instructions to:
   detect at least one of movements including a vertical movement of the face and a horizontal movement of the face based on an output of the face direction detection unit;
   determine at least one of extraction conditions including a position and a size of an extraction image extracted from the wide-angle image based on the direction of the face detected, the at least one of movements detected, and a detection result of the user movement detection unit;
   detect stability of the at least one of movements;
   decrease a moving amount of the position of the extraction image gradually in a case where the stability of the at least one of movements is detected; and
   extract the extraction image from the wide angle image with the at least one of extraction conditions determined.

2. The image pickup apparatus according to claim 1, wherein the at least one processor executes instructions in the memory device to move, in a case where the at least one of movements is detected, the position of the extraction image in a direction of the at least one of movements.

3. The image pickup apparatus according to claim 1, wherein the at least one processor executes instructions in the memory device to widen an area of the extraction image in a case where the user movement detection unit detects a movement of the user.

4. The image pickup apparatus according to claim 1, wherein the at least one processor executes instructions in the memory device to widen an area of the extraction image in a case where the at least one of movements is detected.

5. The image pickup apparatus according to claim 1, wherein the user movement detection unit can detect stability of a movement of the user, and
   wherein the at least one processor executes instructions in the memory device to increase the size of the extraction image gradually so as to be restored to the size before the size of the extraction image is determined in a case where the user movement detection unit detects the stability of the movement of the user.

6. The image pickup apparatus according to claim 1, wherein the at least one processor executes instructions in the memory device to increase the size of the extraction image gradually so as to be restored to the size before the size of the extraction image is determined in a case where the stability of the at least one of movements is detected.

7. The image pickup apparatus according to claim 1, wherein the at least one processor executes instructions in the memory device to regulate correction of an extraction area of the extraction image based on a detection result of the user movement detection unit in a case where the wide-angle image is displayed on a display unit.

8. The image pickup apparatus according to claim 1, wherein the user movement detection unit comprises a gyro.

9. The image pickup apparatus according to claim 1, wherein the user movement detection unit comprises a GPS sensor.

10. The image pickup apparatus according to claim 1, wherein the user movement detection unit comprises an acceleration sensor.

11. An image pickup apparatus comprising:
    an image pickup unit configured to pick up a wide-angle image;
    a face direction detection unit configured to detect a face direction of a user;

a face direction storage unit configured to store a detection result of the face direction detection unit temporarily; and a memory device that stores a set of instructions; and at least one processor that executes the set of instructions to:

store the detection result of the face direction detection unit into the face direction storage unit temporarily;

determine a state of a variation of the face direction based on the detection result of the face direction detection unit stored in the face direction storage unit temporarily;

select any of face directions stored in the face direction storage unit according to a determination result of the state of the variation of the face direction;

determine at least one of extraction conditions including a position and a size of an extraction image extracted from the wide-angle image based on the face direction selected; and extract the extraction image from the wide angle image with the at least one of extraction conditions determined.

12. The image pickup apparatus according to claim 11, wherein the at least one processor executes instructions in the memory device to determine, when it is determined that the face direction is varying in a fixed direction, the extraction area based on a face direction after the variation of the face direction is stabilized.

13. The image pickup apparatus according to claim 11, wherein the at least one processor executes instructions in the memory device to determine, in a case where it is determined that the variation of the face direction is temporary, the extraction area based on one of the face direction before the start of the variation and the face direction after the completion of the variation.

14. The image pickup apparatus according to claim 13, wherein the at least one processor executes instructions in the memory device to set a threshold that is used when it is determined whether the variation of the face direction is temporary.

15. The image pickup apparatus according to claim 11, wherein the at least one processor executes instructions in the memory device to record, in a case where it is determined that the variation of the face direction is temporary, the extraction image extracted based on one of the face direction before the start of the variation and the face direction after the completion of the variation and the extraction image extracted based on the face direction detected at the same time as the time when the wide-angle image is picked up.

16. The image pickup apparatus according to claim 11, wherein the at least one processor executes instructions in the memory device to regulate determination of the state of the variation of the face direction when the wide angle image is displayed on a display unit.

17. The image pickup apparatus according to claim 11, further comprising a wide-angle image storage unit configured to store the wide-angle image temporarily.

18. A control method for an image pickup apparatus, the control method comprising:

picking up a wide-angle image;

detecting a direction of a face of a user;

detecting at least one of movements including a vertical movement of the face and a horizontal movement of the face;

detecting a movement of the user;

determining at least one of extraction conditions including a position and a size of an extraction image extracted from the wide-angle image based on the direction of the face detected, the at least one of movements detected, and the movement of the user detected;

detecting stability of the at least one of movements;

decreasing a moving amount of the position of the extraction image gradually in a case where the stability of the at least one of movements is detected; and extracting the extraction image from the wide angle image with the at least one of extraction conditions determined.

19. A control method for an image pickup apparatus, the control method comprising:

picking up a wide-angle image;

detecting a face direction of a user;

storing a detection result of the face direction temporarily;

determining a state of a variation of the face direction based on the detection result of the face direction stored temporarily;

selecting any of face directions stored temporarily according to a determination result of the state of the variation of the face direction;

determining at least one of extraction conditions including a position and a size of an extraction image extracted from the wide-angle image based on the face direction selected; and extracting the extraction image from the wide angle image with the at least one of extraction conditions determined.

20. A non-transitory computer-readable storage medium storing a control program causing a computer to execute a control method for an image pickup apparatus, the control method comprising:

picking up a wide-angle image;

detecting at least one of movements including a vertical movement of the face and a horizontal movement of the face;

detecting a movement of the user;

determining at least one of extraction conditions including a position and a size of an extraction image extracted from the wide-angle image based on the direction of the face detected, the at least one of movements detected, and the movement of the user detected;

detecting stability of the at least one of movements;

decreasing a moving amount of the position of the extraction image gradually in a case where the stability of the at least one of movements is detected; and extracting the extraction image from the wide angle image with the at least one of extraction conditions determined.

21. A non-transitory computer-readable storage medium storing a control program causing a computer to execute a control method for an image pickup apparatus, the control method comprising:

picking up a wide-angle image;

detecting a face direction of a user;

storing a detection result of the face direction temporarily;

determining a state of a variation of the face direction based on the detection result of the face direction stored temporarily;

selecting any of face directions stored temporarily according to a determination result of the state of the variation of the face direction;

determine at least one of extraction conditions including a position and a size of an extraction image extracted from the wide-angle image based on the face direction selected; and extracting the extraction image from the wide angle image with the at least one of extraction conditions determined.

\* \* \* \* \*